US011884148B2

(12) United States Patent
Nelson et al.

(10) Patent No.: US 11,884,148 B2
(45) Date of Patent: Jan. 30, 2024

(54) UTILITY VEHICLE

(71) Applicant: Polaris Industries Inc., Medina, MN (US)

(72) Inventors: Stephen L. Nelson, Osceola, WI (US); Anthony J. Ripley, Ham Lake, MN (US)

(73) Assignee: Polaris Industries Inc., Medina, MN (US)

(*) Notice: Subject to any disclaimer, the term of this patent is extended or adjusted under 35 U.S.C. 154(b) by 735 days.

(21) Appl. No.: 17/018,668

(22) Filed: Sep. 11, 2020

(65) Prior Publication Data

US 2021/0061088 A1 Mar. 4, 2021

Related U.S. Application Data

(60) Continuation of application No. 16/397,177, filed on Apr. 29, 2019, now Pat. No. 10,800,250, which is a
(Continued)

(51) Int. Cl.
*B60K 13/04* (2006.01)
*B60K 5/00* (2006.01)
*B60K 11/02* (2006.01)
*B60K 17/06* (2006.01)
*B60K 13/02* (2006.01)
(Continued)

(52) U.S. Cl.
CPC ............... *B60K 13/04* (2013.01); *B60K 5/00* (2013.01); *B60K 11/02* (2013.01); *B60K 13/02* (2013.01); *B60K 17/06* (2013.01); *F02B 37/16* (2013.01); *F02M 35/10157* (2013.01); *F02M 35/162* (2013.01); *F16H 55/563* (2013.01); *F02B 37/04* (2013.01); *F02B 37/18* (2013.01); *F02M 35/024* (2013.01); *Y02T 10/12* (2013.01)

(58) Field of Classification Search
CPC ............. F16H 55/563; F16H 61/66245; F16H 63/067; F16H 55/56; F16H 9/18; F16H 61/66227; B60K 17/06
USPC .......................................................... 474/14
See application file for complete search history.

(56) References Cited

U.S. PATENT DOCUMENTS 1,989,585 A 1/1935 Bigelow
2,623,612 A 12/1952 Scheiterlein
(Continued)

FOREIGN PATENT DOCUMENTS

CA 2794236 A1 4/2014
CN 1268997 10/2000
(Continued)

OTHER PUBLICATIONS

"Engine firing change '13 850", PolarisATVForums.com internet forum discussion thread dated Nov. 21, 2012.
(Continued)

*Primary Examiner* — Henry Y Liu
(74) *Attorney, Agent, or Firm* — Faegre Drinker Biddle & Reath LLP

(57) ABSTRACT

A utility vehicle includes a plurality of ground-engaging members, a frame supported by the ground-engaging members, and a powertrain assembly. The powertrain assembly includes an engine, a shiftable transmission, a continuously variable transmission, and a charger. Additionally, the utility vehicle may include a cooling assembly fluidly coupled to at least the engine and the charger.

33 Claims, 68 Drawing Sheets

Related U.S. Application Data division of application No. 14/577,902, filed on Dec. 19, 2014, now Pat. No. 10,300,786.

(51) Int. Cl.

| | |
|---|---|
| *F02M 35/10* | (2006.01) |
| *F02M 35/16* | (2006.01) |
| *F02B 37/16* | (2006.01) |
| *F16H 55/56* | (2006.01) |
| *F02B 37/04* | (2006.01) |
| *F02M 35/024* | (2006.01) |
| *F02B 37/18* | (2006.01) |

(56) References Cited

U.S. PATENT DOCUMENTS

| | | | |
|---|---|---|---|
| 2,795,962 A * | 6/1957 | Uher | F16H 61/66245 474/46 |
| 2,839,038 A | 6/1958 | Middlebrooks, Jr. | |
| 3,523,592 A | 8/1970 | Fenton | |
| 3,597,987 A * | 8/1971 | Kiekhaefer | F16H 61/66245 474/14 |
| 3,605,511 A * | 9/1971 | Deschene | F16H 55/563 474/43 |
| 3,727,478 A * | 4/1973 | Erickson | F16H 55/563 474/14 |
| 3,733,918 A * | 5/1973 | Domaas | F16H 55/563 474/14 |
| 3,759,111 A * | 9/1973 | Hoff | F16H 55/563 474/14 |
| 3,777,584 A * | 12/1973 | Domaas | F16H 61/66245 474/14 |
| RE27,858 E * | 1/1974 | Laughlin | F16H 61/66245 474/14 |
| 3,794,142 A * | 2/1974 | Perreault | F01M 1/06 474/45 |
| 3,841,841 A | 10/1974 | Torosian et al. | |
| 3,861,229 A * | 1/1975 | Domaas | F16H 55/563 474/14 |
| 3,868,862 A * | 3/1975 | Bessette | F16H 55/563 474/14 |
| 3,916,707 A * | 11/1975 | Wells | F16H 61/66245 474/46 |
| 3,939,720 A * | 2/1976 | Aaen | F16H 55/563 474/46 |
| 3,951,224 A * | 4/1976 | Beaudoin | B60K 11/06 474/93 |
| 3,958,461 A * | 5/1976 | Aaen | F16H 55/563 474/14 |
| 3,961,539 A * | 6/1976 | Tremblay | F16H 55/563 474/46 |
| 3,962,927 A * | 6/1976 | Beaudoin | F16H 55/563 474/93 |
| 3,968,702 A * | 7/1976 | Beaudoin | F16H 55/563 474/93 |
| 3,971,263 A * | 7/1976 | Beaudoin | F16H 55/563 474/93 |
| 4,010,725 A | 3/1977 | White | |
| 4,022,272 A | 5/1977 | Miller | |
| 4,061,187 A | 12/1977 | Rajasekaran et al. | |
| 4,150,655 A | 4/1979 | Forlai et al. | |
| 4,236,492 A | 12/1980 | Tholen | |
| 4,284,408 A * | 8/1981 | Boer | F16H 61/66245 474/14 |
| 4,294,073 A | 10/1981 | Neff | |
| 4,313,728 A * | 2/1982 | Prasad | F16H 55/563 192/105 CD |
| 4,404,936 A | 9/1983 | Tatebe et al. | |
| 4,434,934 A | 3/1984 | Moser et al. | |
| 4,464,144 A * | 8/1984 | Kobayashi | F16H 55/563 474/43 |
| 4,470,389 A | 9/1984 | Mitadera et al. | |
| 4,474,162 A | 10/1984 | Mason | |
| 4,483,686 A * | 11/1984 | Kobayashi | F16H 55/563 474/93 |
| 4,575,363 A * | 3/1986 | Burgess | F16H 55/563 474/14 |
| 4,598,687 A | 7/1986 | Hayashi | |
| 4,685,430 A | 8/1987 | Ap | |
| 4,688,529 A | 8/1987 | Mitadera et al. | |
| 4,733,639 A | 3/1988 | Kohyama et al. | |
| 4,826,467 A * | 5/1989 | Reese | F16H 55/563 474/14 |
| 4,848,294 A | 7/1989 | Yamamoto | |
| 4,890,586 A | 1/1990 | Fujii et al. | |
| 4,898,261 A | 2/1990 | Winberg et al. | |
| 4,907,552 A | 3/1990 | Martin | |
| 4,973,082 A | 11/1990 | Kincheloe | |
| 5,018,490 A | 5/1991 | Kroener | |
| 5,086,858 A | 2/1992 | Mizuta et al. | |
| 5,174,622 A | 12/1992 | Gutta | |
| 5,209,703 A * | 5/1993 | Mastine | F16H 55/563 474/70 |
| 5,212,431 A | 5/1993 | Origuchi et al. | |
| 5,251,588 A | 10/1993 | Tsujii et al. | |
| 5,251,713 A | 10/1993 | Enokimoto | |
| 5,255,733 A | 10/1993 | King | |
| 5,264,764 A | 11/1993 | Kuang | |
| 5,326,330 A * | 7/1994 | Bostelmann | F16H 55/563 474/14 |
| 5,358,450 A * | 10/1994 | Robert | F16H 55/563 474/14 |
| 5,359,247 A | 10/1994 | Baldwin et al. | |
| 5,407,130 A | 4/1995 | Uyeki et al. | |
| 5,408,965 A | 4/1995 | Fulton et al. | |
| 5,528,148 A | 6/1996 | Rogers | |
| 5,529,544 A * | 6/1996 | Berto | F16H 61/66245 474/11 |
| 5,549,153 A | 8/1996 | Baruschke et al. | |
| 5,550,445 A | 8/1996 | Nii | |
| 5,558,057 A | 9/1996 | Everts | |
| 5,562,555 A * | 10/1996 | Peterson | F16H 55/563 192/105 CD |
| 5,597,060 A * | 1/1997 | Huddleston | F16H 55/563 474/14 |
| 5,614,809 A | 3/1997 | Kiuchi et al. | |
| 5,621,304 A | 4/1997 | Kiuchi et al. | |
| 5,647,534 A | 7/1997 | Kelz et al. | |
| 5,647,810 A * | 7/1997 | Huddleston | F16H 55/563 384/126 |
| 5,692,983 A * | 12/1997 | Bostelmann | F16H 55/563 474/14 |
| 5,738,062 A | 4/1998 | Everts et al. | |
| 5,788,597 A | 8/1998 | Boll et al. | |
| 5,795,255 A * | 8/1998 | Hooper | F16H 61/66245 474/70 |
| 5,797,816 A * | 8/1998 | Bostelmann | F16H 55/563 474/14 |
| 5,839,397 A | 11/1998 | Funabashi et al. | |
| 5,842,534 A | 12/1998 | Frank | |
| 5,860,403 A | 1/1999 | Hirano et al. | |
| 5,867,009 A | 2/1999 | Kiuchi et al. | |
| 5,883,496 A | 3/1999 | Esaki et al. | |
| 5,947,075 A | 9/1999 | Ryu et al. | |
| 5,950,590 A | 9/1999 | Everts et al. | |
| 5,960,764 A | 10/1999 | Araki | |
| 5,971,290 A | 10/1999 | Echigoya et al. | |
| 5,976,044 A | 11/1999 | Kuyama | |
| 6,047,678 A | 4/2000 | Kurihara et al. | |
| 6,062,024 A | 5/2000 | Zander et al. | |
| 6,149,540 A * | 11/2000 | Johnson | F16H 61/66227 474/46 |
| 6,152,098 A | 11/2000 | Becker et al. | |
| 6,184,603 B1 | 2/2001 | Hamai et al. | |
| 6,196,168 B1 | 3/2001 | Eckerskorn et al. | |
| 6,198,183 B1 | 3/2001 | Baeumel et al. | |
| 6,213,079 B1 | 4/2001 | Watanabe | |
| 6,213,081 B1 | 4/2001 | Ryu et al. | |
| 6,216,660 B1 | 4/2001 | Ryu et al. | |
| 6,217,758 B1 | 4/2001 | Lee | |
| 6,227,160 B1 | 5/2001 | Kurihara et al. | |

(56) References Cited

U.S. PATENT DOCUMENTS

| | | | |
|---|---|---|---|
| 6,309,317 B1 * | 10/2001 | Joss | F16D 43/06 |
| | | | 474/14 |
| 6,311,676 B1 | 11/2001 | Oberg et al. | |
| 6,333,620 B1 | 12/2001 | Schmitz et al. | |
| 6,338,688 B1 | 1/2002 | Minami et al. | |
| 6,353,786 B1 | 3/2002 | Yamada et al. | |
| 6,362,602 B1 | 3/2002 | Kozarekar | |
| 6,394,061 B2 | 5/2002 | Ryu et al. | |
| 6,397,795 B2 | 6/2002 | Hare | |
| 6,504,259 B1 | 1/2003 | Kuroda et al. | |
| 6,510,829 B2 | 1/2003 | Ito et al. | |
| 6,520,133 B1 | 2/2003 | Wenger et al. | |
| 6,520,878 B1 * | 2/2003 | Leclair | F16H 55/563 |
| | | | 474/14 |
| 6,557,515 B2 | 5/2003 | Furuya et al. | |
| 6,561,315 B2 | 5/2003 | Furuya et al. | |
| 6,591,896 B1 | 7/2003 | Hansen | |
| 6,622,804 B2 | 9/2003 | Schmitz et al. | |
| 6,640,766 B2 | 11/2003 | Furuya et al. | |
| 6,659,566 B2 | 12/2003 | Bombardier | |
| 6,661,108 B1 | 12/2003 | Yamada et al. | |
| 6,702,052 B1 | 3/2004 | Wakashiro et al. | |
| 6,761,748 B2 | 7/2004 | Schenk et al. | |
| 6,769,391 B1 | 8/2004 | Lee et al. | |
| 6,786,187 B2 | 9/2004 | Nagai et al. | |
| 6,809,429 B1 | 10/2004 | Frank | |
| 6,810,667 B2 | 11/2004 | Jung et al. | |
| 6,810,977 B2 | 11/2004 | Suzuki | |
| 6,820,583 B2 | 11/2004 | Maier | |
| 6,822,353 B2 | 11/2004 | Koga et al. | |
| 6,909,200 B2 | 6/2005 | Bouchon | |
| 6,915,770 B2 | 7/2005 | Lu | |
| 6,921,077 B1 | 7/2005 | Pupo | |
| 6,935,297 B2 | 8/2005 | Honda et al. | |
| 6,966,395 B2 | 11/2005 | Schuehmacher et al. | |
| 7,017,542 B2 | 3/2006 | Wilton et al. | |
| 7,051,824 B1 | 5/2006 | Jones et al. | |
| 7,073,482 B2 | 7/2006 | Kirchberger | |
| 7,089,737 B2 | 8/2006 | Claus | |
| 7,100,562 B2 | 9/2006 | Terada et al. | |
| 7,104,242 B2 | 9/2006 | Nishi et al. | |
| 7,152,706 B2 | 12/2006 | Pichler et al. | |
| 7,165,522 B2 | 1/2007 | Malek et al. | |
| 7,204,219 B2 | 4/2007 | Sakurai | |
| 7,208,847 B2 | 4/2007 | Taniguchi | |
| 7,224,132 B2 | 5/2007 | Cho et al. | |
| 7,243,564 B2 | 7/2007 | Chonan et al. | |
| 7,243,632 B2 | 7/2007 | Hu | |
| 7,287,508 B2 | 10/2007 | Kurihara | |
| 7,325,526 B2 | 2/2008 | Kawamoto | |
| 7,380,805 B1 | 6/2008 | Turner | |
| 7,395,804 B2 | 7/2008 | Takemoto et al. | |
| 7,412,310 B2 | 8/2008 | Brigham et al. | |
| 7,427,248 B2 | 9/2008 | Chonan | |
| 7,431,024 B2 | 10/2008 | Buchwitz et al. | |
| 7,438,153 B2 | 10/2008 | Kalsnes et al. | |
| 7,449,793 B2 | 11/2008 | Cho et al. | |
| 7,451,808 B2 | 11/2008 | Busse et al. | |
| 7,455,134 B2 | 11/2008 | Severinsky et al. | |
| 7,530,420 B2 | 5/2009 | Davis et al. | |
| 7,537,070 B2 | 5/2009 | Maslov et al. | |
| 7,559,308 B2 | 7/2009 | Matsuda et al. | |
| 7,621,262 B2 | 11/2009 | Zubeck | |
| 7,740,092 B2 | 6/2010 | Bender | |
| 7,769,505 B2 | 8/2010 | Rask et al. | |
| 7,884,574 B2 | 2/2011 | Fukumura et al. | |
| D636,295 S | 4/2011 | Eck et al. | |
| 8,002,061 B2 | 8/2011 | Yamamura et al. | |
| 8,011,342 B2 | 9/2011 | Bluhm | |
| 8,047,451 B2 | 11/2011 | McNaughton | |
| 8,050,851 B2 | 11/2011 | Aoki et al. | |
| 8,051,842 B2 | 11/2011 | Hagelstein et al. | |
| D650,311 S | 12/2011 | Bracy | |
| 8,074,753 B2 | 12/2011 | Tahara et al. | |
| 8,104,524 B2 | 1/2012 | Manesh et al. | |
| 8,157,039 B2 | 4/2012 | Melvin et al. | |
| 8,176,957 B2 | 5/2012 | Manesh et al. | |
| 8,186,333 B2 | 5/2012 | Sakuyama | |
| 8,215,427 B2 | 7/2012 | Rouaud et al. | |
| 8,269,457 B2 | 9/2012 | Wenger et al. | |
| 8,272,685 B2 | 9/2012 | Lucas et al. | |
| 8,281,891 B2 | 10/2012 | Sugiura | |
| 8,323,147 B2 | 12/2012 | Wenger et al. | |
| 8,328,235 B2 | 12/2012 | Schneider et al. | |
| 8,353,265 B2 | 1/2013 | Pursifull | |
| 8,356,472 B2 | 1/2013 | Hiranuma et al. | |
| 8,376,441 B2 | 2/2013 | Nakamura et al. | |
| 8,386,109 B2 | 2/2013 | Nicholls | |
| 8,387,594 B2 | 3/2013 | Wenger et al. | |
| 8,439,019 B1 | 5/2013 | Carlson et al. | |
| 8,479,854 B1 | 7/2013 | Gagnon | |
| 8,555,851 B2 | 10/2013 | Wenger et al. | |
| 8,561,403 B2 | 10/2013 | Vandyne et al. | |
| 8,567,541 B2 | 10/2013 | Wenger et al. | |
| 8,573,348 B2 | 11/2013 | Cantemir et al. | |
| 8,590,651 B2 | 11/2013 | Shigematsu et al. | |
| 8,613,335 B2 | 12/2013 | Deckard et al. | |
| 8,640,814 B2 | 2/2014 | Deckard et al. | |
| 8,668,623 B2 * | 3/2014 | Vuksa | F16H 63/067 |
| | | | 477/80 |
| 8,671,919 B2 | 3/2014 | Nakasugi et al. | |
| D703,102 S | 4/2014 | Eck et al. | |
| 8,689,925 B2 | 4/2014 | Ajisaka | |
| 8,746,719 B2 | 6/2014 | Safranski et al. | |
| 8,783,396 B2 | 7/2014 | Bowman | |
| D711,778 S | 8/2014 | Chun et al. | |
| 8,827,856 B1 * | 9/2014 | Younggren | F16H 63/067 |
| | | | 476/5 |
| 8,834,307 B2 | 9/2014 | Itoo et al. | |
| 8,864,174 B2 | 10/2014 | Minami et al. | |
| 8,869,525 B2 | 10/2014 | Lingenauber et al. | |
| D722,538 S | 2/2015 | Song et al. | |
| 8,973,693 B2 | 3/2015 | Kinsman et al. | |
| 8,997,908 B2 | 4/2015 | Kinsman et al. | |
| 9,016,760 B2 | 4/2015 | Kuroda et al. | |
| 9,133,730 B2 | 9/2015 | Joergl et al. | |
| 9,186,952 B2 | 11/2015 | Yleva | |
| 9,187,083 B2 | 11/2015 | Wenger et al. | |
| 9,194,282 B2 | 11/2015 | Serres et al. | |
| 9,228,644 B2 * | 1/2016 | Tsukamoto | F16H 9/18 |
| 9,266,417 B2 | 2/2016 | Nadeau et al. | |
| 9,328,652 B2 | 5/2016 | Bruss et al. | |
| D758,281 S | 6/2016 | Galloway | |
| 9,381,803 B2 | 7/2016 | Galsworthy et al. | |
| 9,382,832 B2 | 7/2016 | Bowers | |
| 9,421,860 B2 | 8/2016 | Schuhmacher et al. | |
| 9,500,264 B2 * | 11/2016 | Aitcin | F16H 9/14 |
| 9,566,858 B2 | 2/2017 | Hicke et al. | |
| 9,644,717 B2 * | 5/2017 | Aitcin | F16H 63/067 |
| 9,650,078 B2 | 5/2017 | Kinsman et al. | |
| 9,713,976 B2 | 7/2017 | Miller et al. | |
| 9,718,351 B2 | 8/2017 | Ripley et al. | |
| 9,725,023 B2 | 8/2017 | Miller et al. | |
| 9,752,489 B2 | 9/2017 | Chu | |
| 9,776,481 B2 | 10/2017 | Deckard et al. | |
| 9,802,605 B2 | 10/2017 | Wenger et al. | |
| 9,895,946 B2 | 2/2018 | Schlangen et al. | |
| 9,908,577 B2 | 3/2018 | Novak et al. | |
| 10,017,090 B2 | 7/2018 | Franker et al. | |
| 10,066,729 B2 * | 9/2018 | Aitcin | B62M 27/02 |
| 10,099,547 B2 | 10/2018 | Bessho et al. | |
| 10,124,709 B2 | 11/2018 | Bohnsack et al. | |
| D835,545 S | 12/2018 | Hanten et al. | |
| 10,183,605 B2 | 1/2019 | Weber et al. | |
| 10,207,555 B2 | 2/2019 | Mailhot et al. | |
| 10,246,153 B2 | 4/2019 | Deckard et al. | |
| 10,294,877 B2 | 5/2019 | Arima et al. | |
| 10,300,786 B2 | 5/2019 | Nugteren et al. | |
| D852,674 S | 7/2019 | Wilcox et al. | |
| 10,369,861 B2 | 8/2019 | Deckard et al. | |
| 10,479,422 B2 | 11/2019 | Hollman et al. | |
| 10,697,532 B2 * | 6/2020 | Schleif | F16H 57/027 |
| 10,718,238 B2 | 7/2020 | Wenger et al. | |
| 10,767,745 B2 * | 9/2020 | Zauner | F16H 55/563 |

(56) References Cited

U.S. PATENT DOCUMENTS

| | | | |
|---|---|---|---|
| 10,800,250 B2 | 10/2020 | Nugteren et al. | |
| 10,946,736 B2 | 3/2021 | Fischer et al. | |
| 10,967,694 B2 | 4/2021 | Brady et al. | |
| 11,173,808 B2 | 11/2021 | Swain et al. | |
| 11,285,807 B2 | 3/2022 | Galsworthy et al. | |
| 11,306,809 B2* | 4/2022 | Aitcin | B62M 27/02 |
| 11,624,427 B2* | 4/2023 | Itoo | F16H 9/125 474/14 |
| 11,680,635 B2* | 6/2023 | Olason | F16H 63/067 474/14 |
| 2001/0020554 A1 | 9/2001 | Yanase et al. | |
| 2001/0043808 A1 | 11/2001 | Matsunaga et al. | |
| 2002/0032088 A1* | 3/2002 | Korenjak | F02B 61/045 474/14 |
| 2002/0033295 A1 | 3/2002 | Korenjak et al. | |
| 2002/0042313 A1* | 4/2002 | Aitcin | F16H 9/125 474/14 |
| 2002/0119846 A1* | 8/2002 | Kitai | F16H 63/062 474/14 |
| 2002/0121795 A1 | 9/2002 | Murray | |
| 2002/0123400 A1* | 9/2002 | Younggren | F16H 61/66272 474/14 |
| 2002/0179354 A1 | 12/2002 | White | |
| 2003/0029413 A1 | 2/2003 | Sachdev et al. | |
| 2003/0034187 A1 | 2/2003 | Hisada et al. | |
| 2003/0066696 A1 | 4/2003 | Nakamura | |
| 2003/0070849 A1 | 4/2003 | Whittaker | |
| 2003/0104900 A1 | 6/2003 | Takahashi et al. | |
| 2003/0153426 A1* | 8/2003 | Brown | F16H 37/0846 475/210 |
| 2004/0018903 A1* | 1/2004 | Takagi | F16H 9/125 474/8 |
| 2004/0031451 A1 | 2/2004 | Atschreiter et al. | |
| 2004/0063535 A1 | 4/2004 | Ibaraki | |
| 2004/0083730 A1 | 5/2004 | Wizgall et al. | |
| 2004/0168455 A1 | 9/2004 | Nakamura | |
| 2004/0177827 A1 | 9/2004 | Hoyte et al. | |
| 2004/0188159 A1 | 9/2004 | Yatagai et al. | |
| 2004/0195797 A1 | 10/2004 | Nash et al. | |
| 2004/0214668 A1* | 10/2004 | Takano | F16H 63/067 474/14 |
| 2004/0224806 A1 | 11/2004 | Chonan | |
| 2004/0226761 A1 | 11/2004 | Takenaka et al. | |
| 2004/0231630 A1 | 11/2004 | Liebert | |
| 2005/0014582 A1* | 1/2005 | Whiting | F16F 1/324 474/14 |
| 2005/0052080 A1 | 3/2005 | Maslov et al. | |
| 2005/0055140 A1 | 3/2005 | Brigham et al. | |
| 2005/0103558 A1 | 5/2005 | Davis et al. | |
| 2005/0173180 A1 | 8/2005 | Hypes et al. | |
| 2005/0205319 A1 | 9/2005 | Yatagai et al. | |
| 2006/0112695 A1 | 6/2006 | Neubauer et al. | |
| 2006/0130888 A1 | 6/2006 | Yamaguchi et al. | |
| 2006/0131102 A1 | 6/2006 | Rauch et al. | |
| 2006/0270503 A1 | 11/2006 | Suzuki et al. | |
| 2007/0080006 A1 | 4/2007 | Yamaguchi | |
| 2007/0144800 A1 | 6/2007 | Stone | |
| 2007/0251744 A1 | 11/2007 | Matsuzawa | |
| 2008/0022981 A1 | 1/2008 | Keyaki et al. | |
| 2008/0023240 A1 | 1/2008 | Sunsdahl et al. | |
| 2008/0028603 A1 | 2/2008 | Takegawa et al. | |
| 2008/0083392 A1 | 4/2008 | Kurihara et al. | |
| 2008/0125256 A1* | 5/2008 | Murayama | F16H 57/04 180/219 |
| 2008/0157592 A1 | 7/2008 | Bax et al. | |
| 2008/0178830 A1 | 7/2008 | Sposato | |
| 2008/0202483 A1 | 8/2008 | Procknow | |
| 2008/0257625 A1 | 10/2008 | Stranges | |
| 2008/0271937 A1 | 11/2008 | King et al. | |
| 2008/0284124 A1* | 11/2008 | Brady | B62K 5/01 280/124.135 |
| 2008/0296076 A1* | 12/2008 | Murayama | F16D 43/10 474/14 |
| 2008/0299448 A1 | 12/2008 | Buck et al. | |
| 2008/0308337 A1 | 12/2008 | Ishida | |
| 2009/0014246 A1 | 1/2009 | Lin | |
| 2009/0015023 A1 | 1/2009 | Fleckner | |
| 2009/0064642 A1 | 3/2009 | Sato et al. | |
| 2009/0078082 A1 | 3/2009 | Poskie et al. | |
| 2009/0177345 A1 | 7/2009 | Severinsky et al. | |
| 2009/0179509 A1 | 7/2009 | Gerundt et al. | |
| 2009/0227404 A1* | 9/2009 | Beyer | F16H 55/563 474/14 |
| 2009/0286643 A1 | 11/2009 | Brown | |
| 2009/0301830 A1 | 12/2009 | Kinsman et al. | |
| 2009/0302590 A1 | 12/2009 | Van et al. | |
| 2009/0314462 A1 | 12/2009 | Yahia et al. | |
| 2010/0019722 A1 | 1/2010 | Sanchez | |
| 2010/0019729 A1 | 1/2010 | Kaita et al. | |
| 2010/0120565 A1 | 5/2010 | Kochidomari et al. | |
| 2010/0121512 A1 | 5/2010 | Takahashi et al. | |
| 2010/0155013 A1 | 6/2010 | Braun et al. | |
| 2010/0162989 A1 | 7/2010 | Aamand et al. | |
| 2010/0163324 A1 | 7/2010 | Jyoutaki et al. | |
| 2010/0181134 A1 | 7/2010 | Sugiura | |
| 2010/0211242 A1 | 8/2010 | Kelty et al. | |
| 2010/0311529 A1* | 12/2010 | Ochab | F16H 9/18 474/11 |
| 2011/0092325 A1* | 4/2011 | Vuksa | F16H 9/18 192/45.02 |
| 2011/0094225 A1 | 4/2011 | Kistner et al. | |
| 2011/0133438 A1 | 6/2011 | Haines et al. | |
| 2011/0147106 A1 | 6/2011 | Wenger et al. | |
| 2011/0155082 A1 | 6/2011 | Takano | |
| 2011/0168126 A1 | 7/2011 | Fujikawa | |
| 2011/0240393 A1 | 10/2011 | Hurd et al. | |
| 2012/0031688 A1 | 2/2012 | Safranski et al. | |
| 2012/0055728 A1 | 3/2012 | Bessho et al. | |
| 2012/0055729 A1 | 3/2012 | Bessho et al. | |
| 2012/0073537 A1 | 3/2012 | Oltmans et al. | |
| 2012/0125022 A1 | 5/2012 | Maybury et al. | |
| 2012/0214626 A1* | 8/2012 | Cook | F16H 55/563 474/14 |
| 2012/0217078 A1 | 8/2012 | Kinsman et al. | |
| 2012/0217116 A1 | 8/2012 | Nishimoto | |
| 2012/0283930 A1 | 11/2012 | Venton-Walters et al. | |
| 2012/0297765 A1 | 11/2012 | Vigild et al. | |
| 2013/0062909 A1 | 3/2013 | Harris et al. | |
| 2013/0075183 A1 | 3/2013 | Kochidomari et al. | |
| 2013/0157794 A1* | 6/2013 | Stegelmann | F16H 63/067 474/8 |
| 2014/0004984 A1* | 1/2014 | Aitcin | F16H 55/563 474/14 |
| 2014/0103627 A1 | 4/2014 | Deckard et al. | |
| 2014/0113766 A1 | 4/2014 | Yagyu et al. | |
| 2014/0230797 A1 | 8/2014 | Meshenky et al. | |
| 2014/0235382 A1* | 8/2014 | Tsukamoto | F16H 9/18 474/14 |
| 2014/0288763 A1 | 9/2014 | Bennett et al. | |
| 2014/0311143 A1 | 10/2014 | Speidel et al. | |
| 2014/0349792 A1* | 11/2014 | Aitcin | F16H 55/563 474/13 |
| 2015/0071759 A1 | 3/2015 | Bidner et al. | |
| 2015/0267792 A1* | 9/2015 | Hochmayr | F16H 9/125 474/14 |
| 2015/0275742 A1 | 10/2015 | Chekaiban et al. | |
| 2015/0377341 A1 | 12/2015 | Renner et al. | |
| 2016/0061088 A1 | 3/2016 | Minnichsoffer et al. | |
| 2016/0084146 A1 | 3/2016 | Almkvist et al. | |
| 2016/0160989 A1* | 6/2016 | Millard | F16H 55/563 474/14 |
| 2016/0341148 A1 | 11/2016 | Maki et al. | |
| 2017/0029036 A1 | 2/2017 | Proulx et al. | |
| 2017/0152810 A1 | 6/2017 | Wicks | |
| 2017/0166255 A1 | 6/2017 | Peterson et al. | |
| 2017/0175621 A1 | 6/2017 | Schenkel | |
| 2017/0248087 A1 | 8/2017 | Reisenberger et al. | |
| 2018/0142609 A1 | 5/2018 | Seo et al. | |
| 2018/0178677 A1 | 6/2018 | Swain et al. | |
| 2019/0210457 A1 | 7/2019 | Galsworthy et al. | |
| 2019/0210668 A1 | 7/2019 | Endrizzi et al. | |
| 2019/0248227 A1 | 8/2019 | Nugteren et al. | |

(56) References Cited

U.S. PATENT DOCUMENTS

| | | |
|---|---|---|
| 2019/0264635 A1 | 8/2019 | Oltmans et al. |
| 2020/0010125 A1 | 1/2020 | Peterson et al. |
| 2020/0070709 A1 | 3/2020 | Weber et al. |
| 2020/0217236 A1 | 7/2020 | Hudgens et al. |
| 2020/0346542 A1 | 11/2020 | Rasa et al. |
| 2021/0024007 A1 | 1/2021 | Fredrickson et al. |
| 2021/0213822 A1 | 7/2021 | Ripley et al. |
| 2021/0354542 A1 | 11/2021 | Schleif et al. |
| 2022/0105795 A1 | 4/2022 | Nelson et al. |
| 2022/0120340 A1 | 4/2022 | Nichols et al. |
| 2022/0355659 A1 | 11/2022 | Purdy et al. |

FOREIGN PATENT DOCUMENTS

| | | |
|---|---|---|
| CN | 1284603 A | 2/2001 |
| CN | 1792661 A | 6/2006 |
| CN | 1982110 A | 6/2007 |
| CN | 101424200 A | 5/2009 |
| CN | 101445044 A | 6/2009 |
| CN | 101701547 A | 5/2010 |
| CN | 101708694 A | 5/2010 |
| CN | 102121415 A | 7/2011 |
| CN | 102226464 A | 10/2011 |
| CN | 103075278 A | 5/2013 |
| CN | 203702310 U | 7/2014 |
| CN | 212690200 U | 3/2021 |
| DE | 4447138 A1 | 12/1997 |
| DE | 19735021 A1 | 2/1999 |
| DE | 102005003077 A1 | 8/2006 |
| DE | 202005005999 U1 | 8/2006 |
| DE | 102007024126 A1 | 12/2008 |
| DE | 102014000450 A1 | 8/2014 |
| DE | 102016012781 A1 | 4/2017 |
| EP | 0511654 A2 | 11/1992 |
| EP | 0856427 A1 | 8/1998 |
| EP | 1077149 A2 | 2/2001 |
| EP | 0928885 B1 | 4/2003 |
| EP | 1382475 A1 | 1/2004 |
| EP | 1433645 A2 | 6/2004 |
| EP | 2033878 A1 | 3/2009 |
| EP | 2145808 A1 | 1/2010 |
| FR | 2941424 A1 | 7/2010 |
| GB | 2454349 A | 5/2009 |
| GB | 2505767 A | 3/2014 |
| JP | 60-209616 A | 10/1985 |
| JP | 61-135910 | 6/1986 |
| JP | 62-007925 A | 1/1987 |
| JP | H10280968 | 10/1998 |
| JP | 2005-130629 A | 5/2005 |
| JP | 2005-299469 A | 10/2005 |
| JP | 2007-064080 A | 3/2007 |
| JP | 2007-083864 A | 4/2007 |
| JP | 2007-278228 A | 10/2007 |
| JP | 2009-173147 A | 8/2009 |
| JP | 2009-220765 A | 10/2009 |
| JP | 2009-281330 A | 12/2009 |
| JP | 2010-064744 A | 3/2010 |
| JP | 2017-043130 A | 3/2017 |
| KR | 10-2008-0028174 A | 3/2008 |
| WO | 98/04431 A1 | 2/1998 |
| WO | 00/15455 A2 | 3/2000 |
| WO | 2004/085194 A1 | 10/2004 |
| WO | 2009/059407 A1 | 5/2009 |
| WO | 2010/081979 A1 | 7/2010 |
| WO | 2012/018896 A2 | 2/2012 |
| WO | 2013/166310 A1 | 11/2013 |
| WO | 2014/047488 A1 | 3/2014 |
| WO | 2014/059258 A1 | 4/2014 |
| WO | 2016/038591 A1 | 3/2016 |
| WO | 2016/099770 A2 | 6/2016 |
| WO | 2016/186942 A1 | 11/2016 |
| WO | 2018/118176 A1 | 6/2018 |
| WO | 2018/118508 A2 | 6/2018 |
| WO | 2019/140026 A1 | 7/2019 |
| WO | 2020/223379 A1 | 11/2020 |

OTHER PUBLICATIONS

"Honda develps a powerful, fuel-efficient 700cc engine for midsize motorcycle", Honda news release from www.world.honda.com; dated Sep. 26, 2011.

"Straight-twin engine", Wikipedia.org internet encyclopedia entry.

"Who makes the best turbo kit for the Polarsis RZR ?? ", RZRforums. net internet forum discussion thread dated Jun. 25, 2010.

53 Series Aerocharger RZR XP 900 Turbocharger kit, retrieved from www.sidebysidesports.com/53seaerzxp9.html on Jan. 10, 2019, Internet Wayback Machine capture dated Apr. 26, 2011 (Year: 2011).

European Patent Office, International Search Report for PCT/US2010/049167, dated Jul. 6, 2011, 6 pages.

European Patent Office, Written Opinion for PCT/US2010/049167, dated Jul. 6, 2011, 5 pages.

Heitner, Range extender hybrid vehicle, Intersociety Energy Conversion Engineering Conference Proceedings, vol. 4, pp. 323-338, 1991.

International Preliminary Report on Patentability received for PCT Patent Application No. PCT/US2015/061272, dated May 12, 2017, 22 pages.

International Search Report and Written Opinion received for PCT Patent Application No. PCT/US2015/061272, dated Aug. 12, 2016, 13 pages.

Letter Exam Report issued by the State Intellectual Property Office (SIPO), dated Mar. 18, 2015, for related Chinese Application No. 201080046628.5; 20 pages.

Letter Exam Report issued by the State Intellectual Property Office (SIPO), dated Mar. 18, 2015, for Chinese Patent Application No. 201080046628.5; 20 pages.

Office Action issued by the U.S. Patent and Trademark Office, dated Oct. 1, 2018, for U.S. Appl. No. 15/751,403; 7 pages.

Polaris RZR XP 900 Review, retrieved from www.world-of-atvs. com/polaris-rzr-xp-900.html on Jan. 10, 2019, Internet Wayback Machine capture dated Mar. 12, 2012 (Year: 2012).

Research on Generator Set Control of Ranger Extender Pure Electric Vehicles, Fang, et al., Power and Energy Conference (APPEEC), 2010 Asia-Pacific, Mar. 31, 2010; 4 pages.

Response to Office Action filed with the U.S. Patent and Trademark Office, filed Dec. 19, 2018, for U.S. Appl. No. 15/751,403; 9 pages.

International Search Report and Written Opinion received for PCT Patent Application No. PCT/US21/31782, dated Aug. 5, 2021, 11 pages.

International Search Report and Written Opinion received for PCT Patent Application No. PCT/US21/31804, dated Aug. 9, 2021, 6 pages.

Ridenow Powersports. 2017 Can-Am Maverick X3 Walk Around. YouTube. Sep. 14, 2016 (Sep. 14, 2016). [retrieved on Jul. 6, 2021]. Retrieved from internet: <URL: https://www.youtube.com/watch?v=5IOslScF-y4> entire video. See pp. 6-8 of the ISA/237.

Suzuki; 1991 Suzuki GSX1100G Cylinder OEM Parts Diagram; retrieved Mar. 17, 2022; https://www.revzilla.com/oem/suzuki/1991-suzuki-gsx1100g/cylinder?submodel=gsx1100gp (Year: 2017).

International Preliminary Report on Patentability received for PCT Patent Application No. PCT/US10/49167, dated Oct. 18, 2012, 30 pages.

International Preliminary Report on Patentability issued by the International Searching Authority, dated Nov. 15, 2022, for International Patent Application No. PCT/US2021/031782; 9 pages.

Office Action issued by the Canadian Intellectual Property Office, dated May 2, 2023, for Canadian Patent Application No. 3152773, 5 pages.

RideNow Powersports, "2017 Can-Am Maverick X3 Walk Around", Sep. 14, 2016, YouTube.com. https://www.youtube.com/watch?v=5I0slScF-y4 (Year: 2016).

* cited by examiner

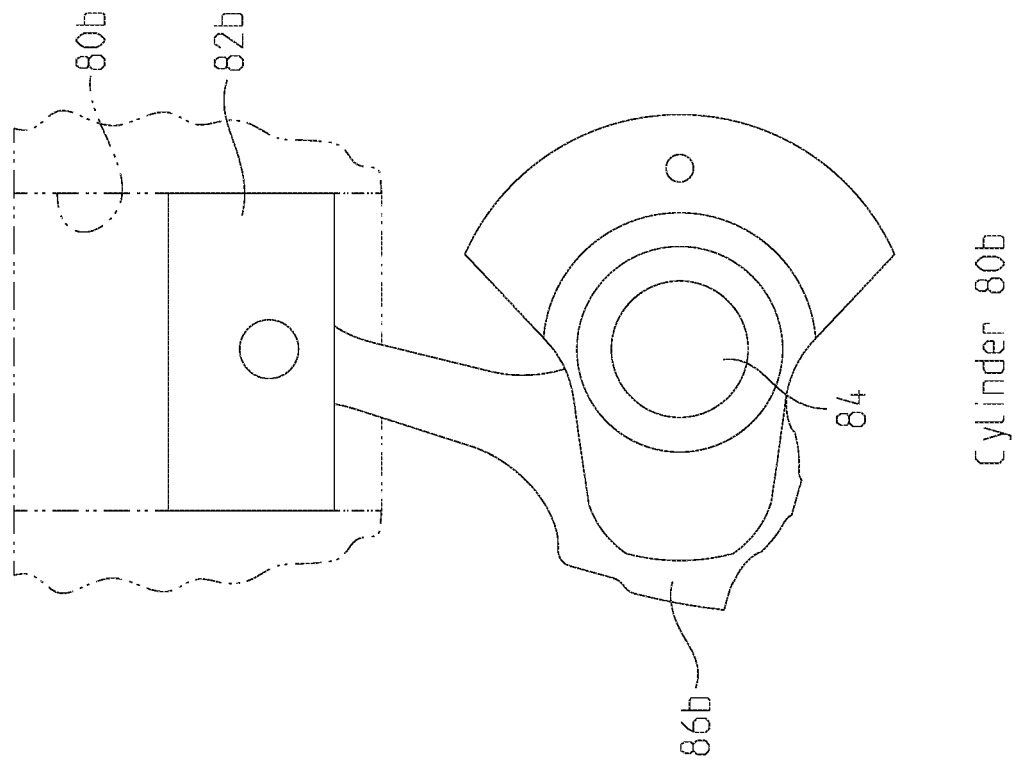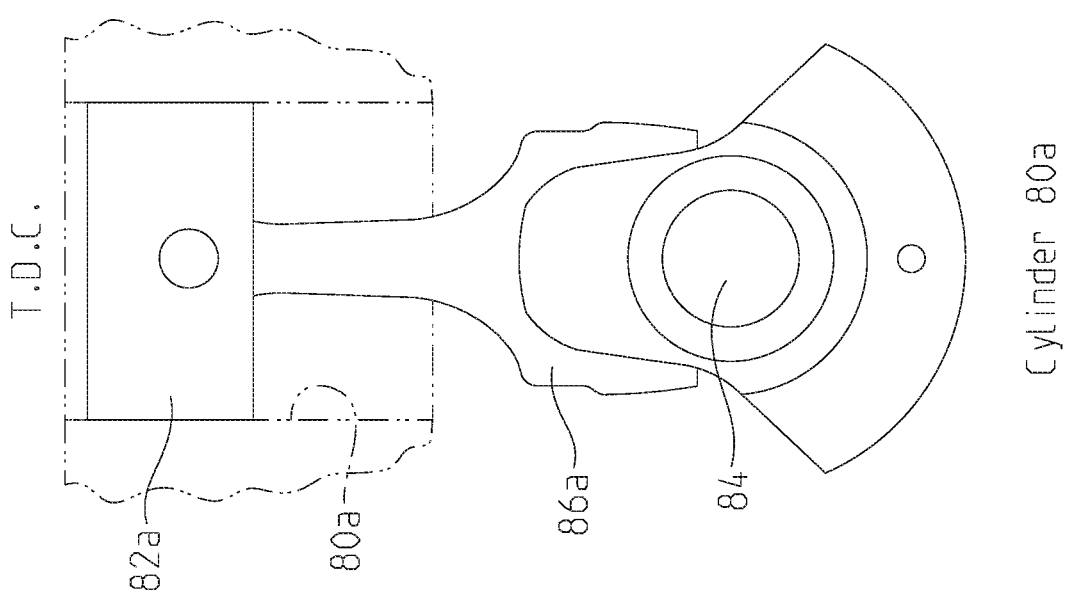
Fig. 18

UTILITY VEHICLE

CROSS-REFERENCE TO RELATED APPLICATIONS

The present application is a continuation of U.S. patent application Ser. No. 16/397,177, filed Apr. 29, 2019, which is a divisional of U.S. patent application Ser. No. 14/577,902, filed on Dec. 19, 2014, the complete disclosures of which are expressly incorporated by reference herein.

FIELD OF THE INVENTION

The present invention relates generally to a vehicle and, in particular, to a vehicle with a charged powertrain assembly.

BACKGROUND AND SUMMARY OF THE INVENTION

Vehicles including utility vehicles, all-terrain vehicles, tractors, and others are known. Such vehicles may include engines, transmissions, and forced-air inducers (e.g., superchargers, turbochargers). By providing a vehicle with a charged powertrain assembly, the power output of the powertrain assembly may be increased.

A forced-air inducer, such as a supercharger or a turbocharger, operates by compressing pre-combustion air flowing into the engine. However, compressing the pre-combustion air may increase the temperature of the air. In order to maintain the temperature of the intake air, an intercooler may be provided to decrease the temperature of the charged or pressurized air flowing from the forced-air inducer and into the engine.

In one embodiment of the present disclosure, a utility vehicle, comprises a plurality of ground-engaging members, a lower frame supported by the ground-engaging members which has a front portion and a rear portion, an open-air seating area supported by the lower frame between the front and rear portions, an upper frame coupled to the lower frame and cooperating to generally surround the seating area, a powertrain assembly supported by the lower frame and including an engine, a shiftable transmission, and a continuously variable transmission, and a cooling assembly operably coupled to the powertrain assembly and extending from the front portion to the rear portion of the lower frame. The cooling assembly has a first cooling circuit configured to alter a temperature of the engine and a second cooling circuit configured to alter a temperature of intake air received within the engine.

In another embodiment of the present disclosure, a utility vehicle comprises a plurality of ground-engaging members and a frame assembly supported by the ground-engaging members, which has a lower frame and an upper frame. The lower frame has a front portion and a rear portion. The utility vehicle further comprises an open-air operator area supported by the frame assembly, a powertrain assembly supported by the rear portion of the lower frame which includes an engine, a shiftable transmission, and a clutch assembly, and a cooling assembly including a first heat exchanger positioned at the front portion of the lower frame for cooling the engine and a second heat exchanger positioned at the rear portion of the lower frame for cooling intake air for the engine.

In a further embodiment of the present disclosure, a utility vehicle comprises a plurality of ground-engaging members, a frame supported by the ground-engaging members, and a powertrain assembly supported by the frame. The powertrain assembly includes an engine supported by the frame having a crankshaft and a continuously variable transmission having a first clutch assembly operably coupled to the crankshaft, a second clutch assembly operably coupled to the first clutch assembly, and a housing generally enclosing the first and second clutch assemblies. The second clutch assembly includes a stationary sheave and a moveable sheave. The powertrain assembly also includes a shiftable transmission operably coupled to the engine through the continuously variable transmission. The shiftable transmission includes a housing having a mounting surface for coupling to the housing of the continuously variable transmission and a shaft operably coupled to the second clutch assembly. The shaft extends less than 160 mm from the mounting surface of the housing of the shiftable transmission and an inner surface of the moveable sheave is positioned less than 55 mm from the mounting surface of the shiftable transmission.

In another embodiment of the present disclosure, a utility vehicle comprises a plurality of ground-engaging members, a frame supported by the ground-engaging members, and a powertrain assembly supported by the frame. The powertrain assembly includes an engine supported by the frame, a continuously variable transmission supported by the frame and having a structural housing member, and a shiftable transmission operably coupled to the engine through the structural housing member of the continuously variable transmission. The shiftable transmission includes a first mounting surface coupled to a first portion of the structural housing member of the continuously variable transmission and the engine has a second mounting surface coupled to a second portion of the structural housing member of the continuously variable transmission, and mounting the first mounting surface of the shiftable transmission to the structural housing member fixes an orientation of the shiftable transmission relative to the engine.

In a further embodiment of the present disclosure, a utility vehicle comprises a plurality of ground-engaging members, a frame supported by the ground-engaging member, an operator area having side-by-side seating supported by the frame, and a powertrain assembly which includes an engine having a first cylinder, a second cylinder in line with the first cylinder, and a crankshaft. The engine is configured for a 270-degree firing timing. The powertrain assembly further includes a gaseous charger operably coupled to the engine.

In yet another embodiment of the present disclosure, a utility vehicle includes a plurality of ground-engaging members, a frame supported by the ground-engaging members, an operator area including side-by-side seating, and a powertrain assembly supported by the frame. The powertrain assembly includes an engine supported by the frame, a turbocharger operably coupled to the engine and having a turbine housing and a compressor housing, and an exhaust manifold integral with the turbine housing of the turbocharger.

In yet a further embodiment of the present disclosure, a unitary housing member for a powertrain assembly of a vehicle comprises an exhaust manifold configured to mount to an engine, and a turbine housing of a turbocharger integral with the exhaust manifold.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where:

FIG. 18 is a schematic view of a firing timing of the engine of the powertrain assembly of FIG. 15, illustrating the position of the second piston of FIG. 17 when the first piston of FIG. 17 is at top dead center;

Corresponding reference characters indicate corresponding parts throughout the several views. Unless stated otherwise the drawings are proportional.

DETAILED DESCRIPTION OF THE DRAWINGS

Figure 1:
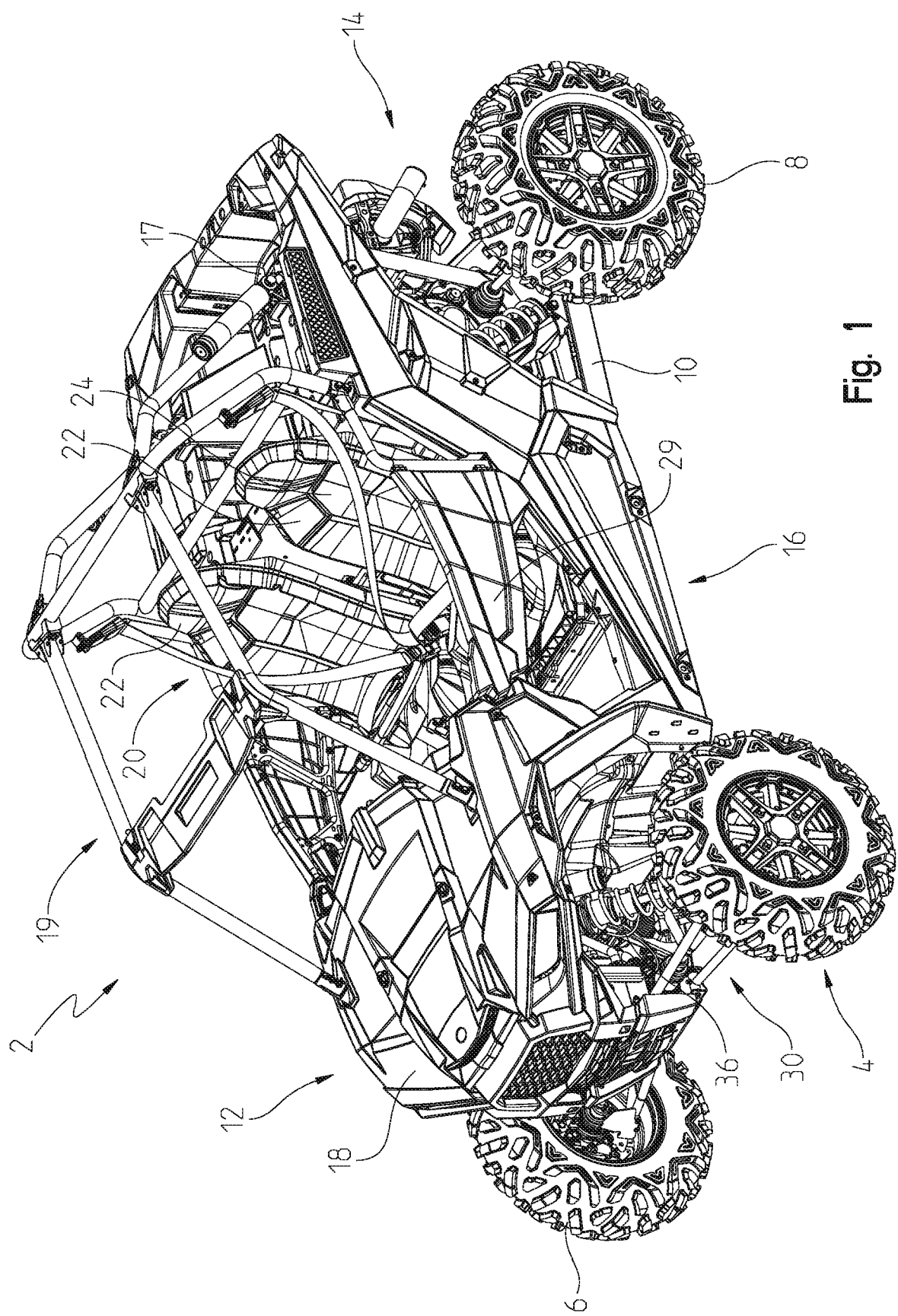
FIG. 1 is a front left perspective view of a utility vehicle of the present disclosure.
Figure 2:
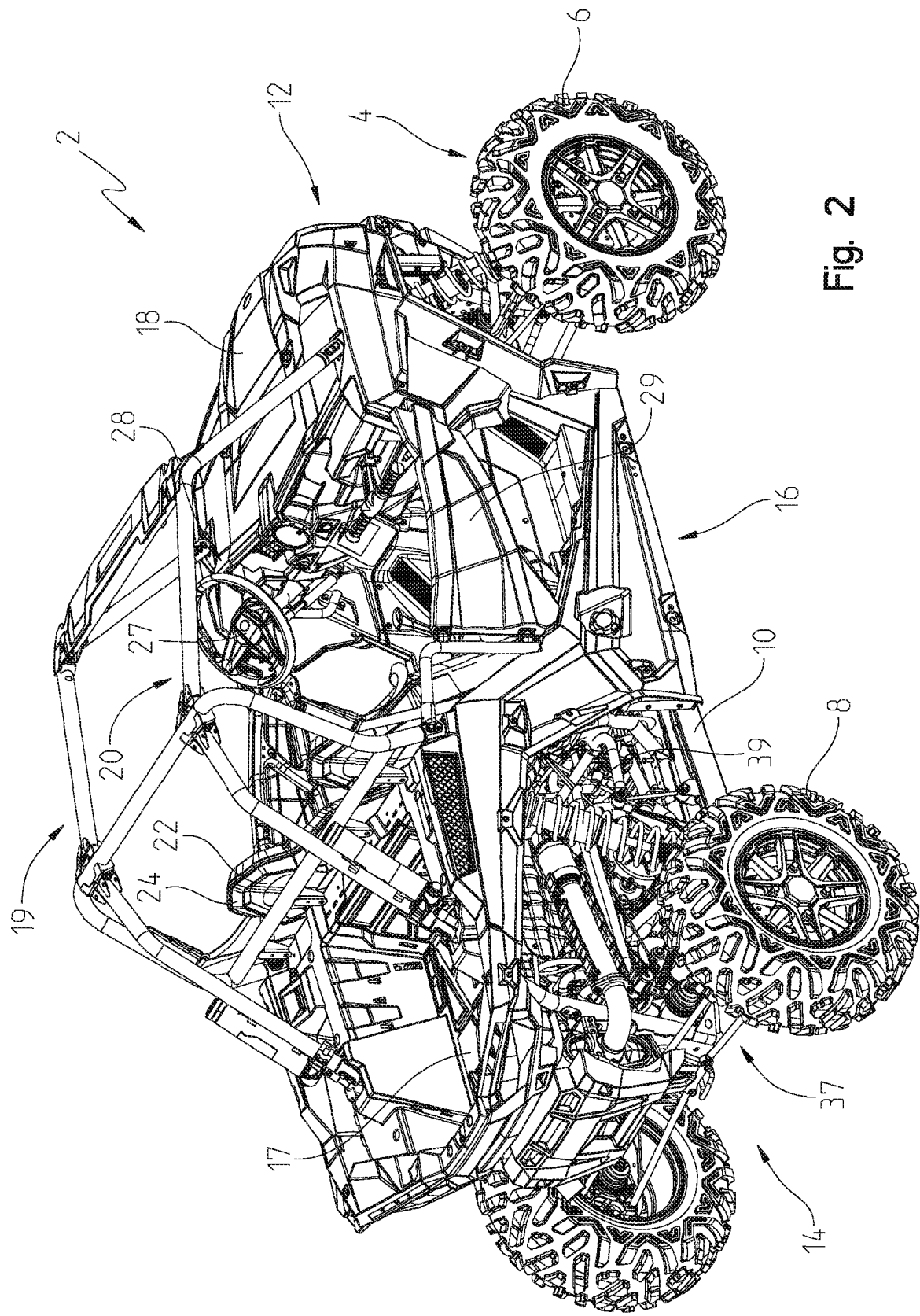
FIG. 2 is a rear right perspective view of the vehicle of FIG. 1.

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

Referring to FIGS. 1-7, an illustrative embodiment of a utility vehicle 2 is shown. Vehicle 2 is configured for off-road operation. Vehicle 2 includes a plurality of ground-engaging members 4, illustratively front wheels 6 and rear wheels 8. In one embodiment, one or more of ground-engaging members 4 may be replaced with tracks, such as the Prospector II Tracks available from Polaris Industries, Inc., located at 2100 Highway 55 in Medina, MN 55340 or non-pneumatic tires, such as those shown in U.S. Pat. Nos. 8,176,957 and 8,104,524, the complete disclosures of which are expressly incorporated herein by reference.

Vehicle 2 further includes a lower frame assembly 10 (partially shown in FIG. 36) supported by ground-engaging members 4, which extends along a longitudinal centerline $C_L$ of vehicle 2. Lower frame assembly 10 includes a front portion 12, a rear portion 14, and an intermediate portion 16 extending therebetween. Additionally, vehicle 2 includes an upper frame assembly 19 extending vertically above lower frame assembly 10 and, more particularly, above at least intermediate portion 16 of lower frame assembly 10. Lower frame assembly 10 supports a rear cargo support area 17 and a vehicle body 18, which includes a plurality of body panels.

Vehicle 2 also includes an open-air operator area 20 which includes seating 22 for one or more passengers. As such, operator area 20 is exposed to ambient air and is not fully enclosed. Upper frame assembly 19 may be positioned generally around operator area 20 such that seating 22 is at least partially surrounded by upper frame assembly 19. Additionally, side nets or doors 29 may be positioned along the sides of operator area 20 and seating 22. Illustratively, seating 22 includes an operator seat and a passenger seat, however, seating 22 may also include rear seats for additional passengers. Seating 22 may include a seat back 24 and a seat bottom 26 for at least the operator and a passenger.

Operator area 20 further includes a plurality of operator controls 28, such as a steering wheel 27, by which an operator may provide input for operating vehicle 2. Additionally, the steering assembly, which includes steering wheel 27, may be configured for a 1.5 turn for lock to lock. Various operator controls, including the steering assembly, are further described in International Patent Application No. PCT/US13/64516, filed on Oct. 11, 2013, the complete disclosure of which is expressly incorporated by reference herein. Operator area 20 and controls 28 may further include an HVAC system for the comfort of the operator and the passengers.

Figure 7:
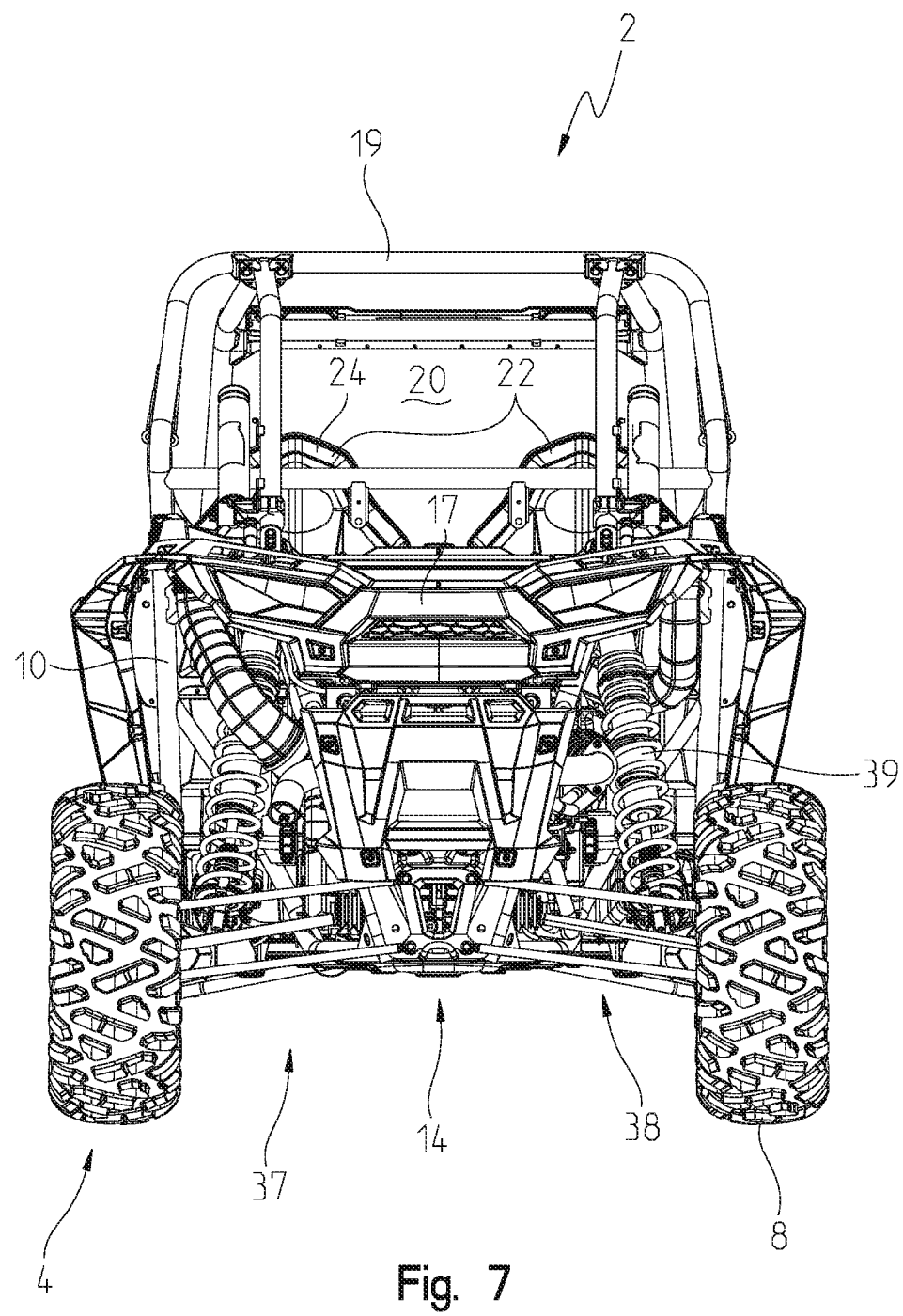
FIG. 7 is a rear view of the vehicle of FIG. 1.

Referring to FIG. 7, vehicle 2 includes a rear suspension assembly 37, as shown in FIG. 7, which includes a sway bar, trailing arms, and shock absorbers 39. In one embodiment, shock absorbers 39 may be internal bypass shocks, as disclosed in International Patent Application No. PCT/US13/64516, filed on Oct. 11, 2013, the complete disclosure of which is expressly incorporated by reference herein.

Figure 6:
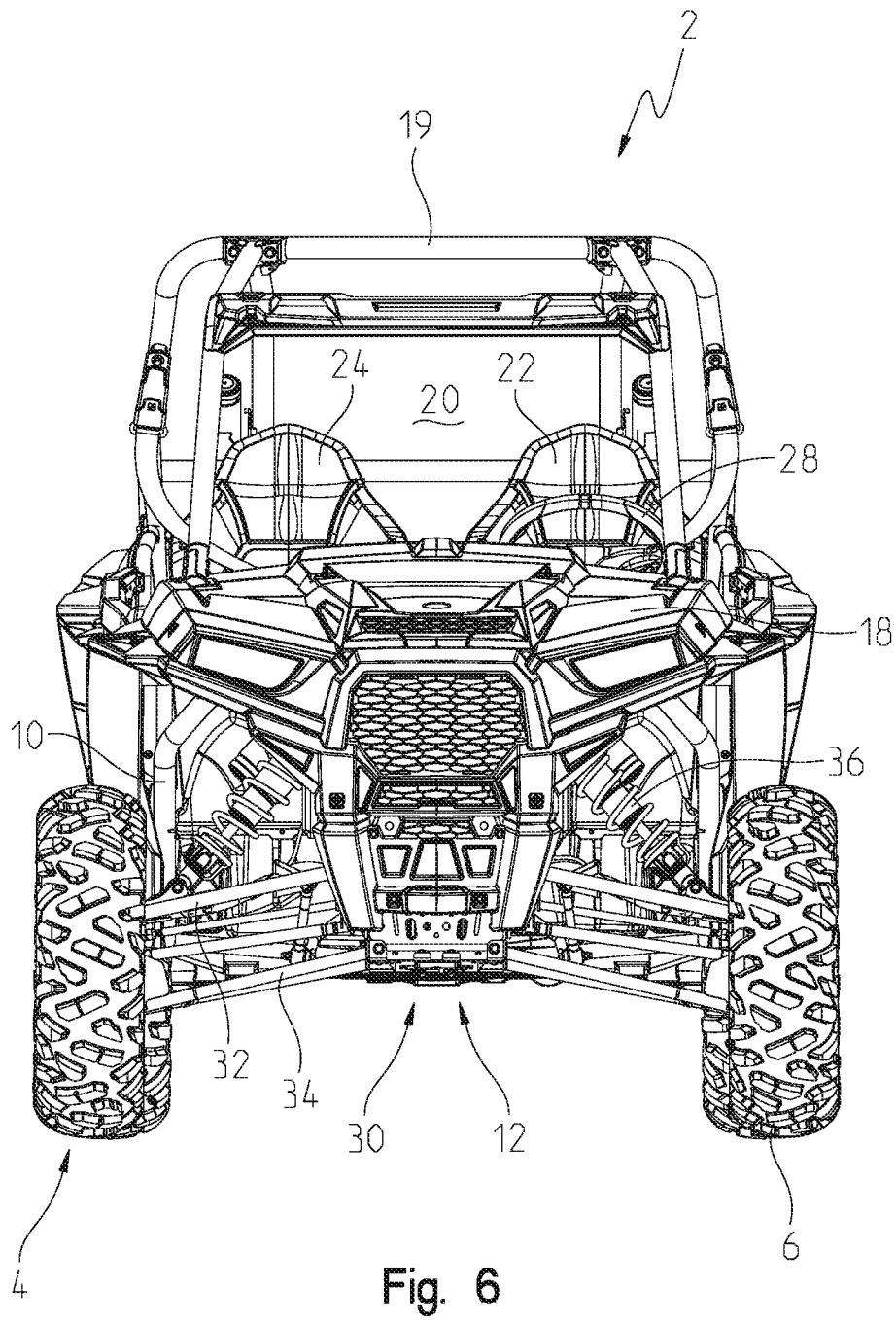
FIG. 6 is a front view of the vehicle FIG. 1.
Figure 8:
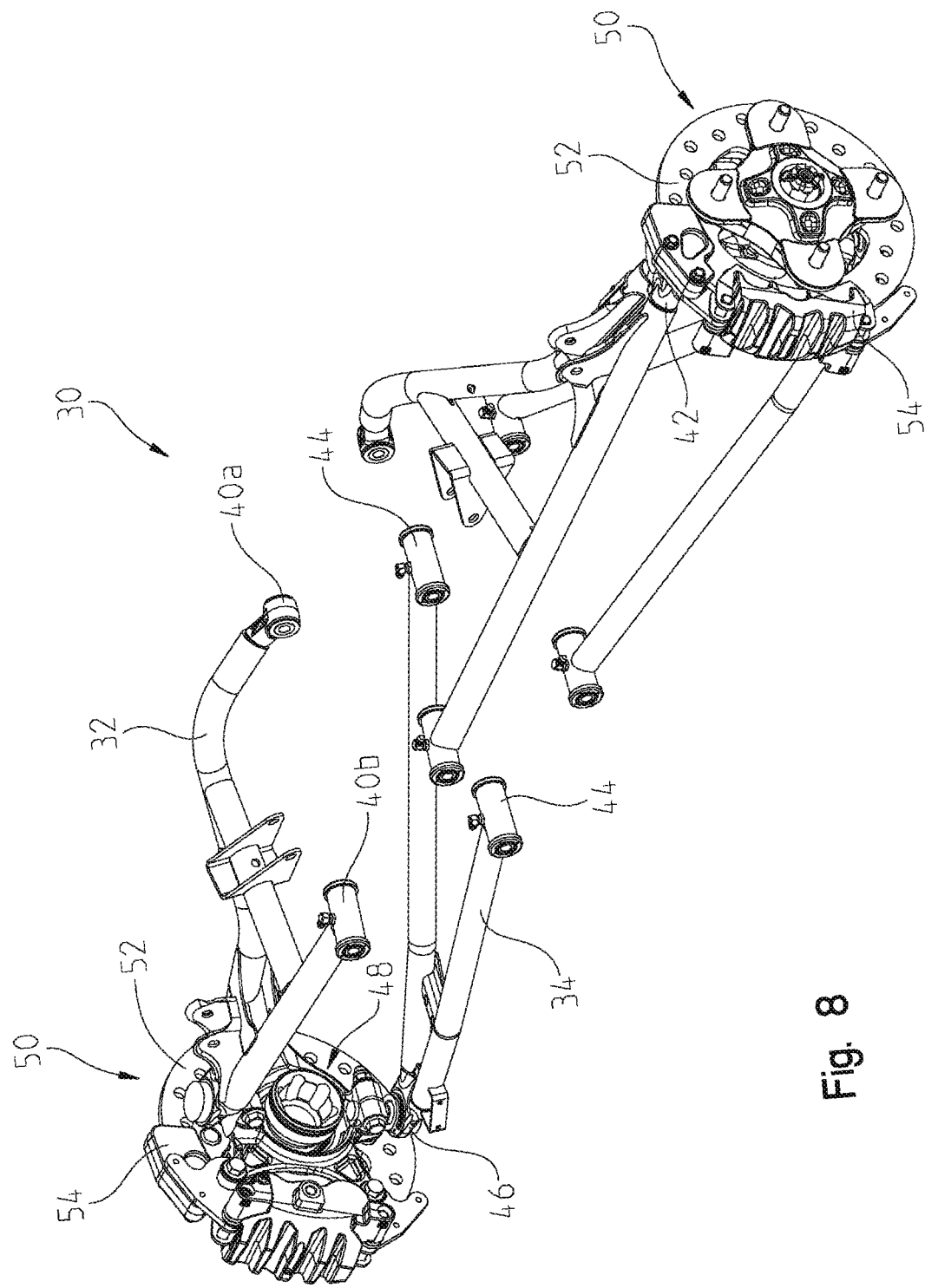
FIG. 8 is a front left perspective view of a portion of a front suspension assembly and a front wheel assembly of the vehicle FIG. 1.

Referring to FIG. 8, vehicle 2 includes a front suspension assembly 30 supported by front portion 12 of lower frame assembly 10. Front suspension assembly 30 includes upper control arms 32, lower control arms 34, and linear force elements, illustratively, shock absorbers 36 (FIG. 6). Upper control arms 32 include inner mounting members 40a, 40b for coupling to front portion 12 of lower frame assembly 10 and an outer mounting member 42 for coupling to a knuckle 48 of a wheel hub assembly 50. Lower control arms 34 include inner mounting members 44 for coupling to front portion 12 of lower frame assembly 10 and an outer mounting member 46 for also coupling to knuckle 48 of wheel hub assembly 50.

Figure 9A:
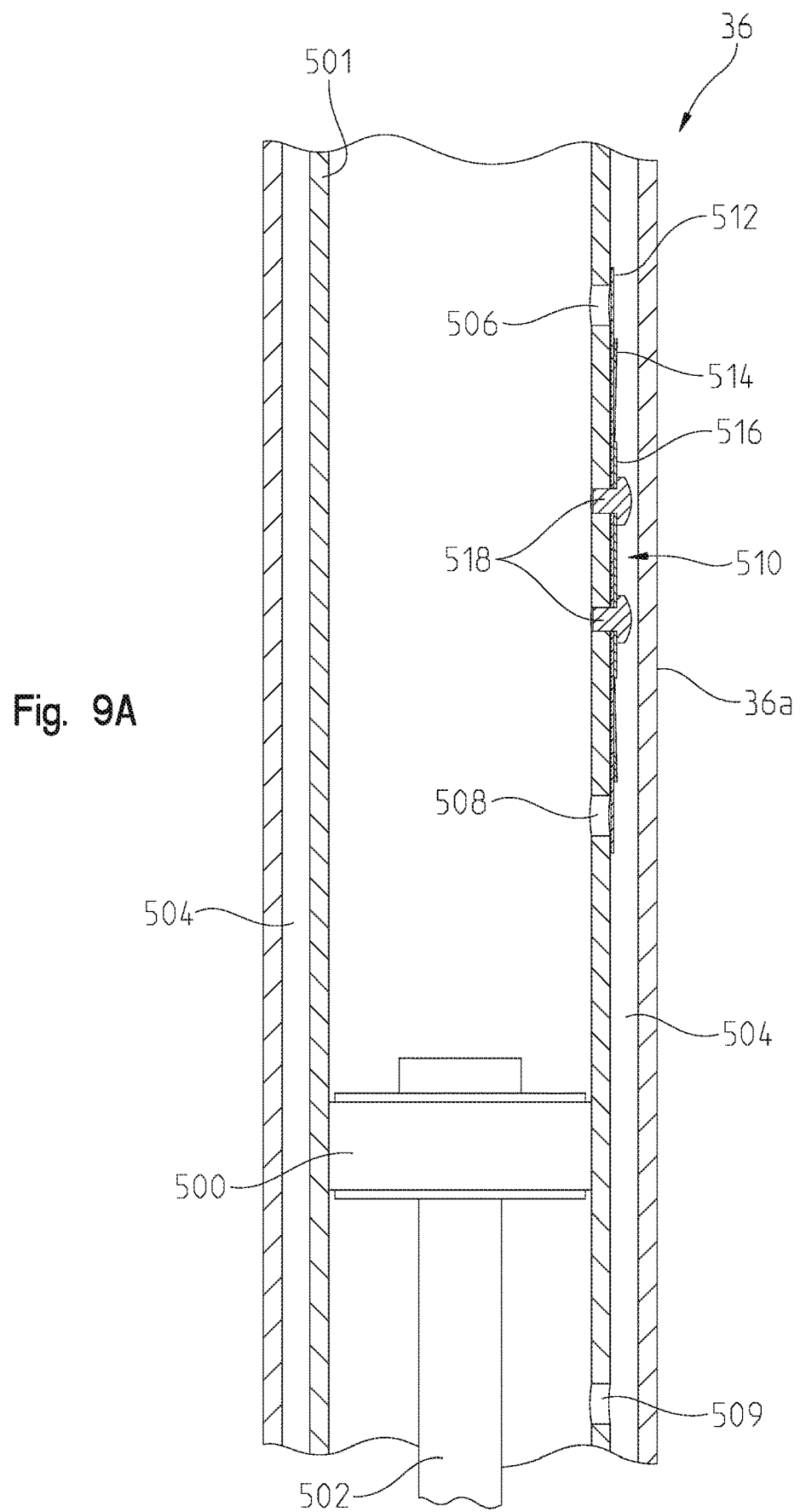
FIG. 9A is a cross-sectional view of a shock absorber of the front suspension assembly.
Figure 9B:
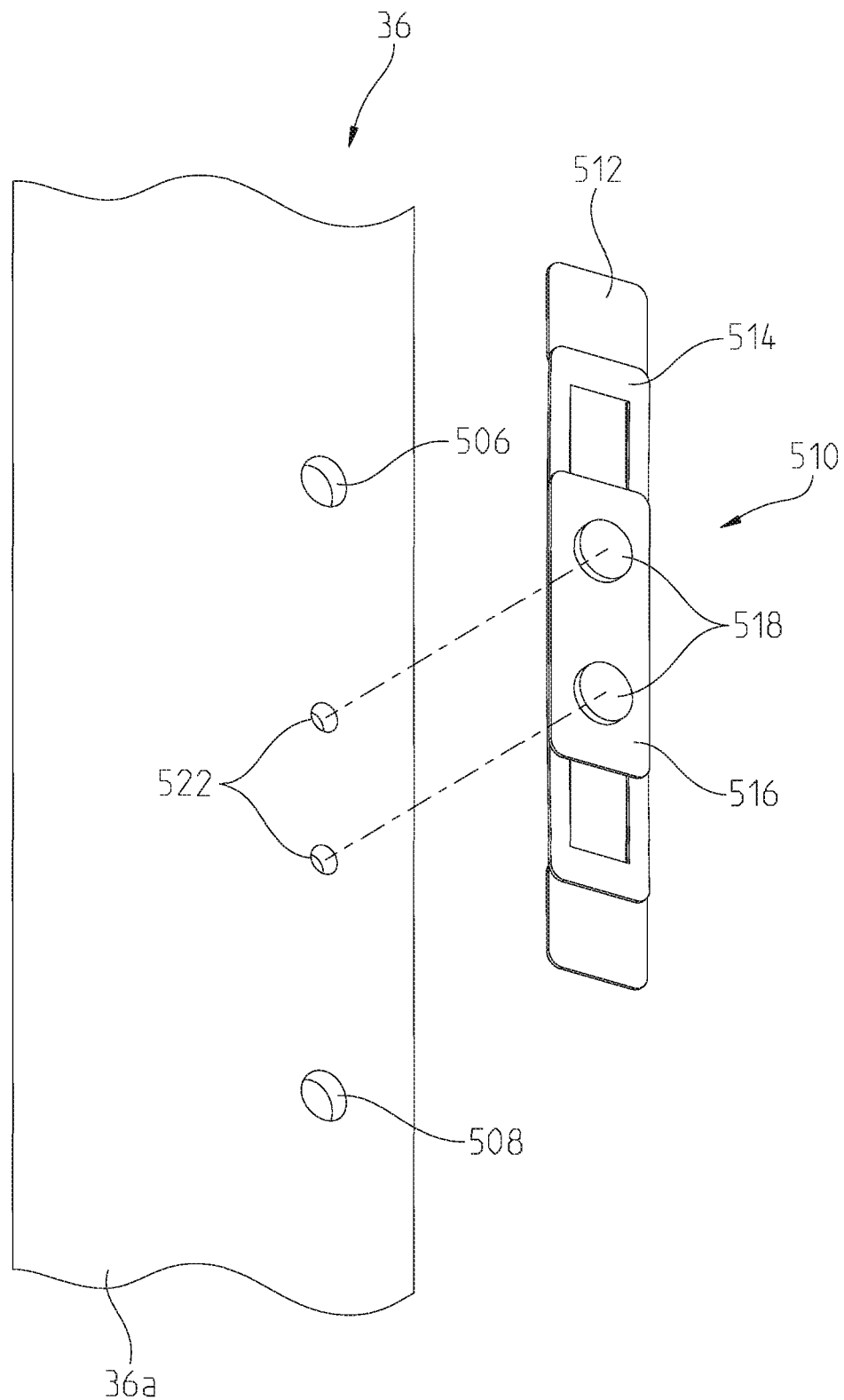
FIG. 9B is an exploded view of a portion of the shock absorber of FIG. 9A including a bypass shim.
Figure 9C:
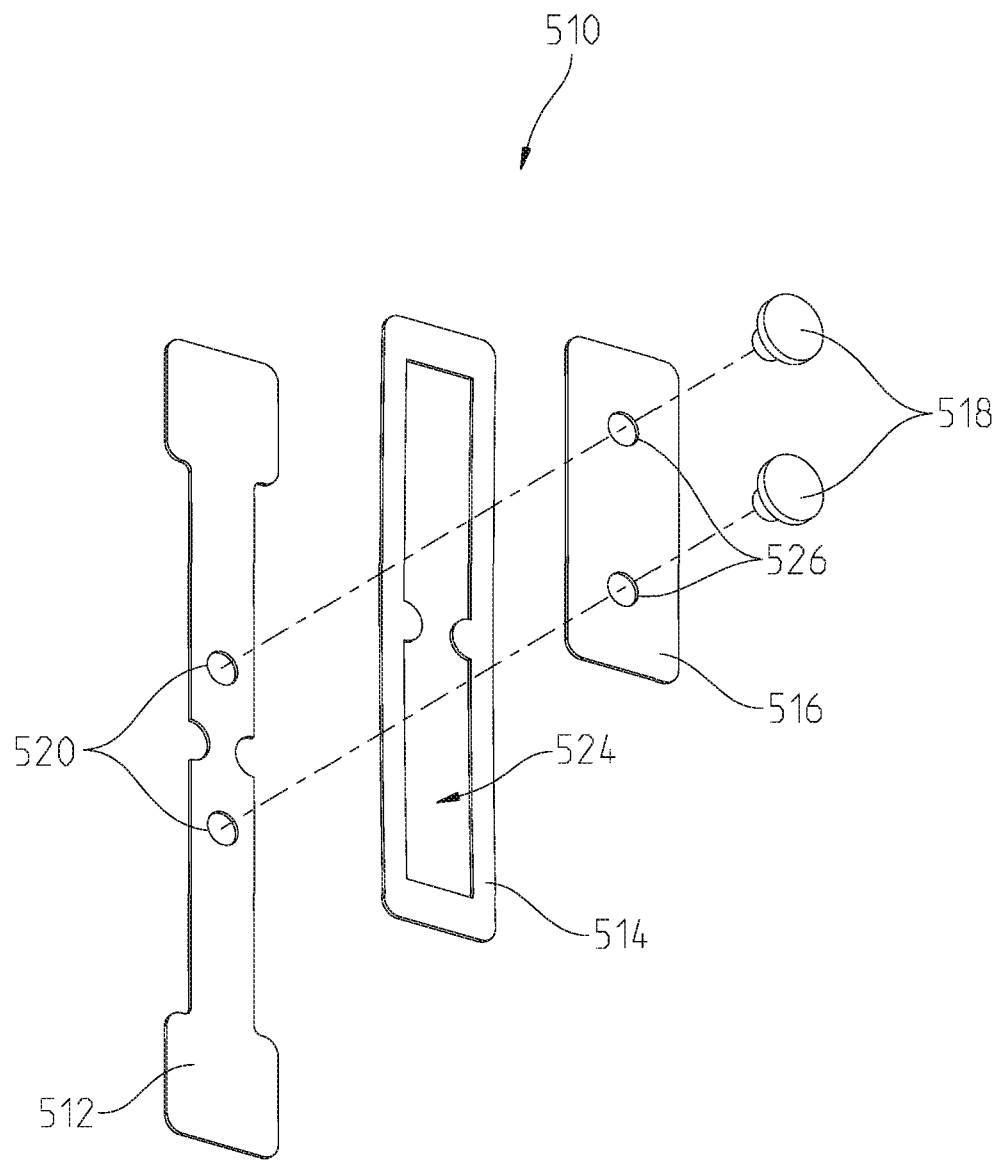
FIG. 9C is an exploded view of the bypass shim of FIG. 9B.

Referring to FIGS. 9A-9C, shock absorbers 36 include an elongate shock cylinder 36a and an over spring portion 36b, as shown in FIG. 6. In one embodiment, shock absorbers 36 may be internal bypass shocks, which include a piston 500, an inner sleeve 501, a piston rod 502, channel 504, an upper passageway 506, a lower passageway 508, a bleed hole 509, and bypass shim assembly 510. Channel 504 extends circumferentially between inner sleeve 501 and shock cylinder 36 and also extends approximately from the upper end of shock cylinder 36a to the lower end thereof. Channel 504 includes passageways 506, 508 and may be cast, extruded, machined, or otherwise formed in shock cylinder 36a.

Referring to FIGS. 9A-9C, bypass shim assembly 510 includes a cover shim or plate 512, a preload shim or plate 514, and a top shim or plate 516. Top shim 516 is outward of both cover shim 512 and preload shim 514 such that preload shim 514 is intermediate cover shim 512 and top shim 516. Top shim 516 may have a thickness less than, equal to, or greater than the thickness of cover shim 512 and preload shim 514. Additionally, the length of top shim 516 may vary to accommodate various parameters of shock absorber 36. Top shim 516 is coupled to shock cylinder 36a through fasteners 518 which extend through apertures 526 of top shim 516 and into apertures 522 of shock cylinder 36a.

Cover shim 512 directly abuts and contacts shock cylinder 36a and is coupled to shock cylinder with fasteners 518 which extend through apertures 520 in cover shim 512 and apertures 522 in shock cylinder 36a. Additionally, the length of cover shim 512 may be greater than the length of preload shim 514 and top shim 516.

Preload shim 514 is positioned adjacent cover shim 512 such that cover shim 512 is intermediate preload shim 514 and shock cylinder 36a. Preload shim 514 includes a center opening 524 through which fasteners 518 extend when coupling to shock cylinder 36a. As shown in FIG. 9A, preload shim 514 tapers toward a middle portion such that the longitudinal ends of preload shim 514 have a thickness equal to the thickness of cover shim 512, however, the middle portion of preload shim 514 has a thickness less than that of the longitudinal ends and cover shim 512. In this way, preload shim 514 may have a high preload force, which in combination with a low spring rate, allows for effective damping to control pitch and roll movements of vehicle 2 but also is configured for "blow off," or a large flow of oil volume, when vehicle 2 contacts an object. Bypass shim assembly 510 also may reduce or eliminate bleeds within shock cylinder 36a.

In operation, when vehicle 2 is traversing level terrain, gases, hydraulic fluid, or other fluid within shock cylinder 36a flows through passageways 506, 508, thereby bypassing the damping system of shock absorbers 36. The fluid then travels downward through channels 504 and through bleed hole 509 which allows fluid to then flow along the underside of piston 500. However, as shock absorber 36 compresses, for example during jounce when vehicle 2 contacts an object, the fluid then flows from the upper end of shock cylinder 36a and along the upper surface of piston 500. During rebound, fluid bypasses piston 500 by flowing downwardly through shock cylinder 36a, through bleed hole 509, and upwardly through channels 504. Fluid may then flow into inner sleeve 501 through additional bleed holes at a top portion of inner sleeve 501. Additional details of shock absorbers 36 may be disclosed in International Patent Application No. PCT/US13/64516, filed on Oct. 11, 2013, the complete disclosure of which is expressly incorporated by reference herein.

Figure 10A:
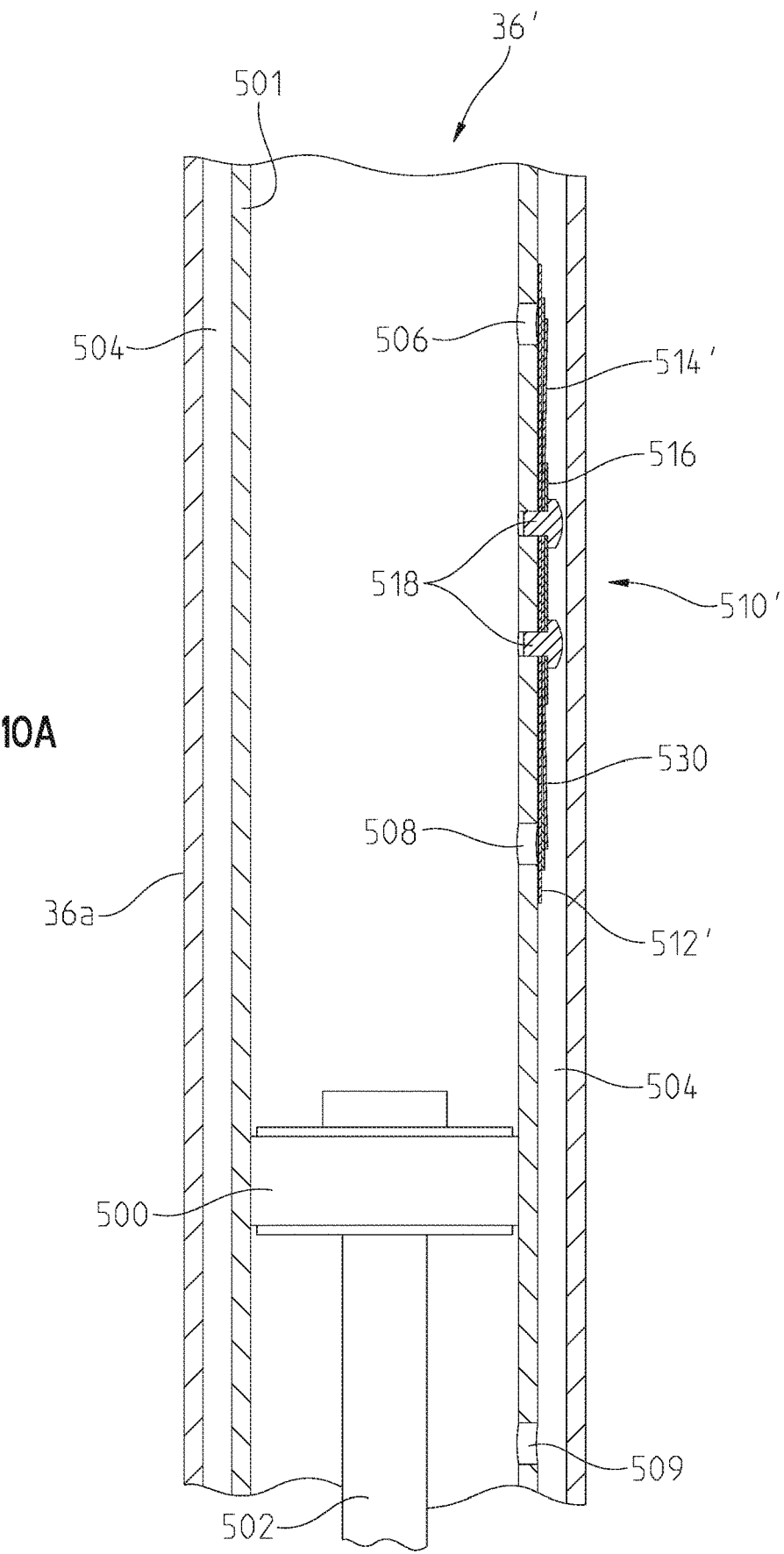
FIG. 10A is an alternative embodiment shock absorber of the front suspension assembly.
Figure 10B:
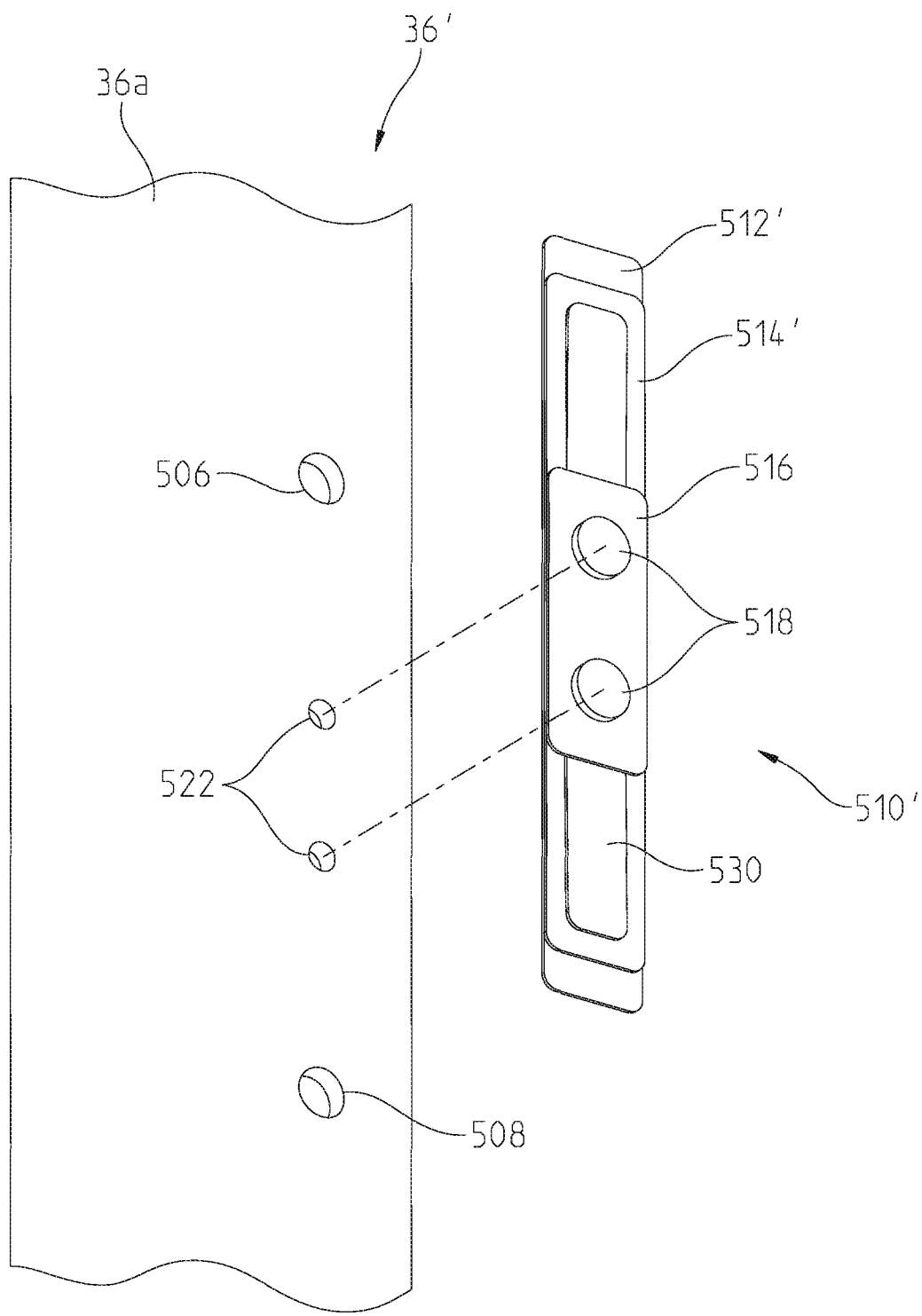
FIG. 10B is an exploded view of a portion of the shock absorber of FIG. 10A including an alternative embodiment bypass shim.
Figure 10C:
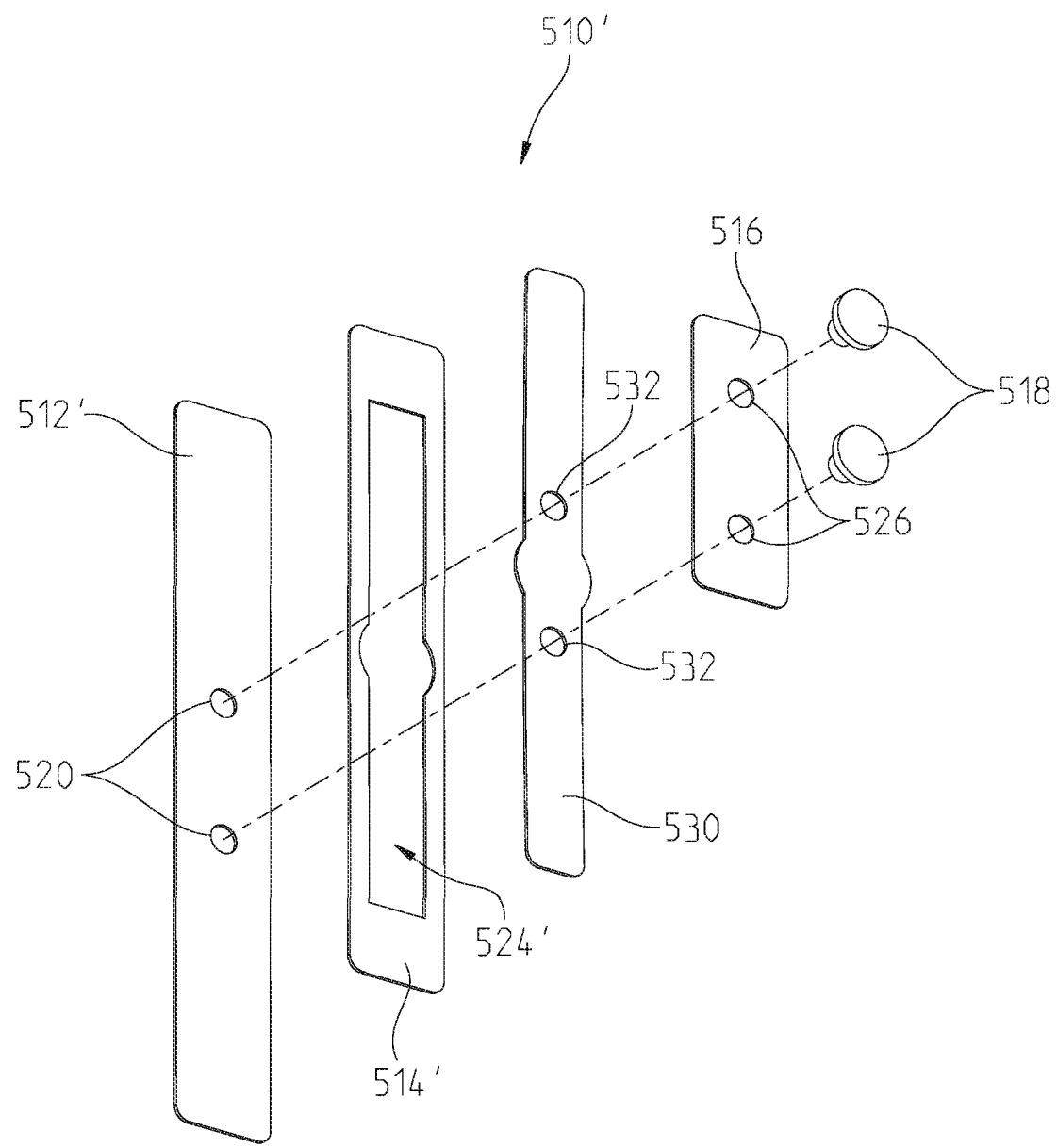
FIG. 10C is an exploded view of the bypass shim of FIG. 10B.

Referring to FIGS. 10A-10C, an alternative embodiment of bypass shim assembly 510 is shown as bypass shim assembly 510' and includes a cover shim 512', a preload shim 514', a spring shim or plate 530, and top shim 516. Spring shim 530 is positioned intermediate preload shim 514' and top shim 516 and includes apertures 532 for receiving fasteners 518. Spring shim 530 may have a low spring rate, which in combination with preload shim 514', allows for effective damping to control pitch and roll movements of vehicle 2 but also is configured for "blow off," or a large flow of oil volume, when vehicle 2 contacts an object.

As shown in FIGS. 10A-10C, top shim 516 is outward of cover shim 512', spring shim 530, and preload shim 514'. Top shim 516 may have a thickness less than, equal to, or greater than the thickness of cover shim 512', spring shim 530, and preload shim 514' and length which may vary to accommodate various parameters of shock absorbers 36. Top shim 516 is coupled to shock cylinder 36a through fasteners 518 which extend through apertures 526 of top shim 516. Cover shim 512' directly abuts and contacts shock cylinder 36a and is coupled to shock cylinder with fasteners 518 which extend through apertures 520 in cover shim 512' and apertures 522 in shock cylinder 36a. Additionally, the length of cover shim 512' may be greater than the length of preload shim 514', spring shim 530, and top shim 516.

Preload shim 514' is positioned adjacent cover shim 512' and includes a center opening 524' through which fasteners 518 extend through when coupling to shock cylinder 36a. As shown in FIG. 10A, preload shim 514' tapers toward a middle portion such that the longitudinal ends of preload shim 514' have a thickness equal to the thickness of spring shim 530, however, the middle portion of preload shim 514' has a thickness less than that of the longitudinal ends and spring shim 530. In this way, preload shim 514' may have a high preload force, and in combination with the low spring rate of spring shim 530, allows for effective damping to control pitch and roll movements of vehicle 2 but also is configured for "blow off," or a large flow of oil volume, when vehicle 2 contacts an object. Bypass shim assembly 510' also may reduce or eliminate bleeds within shock cylinder 36a.

Figure 11A:
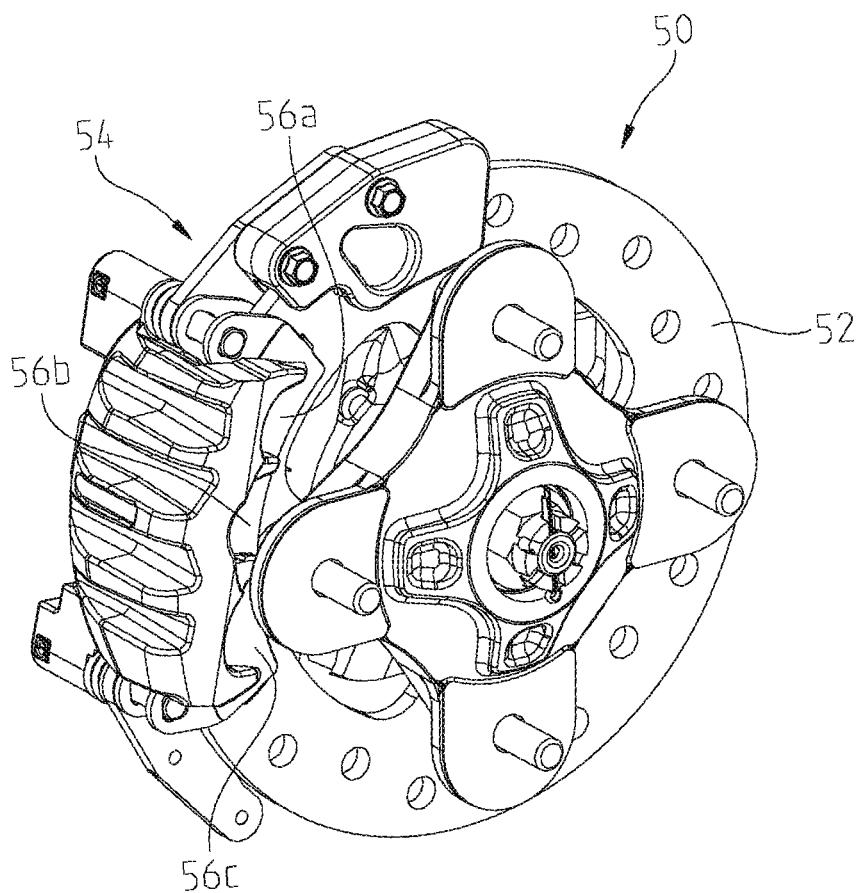
FIG. 11A is a front right perspective view of a portion of the wheel assembly of FIG. 8 with a brake caliper.
Figure 11B:
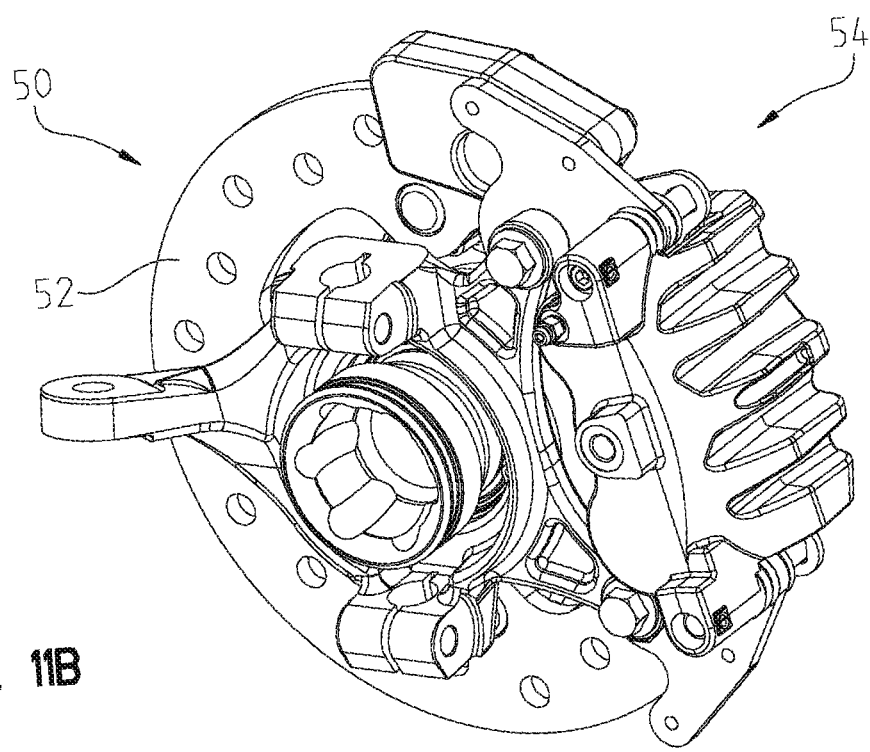
FIG. 11B is a rear right perspective view of the wheel assembly and brake caliper of FIG. 9.
Figure 12:
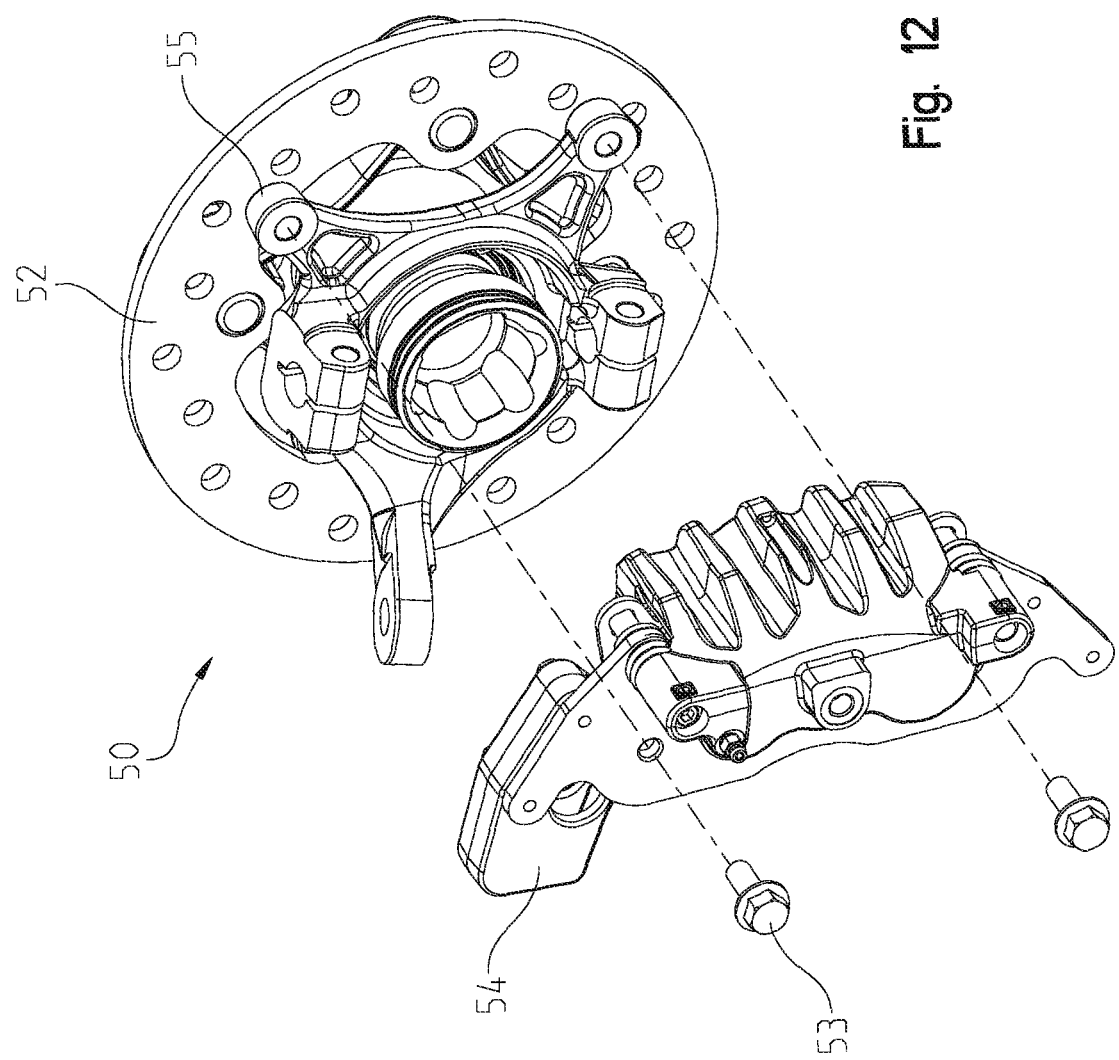
FIG. 12 is an exploded view of the wheel assembly and brake caliper of FIG. 10.
Figure 13A:
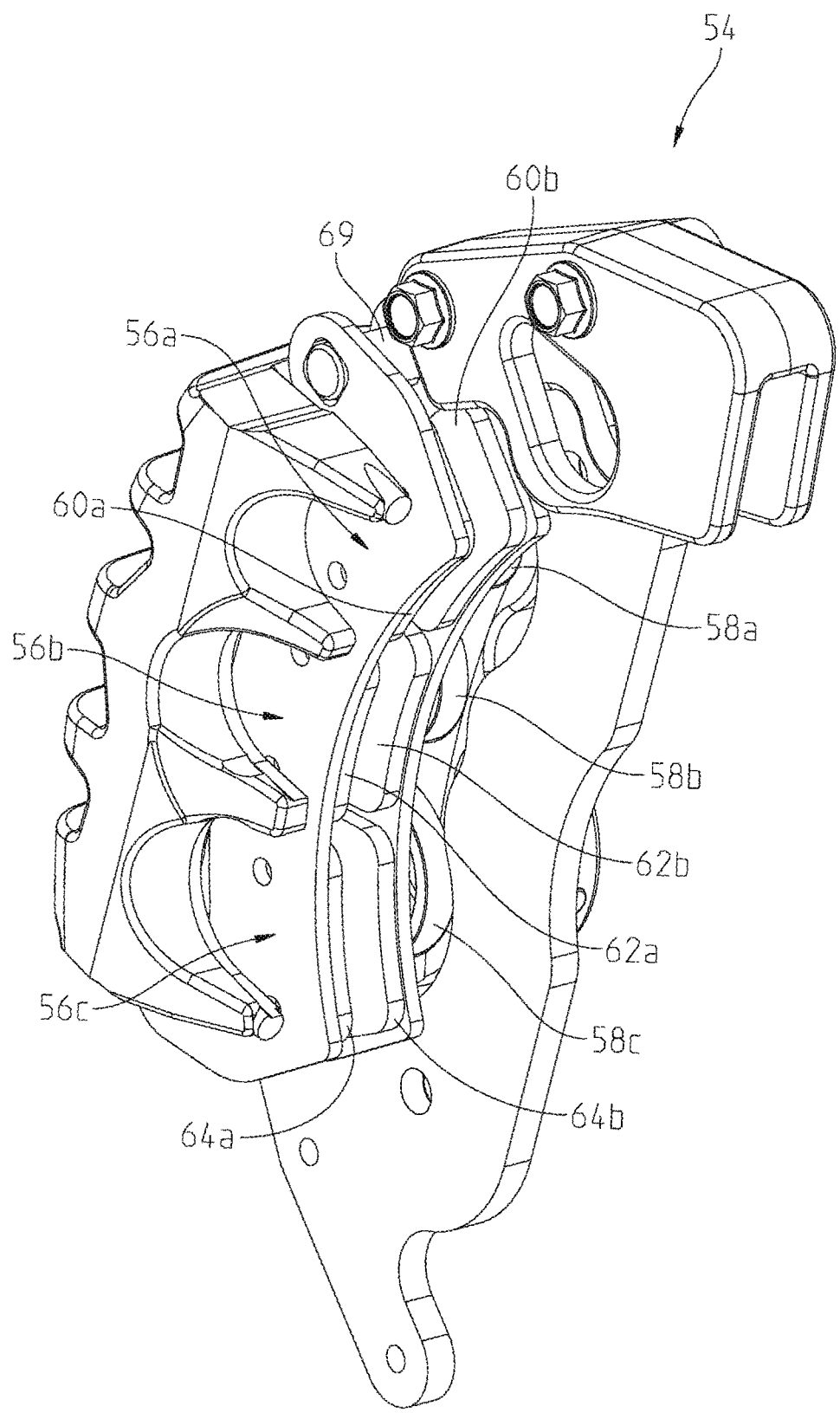
FIG. 13A is a perspective view of the brake caliper of FIG. 11.
Figure 13B:
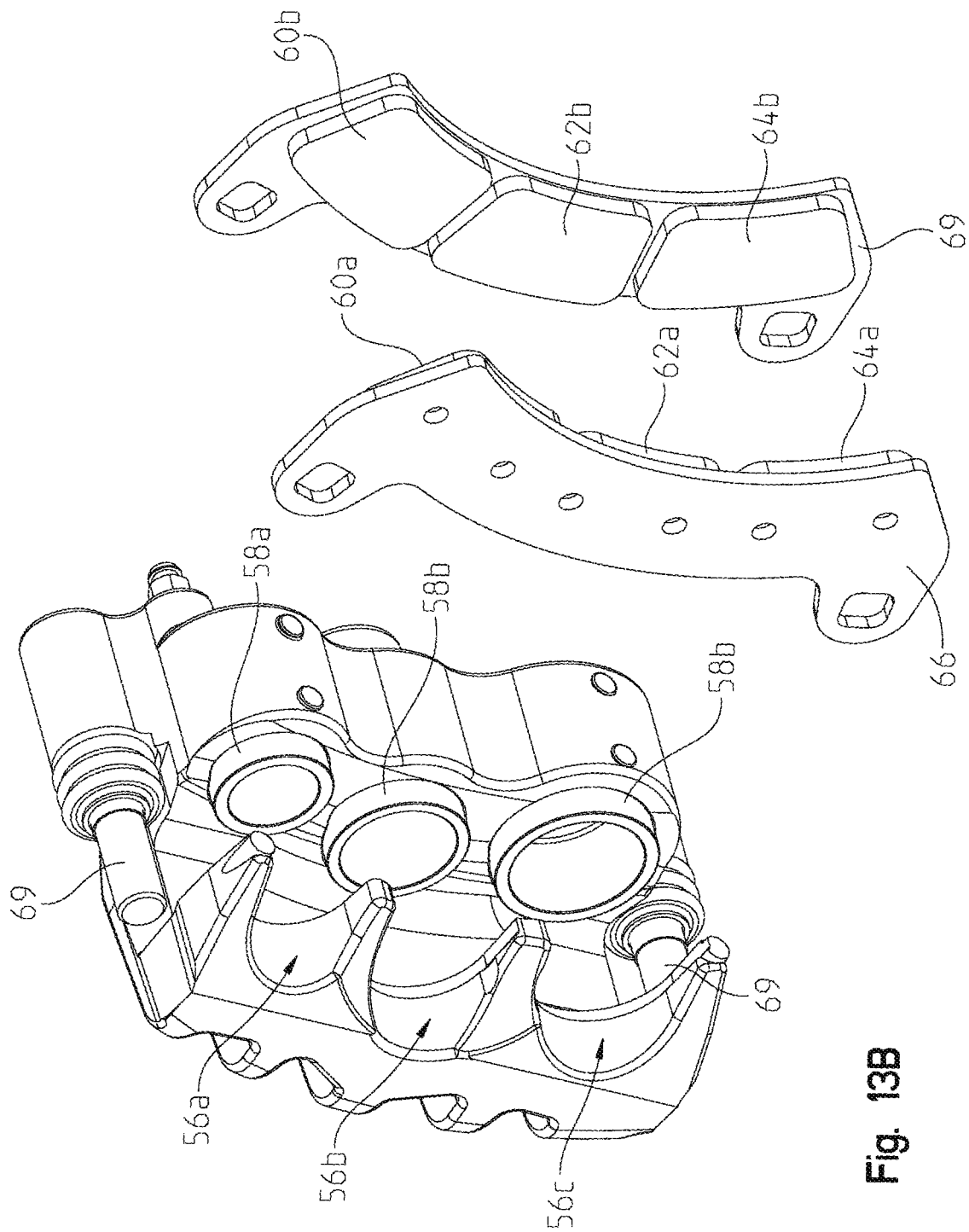
FIG. 13B is an exploded view of the brake caliper of FIG. 12.

As shown in FIGS. 11A-13B, wheel hub assembly 50 includes a brake disc or rotor 52 which is operably coupled to a brake caliper 54. Brake disc 52 may be comprised of stainless steel and may be approximately 7.5 mm thick. As shown in FIGS. 11A and 11B, brake caliper 54 is coupled to brake disc 52 with fasteners 53, which are received through bosses 55 on brake disc 52. Illustrative brake caliper 54 includes three individual piston systems 56, and more particularly, a first piston system 56a, a second piston system 56b, and a third piston system 56c. Each of piston systems 56a, 56b, and 56c includes a respective piston 58a, 58b, and 58c. The diameters of pistons 58a, 58b, and 58c may be the same or may vary. For example, as shown in FIGS. 13A and 13B, the diameter of piston is 58a is less than the diameter of pistons 58b, 58c. Additionally, the diameter of illustrative piston 58b is less than the diameter of piston 58c. In one embodiment, the diameter of piston 58a may be 23-28 mm and, illustratively is 25.4 mm, the diameter of piston 58b may be 28-32 mm and, illustratively, 30.2 mm, and the diameter of piston 58c may be 33-37 mm and, illustratively is 35 mm. Varying the diameter of pistons 58a, 58b, 58c allows for the braking parameters to be tuned to accommodate various conditions.

Referring to FIGS. 13A and 13B, first piston system 56a includes two separate brake pads 60a and 60b, second piston system 56b includes two separate brake pads 62a and 62b, and third piston system 56b includes two separate brake pads 64a and 64b. Each of pistons 58a, 58b, and 58c is aligned with one pair of brake pads 60a and 60b, 62a and 62b, and 64a and 64b, respectively. Brake pads 60a, 60b, 62a, 62b, 64a, 64b are discontinuous and, as shown, are not directly coupled to adjacent brake pads. As with pistons 58a, 58b, 58c, the size of brake pads 60a, 60b, 62a, 62b, 64a, 64b may vary from each other, which allows for further tuning of the braking parameters of vehicle 2. Brake pads 60a, 62a, 64a are coupled to a plate 66 and pads 60b, 62b, 64b are coupled to a plate 68. One or both of plates 66, 68 may slide relative to brake disc 52 in order to slow or stop the rotation of front wheels 6. More particularly, one or both of plates 66, 68 may slide along slide pins 69 in order to effect vehicle braking.

By providing three pistons 58a, 58b, and 58c and three respective sets of brake pads 60a and 60b, 62a and 62b, and 64a and 64b, the size of brake caliper 54 remains compact while providing sufficient braking for an off-road vehicle on various terrain. In one embodiment, brake caliper 54 is operably coupled to a master cylinder and may be configured to provide braking power to less than all of pistons 58a, 58b, 58c at any given time, or alternatively, may be configured to provide braking power to all three pistons 58a, 58b, 58c simultaneously to increase braking power. Additionally, the triple-piston configuration of brake caliper 54 allows brake pads 60a and 60b, 62a and 62b, and 64a and 64b to wear more evenly. The triple-piston configuration of brake caliper 54 also may slow the increase in temperature of brake disc 52 and brake caliper 54 during operation thereof.

Rear wheels 8 may also include hub assemblies similar to hub assemblies 50, including a brake disc and a triple-piston brake caliper. Alternatively, rear wheels 8 may include dual-piston calipers.

Figure 14:
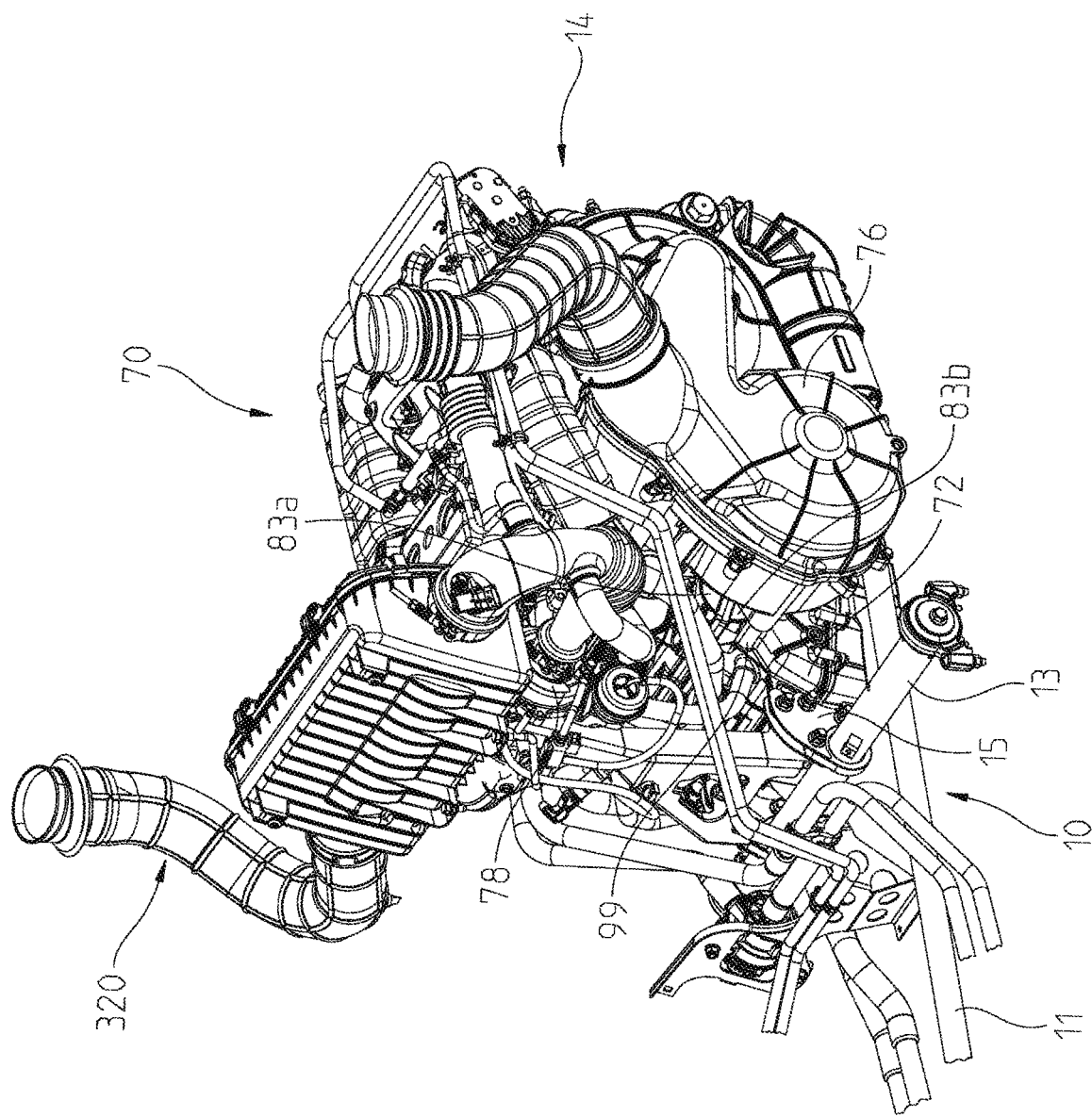
FIG. 14 is a front left perspective view of a powertrain assembly of the vehicle of FIG. 1.
Figure 15:
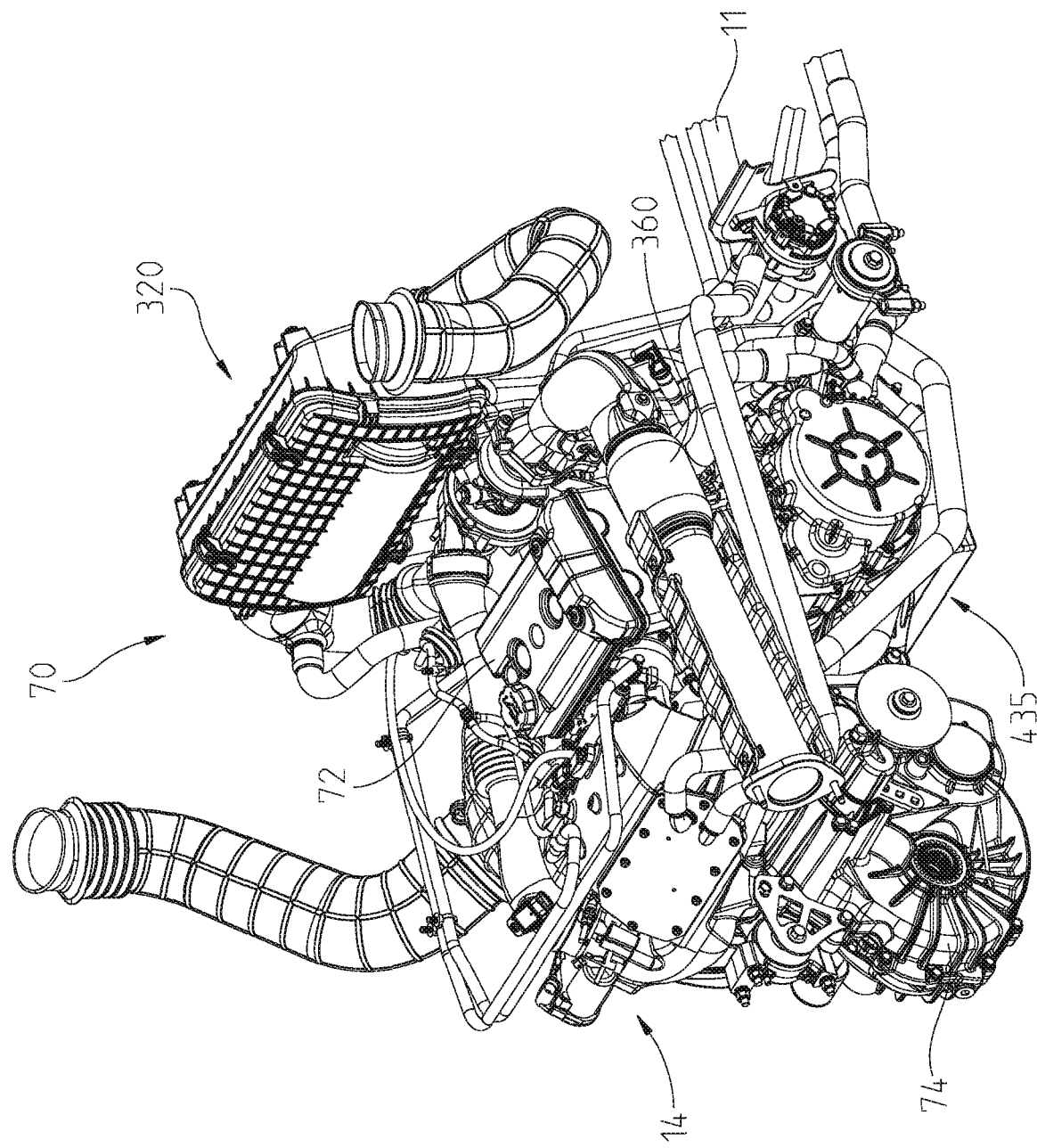
FIG. 15 is a right rear perspective view of the powertrain assembly of FIG. 14.

Referring to FIGS. 14 and 15, vehicle 2 further includes a powertrain assembly 70 which is supported by rear portion 14 of lower frame assembly 10 and includes an engine 72, a shiftable transmission 74, a continuously variable transmission ("CVT") 76, and a forced-air inducer, illustratively a gaseous charger 78. In one embodiment, gaseous charger 78 is a turbocharger, however, alternatively, gaseous charger 78 may be a supercharger or any other similar device. As detailed further herein, powertrain assembly, including gaseous charger 78, is fluidly coupled to an air intake assembly 320 and an exhaust assembly 360 of vehicle 2.

As shown in FIG. 14, powertrain assembly 70 is supported on at least longitudinal frame members 11 and an engine mount 13 of lower frame assembly 10. Longitudinal frame members 11 are generally parallel to centerline $C_L$ of vehicle 2 (FIG. 5) and engine mount 13 extends transversely to centerline $C_L$ and longitudinal frame members 11. Engine mount 13 supports at least engine 72 through brackets 15 which extend from engine mount 13 to engine 72. In particular, brackets are coupled to upper and lower portions of an oil sump 394 of engine 72.

Figure 16:
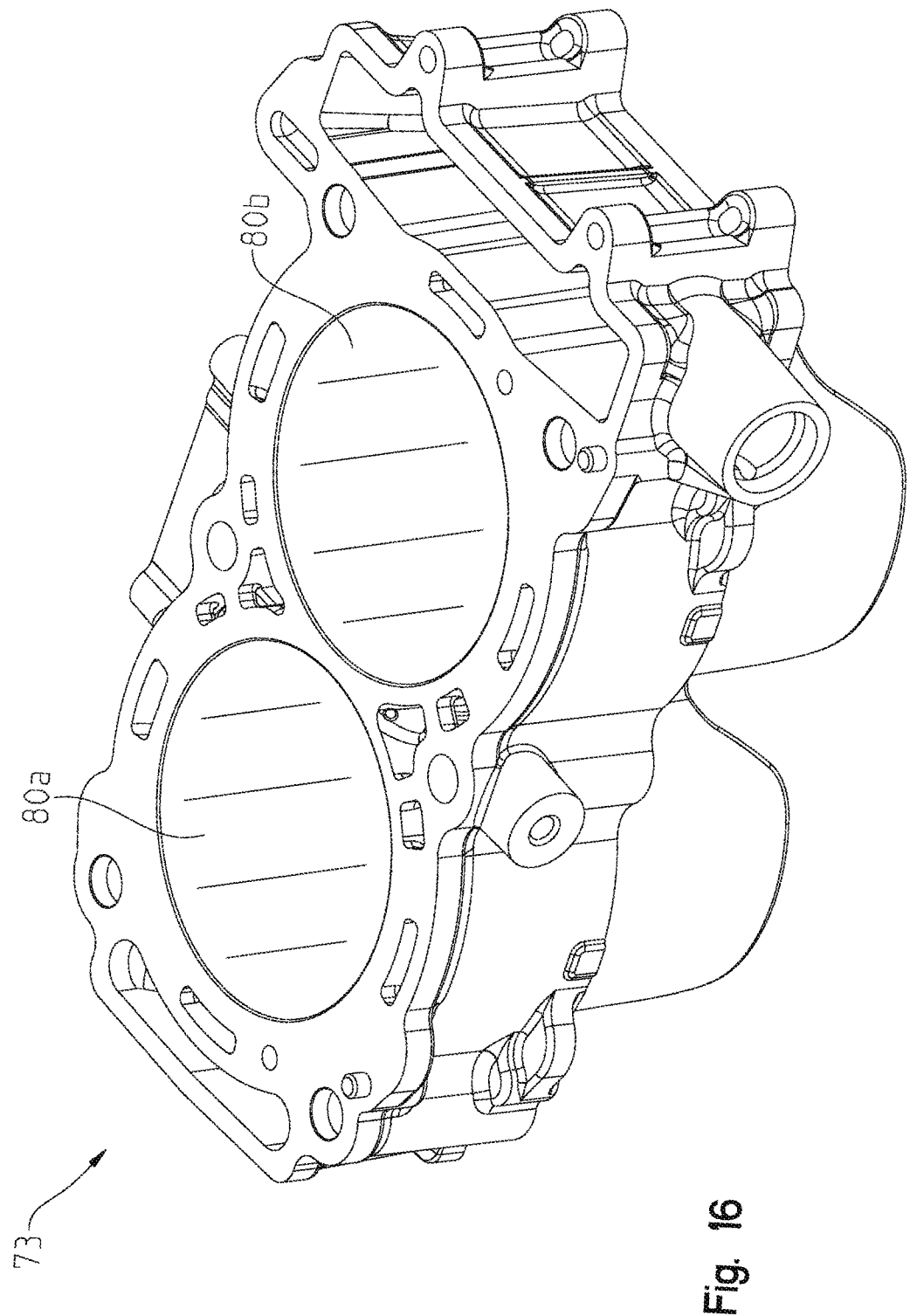
FIG. 16 is a perspective view of a first cylinder and a second cylinder of an engine of the powertrain assembly of FIG. 15.
Figure 17:
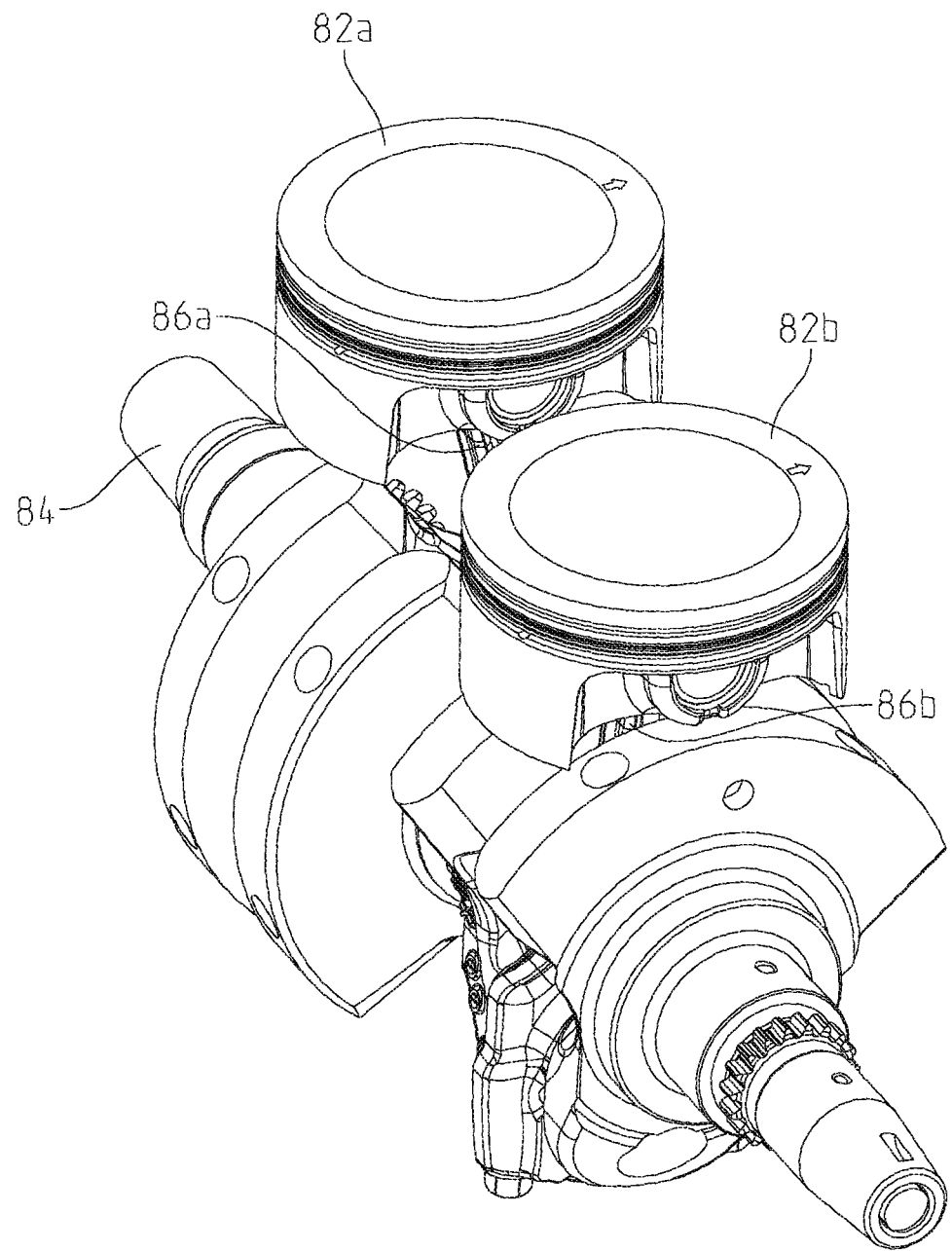
FIG. 17 is a perspective view of a first piston, a second piston, and a crankshaft of the engine of the powertrain assembly of FIG. 15.

Illustrative engine 72 may be 925 cc and be configured for 135 horsepower at approximately 8,000 rpm. As shown in FIG. 16, engine 72 includes a cylinder block 73 with at least one cylinder 80 and a crankshaft 84. As such, in FIG. 14, engine 72 includes a crankcase 83 for enclosing crankshaft 84. Crankcase 83 includes an upper portion 83a and a lower portion 83b. Illustratively, engine 72 is an in-line, dual-cylinder engine having a first cylinder 80a and second cylinder 80b. Cylinders 80 are generally circular in cross-section and are each configured to receive a piston 82. More particularly, as shown in FIG. 17, cylinder 80a may receive a piston 82a and cylinder 80b may receive a piston 82b. Pistons 82 are operably coupled to a crankshaft 84 of engine 72. Piston 82a is coupled to crankshaft 84 through a connecting rod 86a and piston 82b is coupled to crankshaft 84 through a connecting rod 86b. Within cylinder head 73, knock may be monitored and, if sensed, operation of vehicle 2 may be limited to a particular speed until the cause for the knock is corrected.

Figure 19:
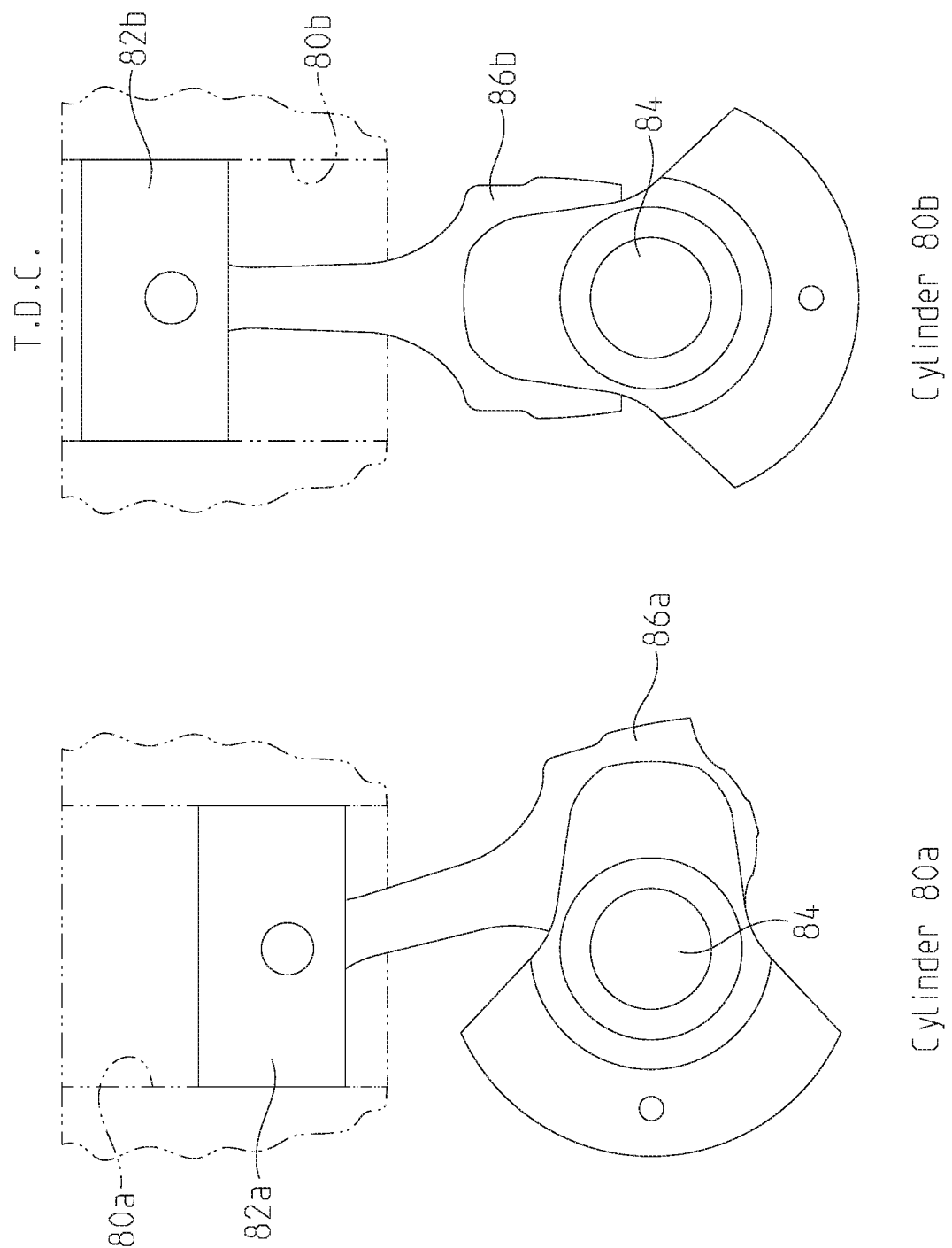
FIG. 19 is a schematic view of the firing timing of the engine of the powertrain assembly of FIG. 15, illustrating the position of the first piston of FIG. 17 when the crankshaft of FIG. 17 has been rotated and the second piston of FIG. 17 is at top dead center.

During operation of engine 72, pistons 82 are configured to reciprocate within cylinders 80 and crankshaft 84 rotates. In one embodiment, engine 72 is configured to operate with a 270-degree firing timing or order, which may be initiated by an engine control unit of powertrain assembly 270. More particularly, as shown in FIG. 18, when piston 82a is at a top dead center position within cylinder 80a, piston 82b is at a position intermediate top dead center and bottom dead center. Illustratively, when piston 82a is at top dead center, or beginning its power stroke, within cylinder 80a, piston 82b within cylinder 80b is midway through its intake stroke. As such, when crankshaft 84 rotates approximately 270 degrees (counterclockwise, as shown), piston 82b will be at top dead center within cylinder 80a and piston 82a will have finished the power stroke and will be midway through its exhaust stroke, as shown in FIG. 19. It is to be understood that the approximately 270-degree firing timing of engine 72 may be adjusted to modify various parameters of powertrain assembly 70 by timing the various positions of pistons 82a, 82b according to different rotations of crankshaft 84. For example, the 270-degree firing timing may refer to rotating crankshaft 84 approximately 250-290 degrees, rather than exactly 270 degrees, to result in appreciably the same piston timing as detailed herein. Such changes to the exact offset may be made to impact forces experienced by bearings and clutches, emissions, vibrations, and durability. In this way, illustrative vehicle 2 is an off-road, side-by-side vehicle which includes a dual-cylinder, in-line engine with a 270-degree firing timing, which may improve emissions for vehicle 2 and decrease vibration in powertrain assembly 70 relative to other firing timing. However, other timings, such as the more traditional 360-degree timing are also envisioned.

Figure 3:
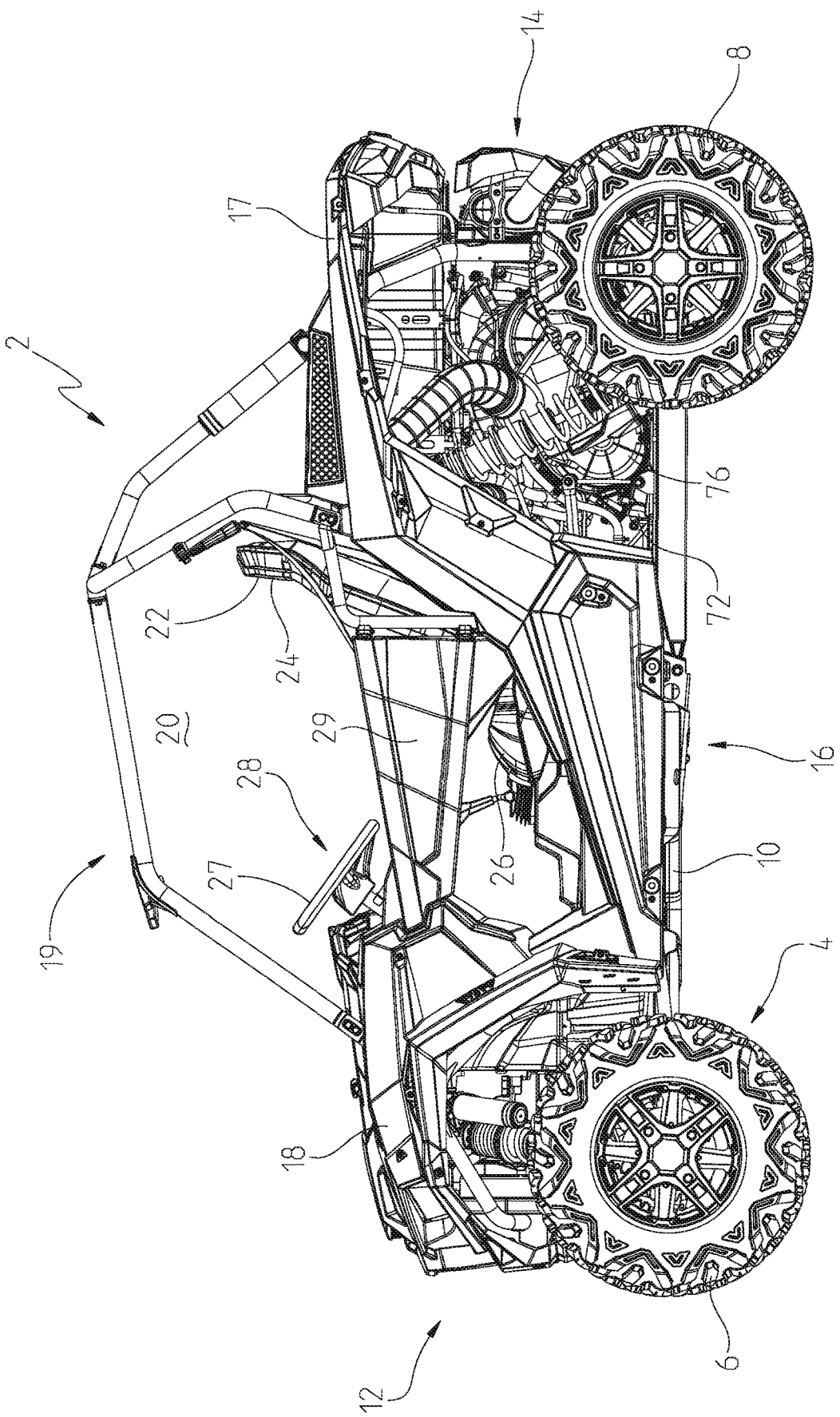
FIG. 3 is a left side view of the vehicle of FIG. 1.
Figure 4:
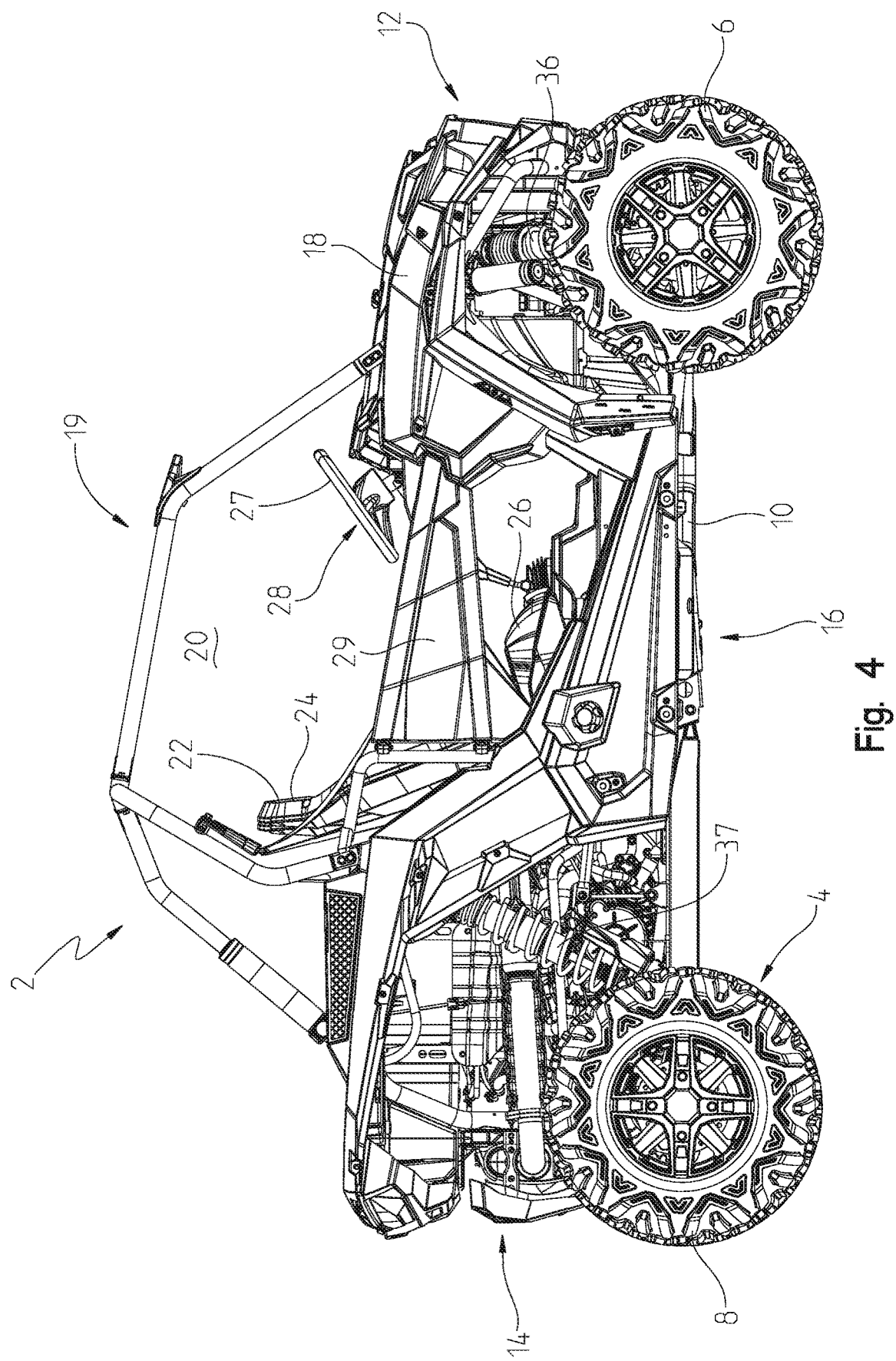
FIG. 4 is a right side view of the vehicle of FIG. 1.
Figure 5:
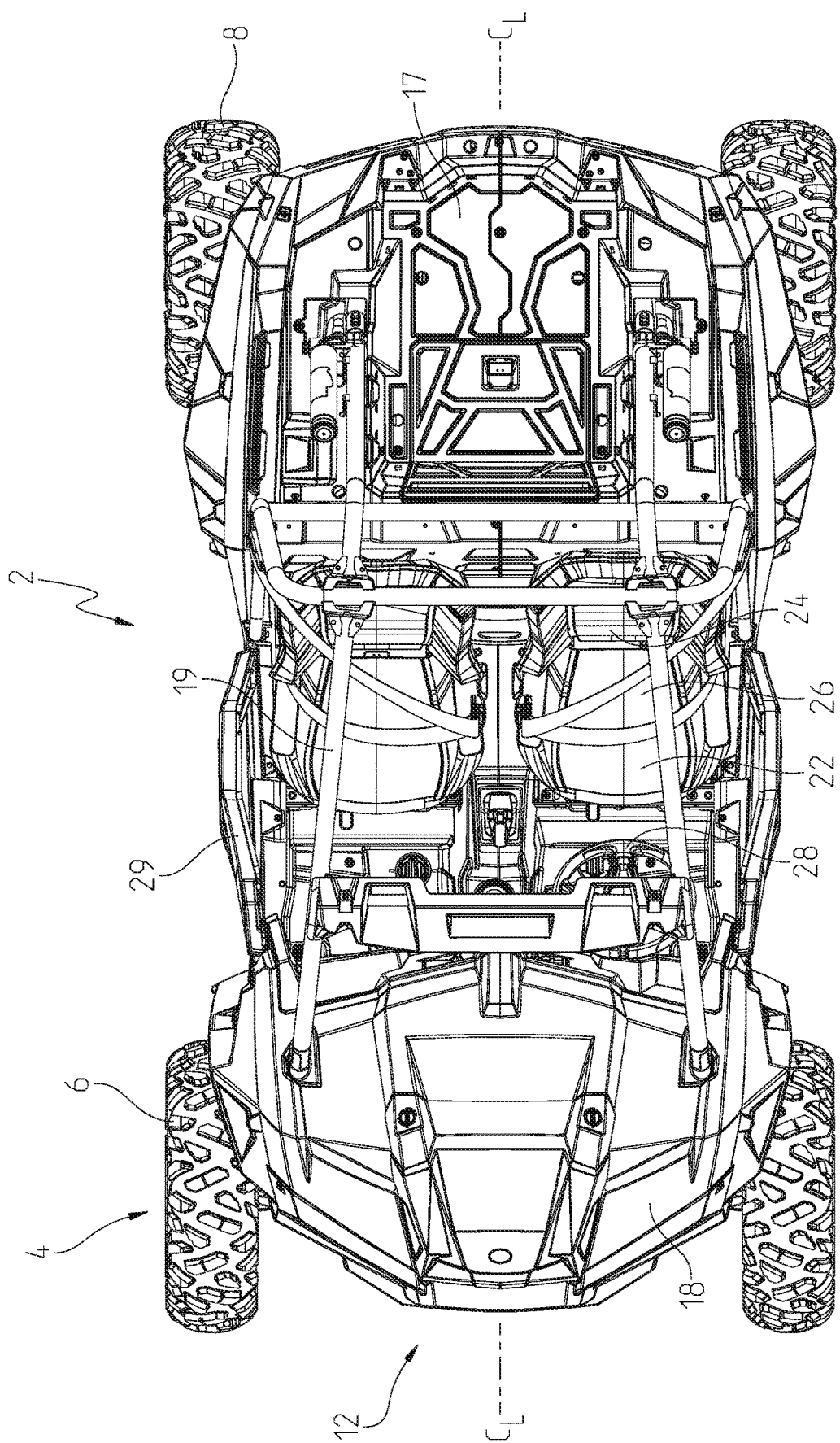
FIG. 5 is a top view of the vehicle of FIG. 1.
Figure 20:
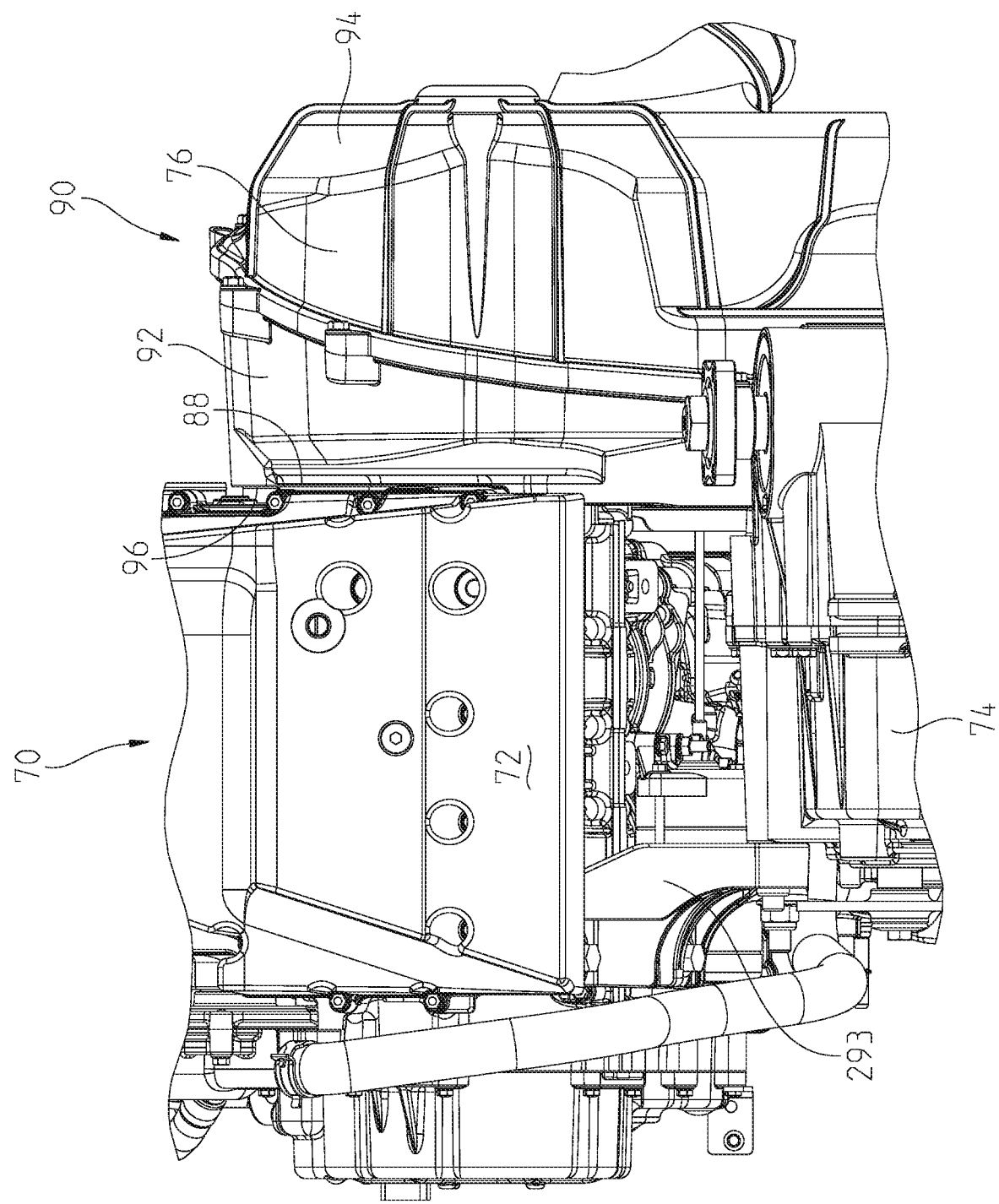
FIG. 20 is a bottom view of a portion of the powertrain assembly of FIG. 15.

As shown from below in FIG. 20, engine 72 is positioned longitudinally forward of at least a portion of shiftable transmission 74. Additionally, engine 72 is positioned at least partially rearward of seating 22, as shown in FIG. 3. Also as shown in FIGS. 3 and 20, CVT 76 is positioned laterally outward from engine 72 and shiftable transmission 74 and extends generally parallel to centerline $C_L$ of vehicle 2 (FIG. 5). More particularly. CVT 76 is positioned along the left side of vehicle 2 and is positioned at least partially rearward of seating 22.

Figure 21:
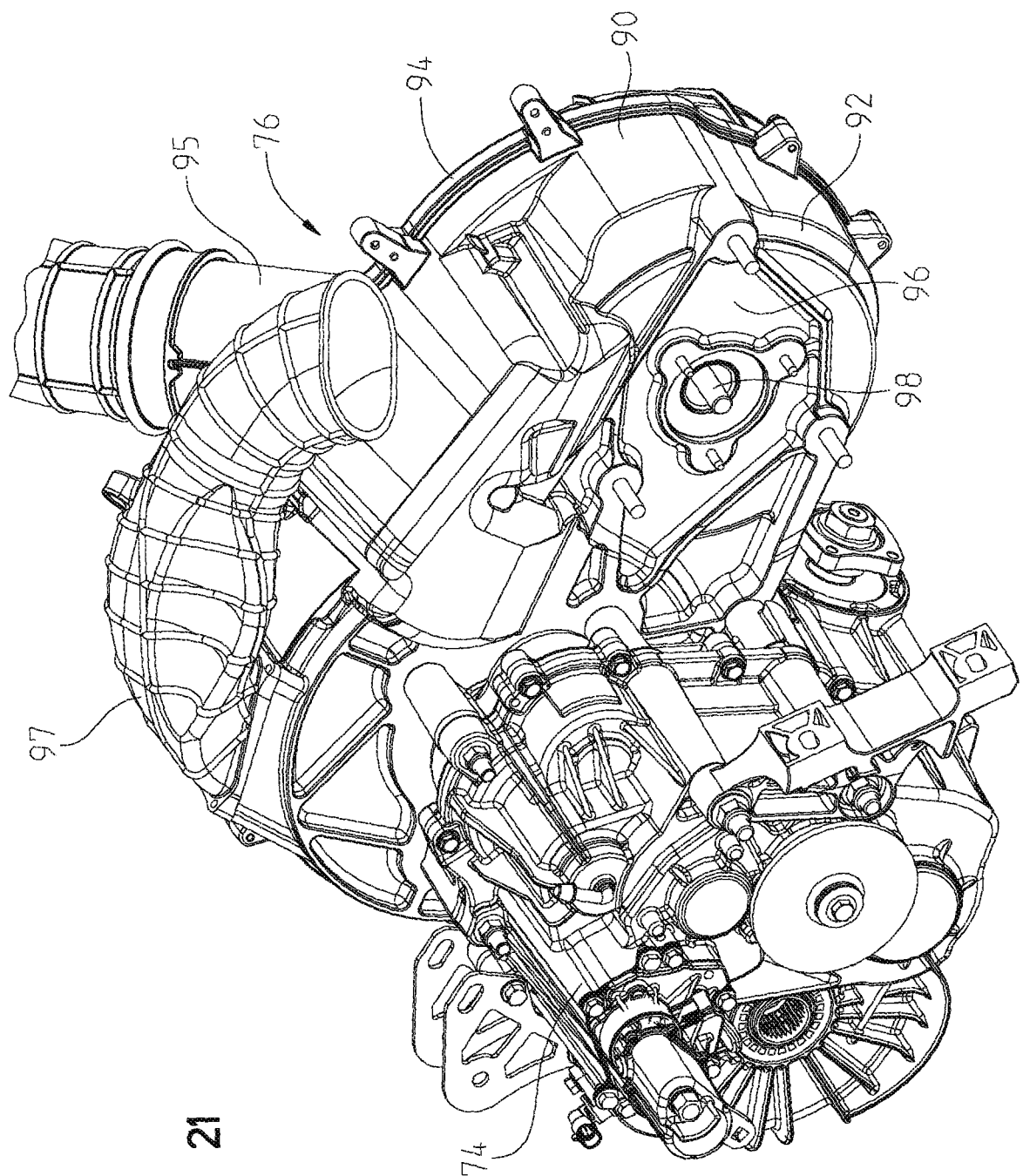
FIG. 21 is a right front perspective view of a continuously variable transmission and a shiftable transmission of the powertrain assembly of FIG. 15.

Engine 72 includes a mounting surface 88 for coupling with CVT 76. In particular, CVT 76 includes a housing 90 having an inner portion or cover 92 and an outer portion or cover 94 coupled together. CVT housing 90 also includes an intake port 95 for receiving air to cool CVT 76 and an exhaust port 97 to exhaust air from CVT 76. Inner cover 92 includes a mounting surface 96 which generally abuts mounting surface 88 of engine 72 to couple engine 72 to CVT 76. More particularly, upper and lower crankcase portions 83a, 83b each include mounting bosses 99 for coupling with CVT 76. As such, engine 72 and CVT 76 are in direct contact with each other which allows for a compact configuration of powertrain assembly 70. Additionally, as shown in FIG. 21, CVT 76 includes a fastener 98, as detailed further herein.

Figure 22:
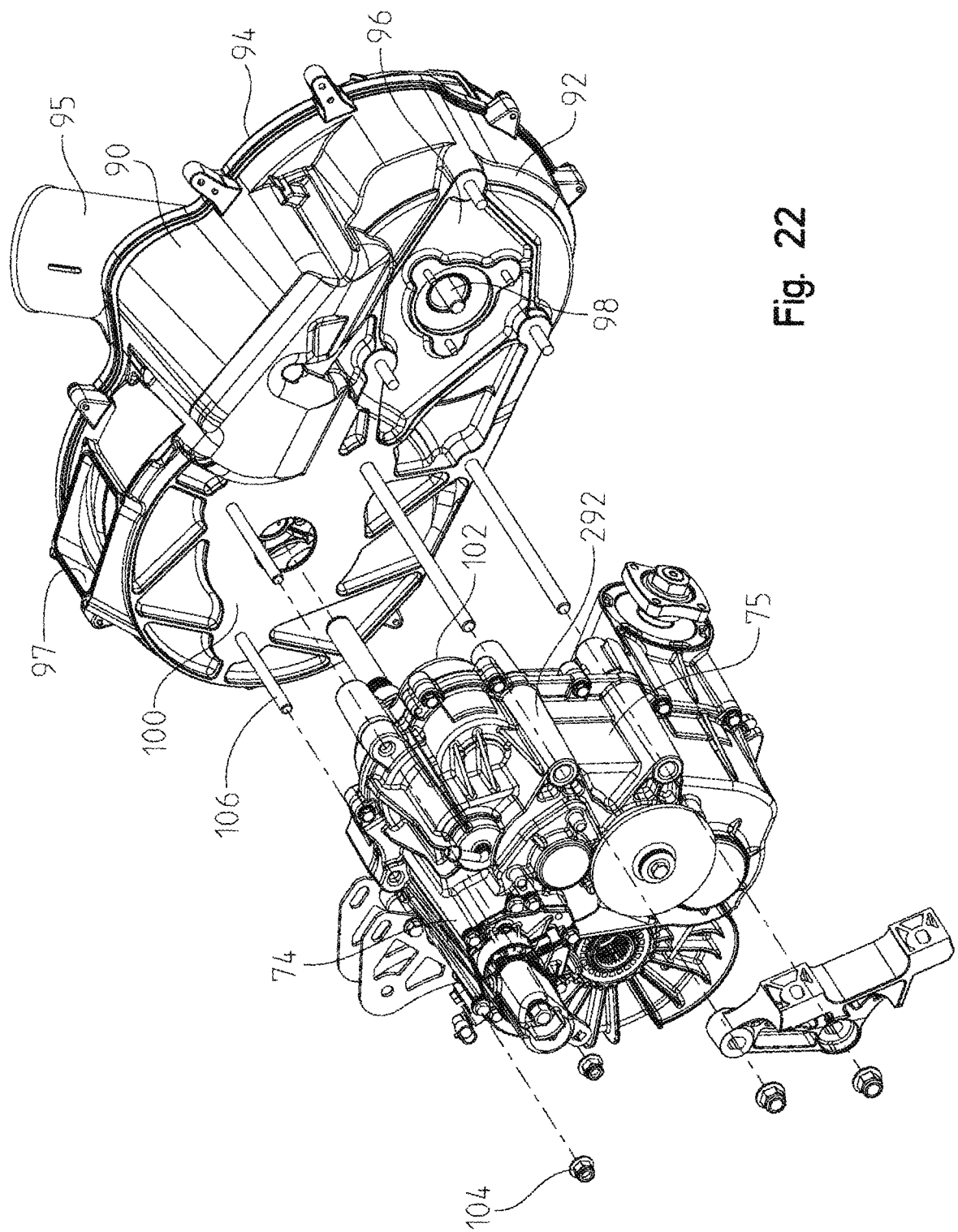
FIG. 22 is an exploded view of the continuously variable transmission and the shiftable transmission of FIG. 21.

Referring to FIG. 22, inner cover 92 of CVT 76 also includes a mounting surface 100 for sealingly coupling to a housing 75 of shiftable transmission 74. More particularly, mounting surface 100 abuts a mounting surface 102 housing 75 to couple CVT 76 thereto. Pins 106 of CVT 76 extend through mounting bosses 292 on shiftable transmission 74 and couple with fasteners 104 to secure CVT 76 to shiftable transmission 74.

Figure 23:
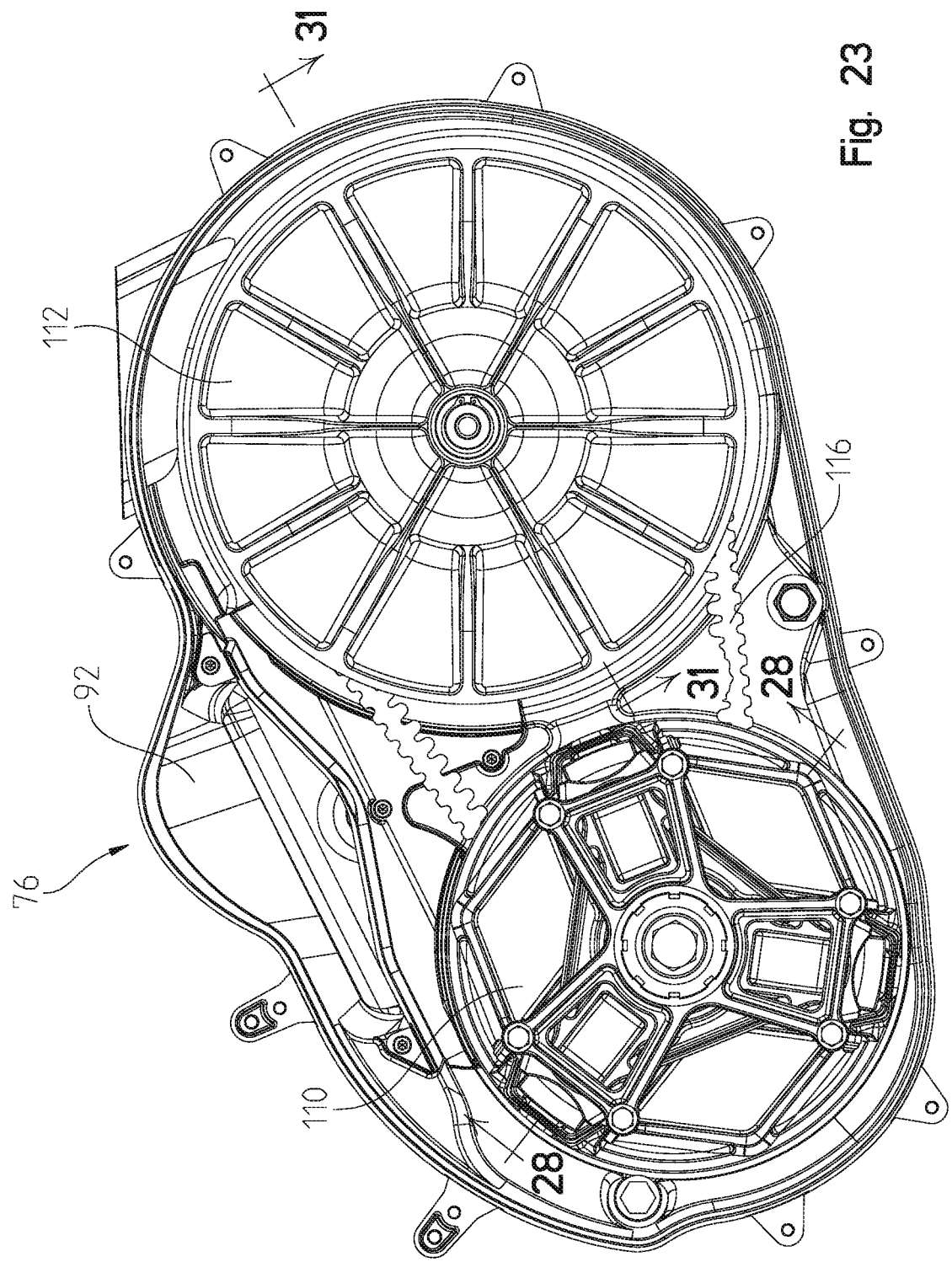
FIG. 23 is a left side view of the continuously variable transmission of FIG. 22, with an outer cover removed.
Figure 24:
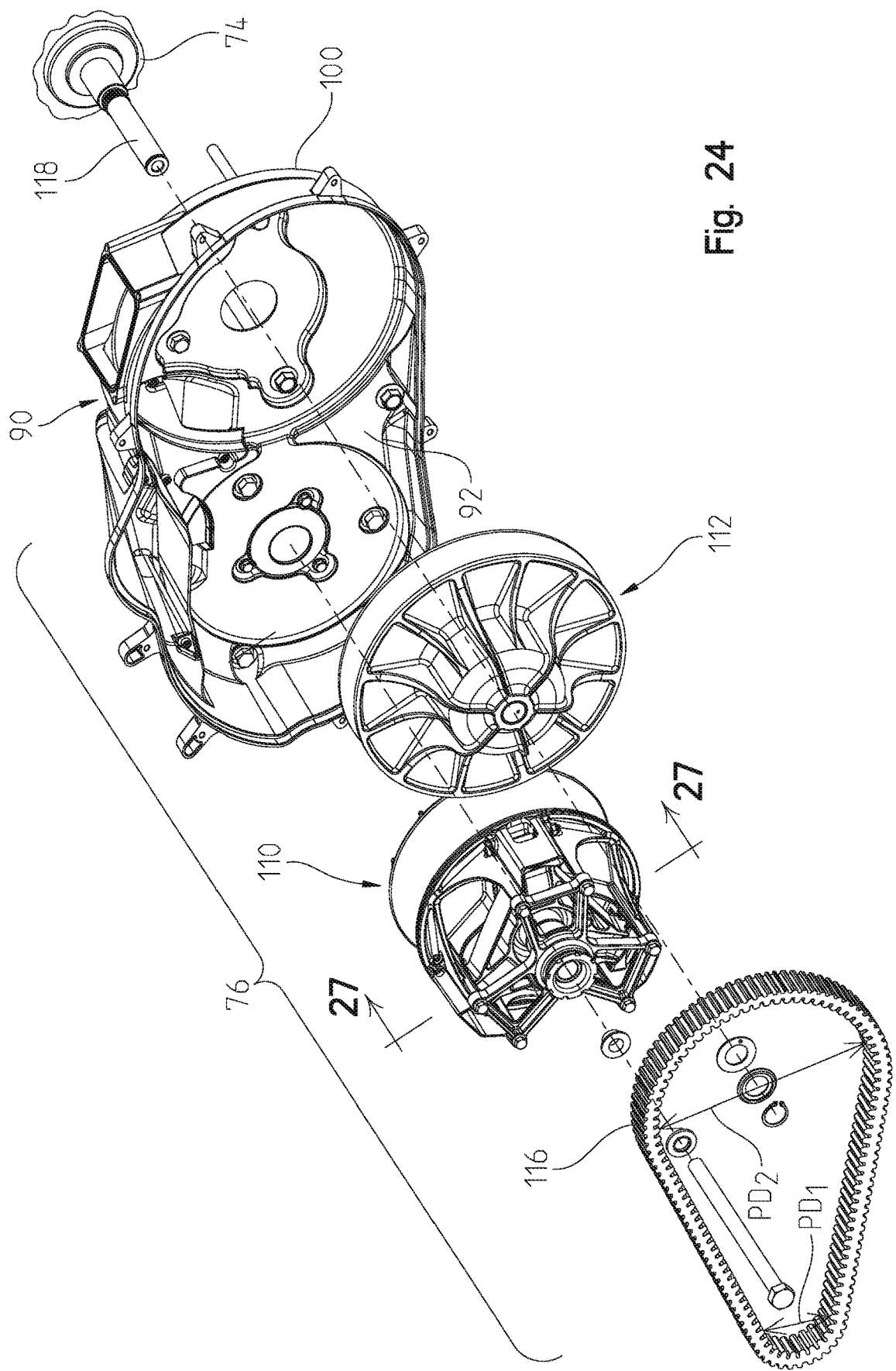
FIG. 24 is an exploded view of the continuously variable transmission of FIG. 23, illustratively with an inner cover, a drive clutch, a driven clutch, and a belt.

Referring to FIGS. 23 and 24, CVT 76 includes a primary or drive clutch or pulley 110, a secondary or driven clutch or pulley 112, and a belt 116 extending therebetween. Drive clutch 110 is rotatably coupled to crankshaft 84 of engine 72. Driven clutch 112 is rotatably coupled to an input shaft 118 of shiftable transmission 74 and is rotatably coupled to drive clutch 110 through belt 116. Belt 116 may be comprised of a polymeric material, for example rubber, and may also include reinforcing members, such as metal cords or other reinforcing material. In one embodiment, belt 116 may be comprised of a metallic material, for example, belt 116 may be a chain. In cross-section, belt 116 may generally define a "V" shape. Belt 116 is configured to contact drive clutch 110 and expand in diameter in order to contact driven clutch 112. More particularly, a pitch diameter $PD_1$ of belt 116 at a position in contact with drive clutch 110 is approximately 80-90 mm and, illustratively, is approximately 84.1 mm. In other words, the pitch diameter of drive clutch 110 is approximately 80-90 mm. With the pitch diameter of drive clutch 110 between 80-90 mm, the maximum torque/unit length of CVT 76 may be decreased. Additionally, to reduce the amount of time CVT 76 operates when the torque/unit length ratio is increased, the overdrive may be increased and gearing of shiftable transmission 74 may be decreased. For example, in one embodiment, a low ratio for CVT 76 may be 2.5:1-3.5:1 and, illustratively, may be 3.0:1. An underdrive ratio may be approximately 3.0 and an overdrive ratio may be approximately 0.7. Also, a pitch diameter $PD_2$ of belt 116 at a position in contact with driven clutch 112 is approximately 226-240 mm and, illustratively, is approximately 232.7 mm. In other words, the pitch diameter of driven clutch 112 is approximately 226-240 mm.

As shown in FIGS. 25-28, drive clutch 110 includes a moveable sheave 120 positioned adjacent outer cover 94 of CVT 76 and a stationary sheave 122 positioned adjacent inner cover 92 of CVT 76. Stationary sheave 122 includes a splined center opening 124 for engaging with a first splined portion 126 of a post 123 which includes a tapered volume 125 for engaging crankshaft 84 of engine 72. Post 123 further includes a second splined portion 128 for engaging with moveable sheave 120. During operation of CVT 76, stationary sheave 122 maintains a fixed position and does not move relative to moveable sheave 120.

Conversely, moveable sheave 120 of drive clutch 110 is configured for lateral movement relative to stationary sheave 122 in order to engage belt 116 and effect various drive ratios. Washers 148 and a bearing 150 are positioned intermediate stationary sheave 122 and moveable sheave 120 to define a belt groove or path for belt 116. Washers 148 and bearing 150 are not positioned within center opening 124 of stationary sheave 122 because the diameter of center opening 124 is less than the diameter of washers 148 and the diameter of bearing 150.

Moveable sheave 120 includes a tower or base member 130, an intermediate member or spider member 132 positioned adjacent tower member 130, and a cover member 134 positioned adjacent spider member 132, such that spider member 132 is intermediate tower member 130 and cover member 134. Cover member 134 is coupled to tower member 130 with fasteners 144 which are received within mounting bosses 146 on tower member 130. Cover member 134 includes a center opening 154 for engaging fastener 98.

Moveable sheave 120 also includes a plurality of weights, illustratively flyweights 136, which are rotatably coupled to tower member 130 with pins 138 and fasteners 140. Flyweights 136 are centrifugal weights which may pivot radially to cause moveable sheave 120 to move or slide laterally relative to stationary sheave 122, as detailed further herein.

Figure 25:
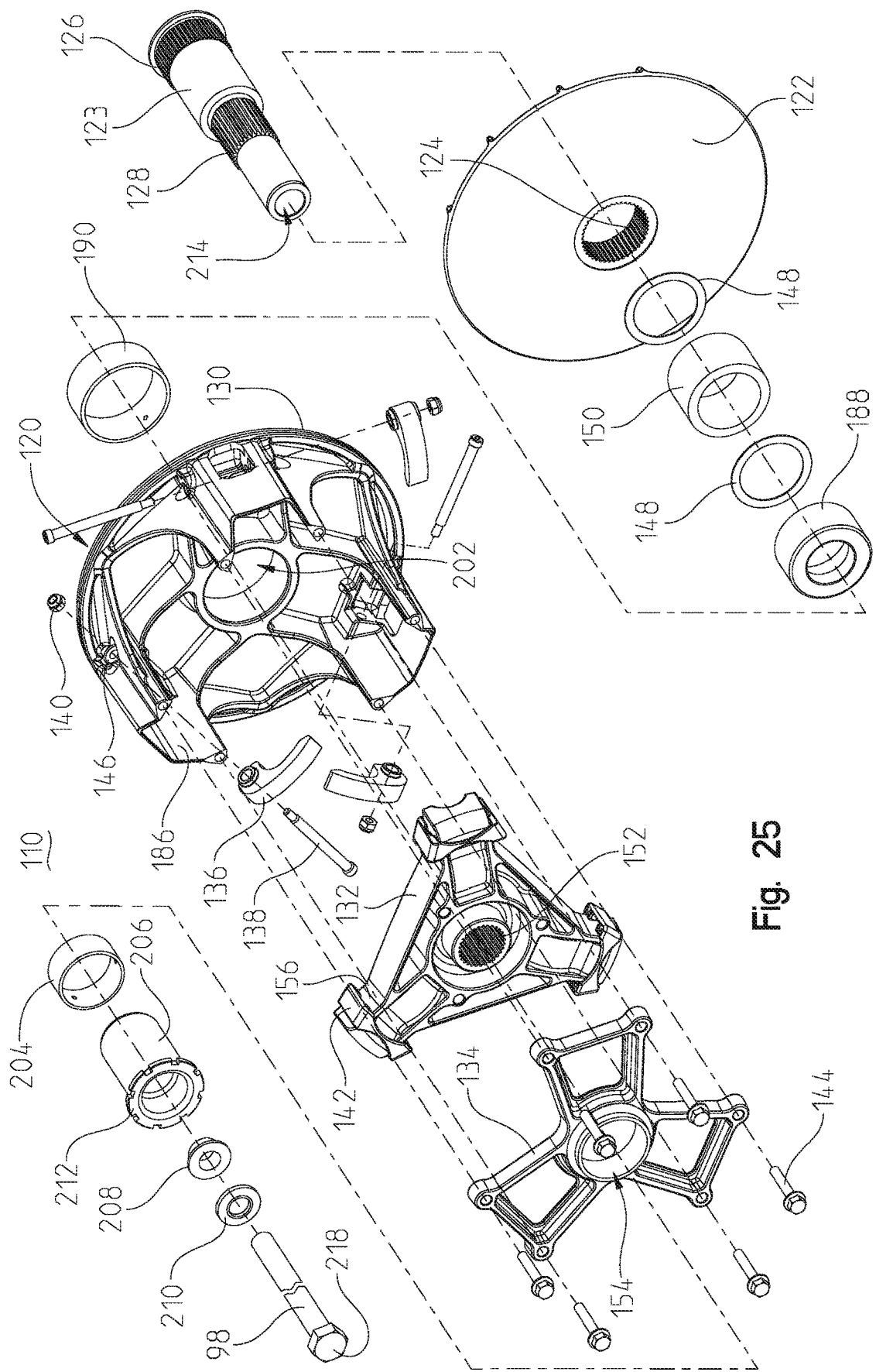
FIG. 25 is an exploded view of the drive clutch of FIG. 24.
Figure 26:
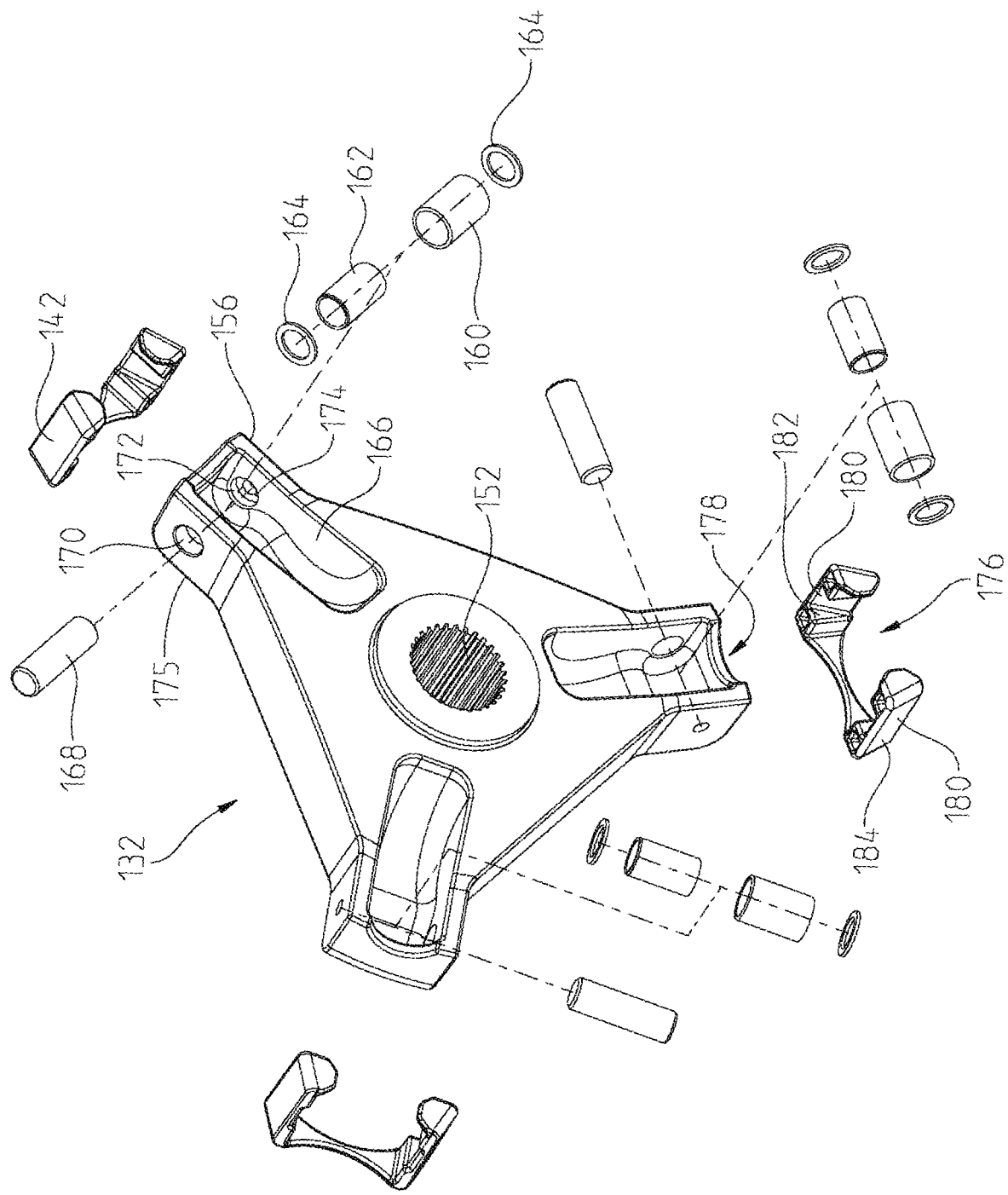
FIG. 26 is an exploded view of a spider member of the drive clutch of FIG. 25.
Figure 27:
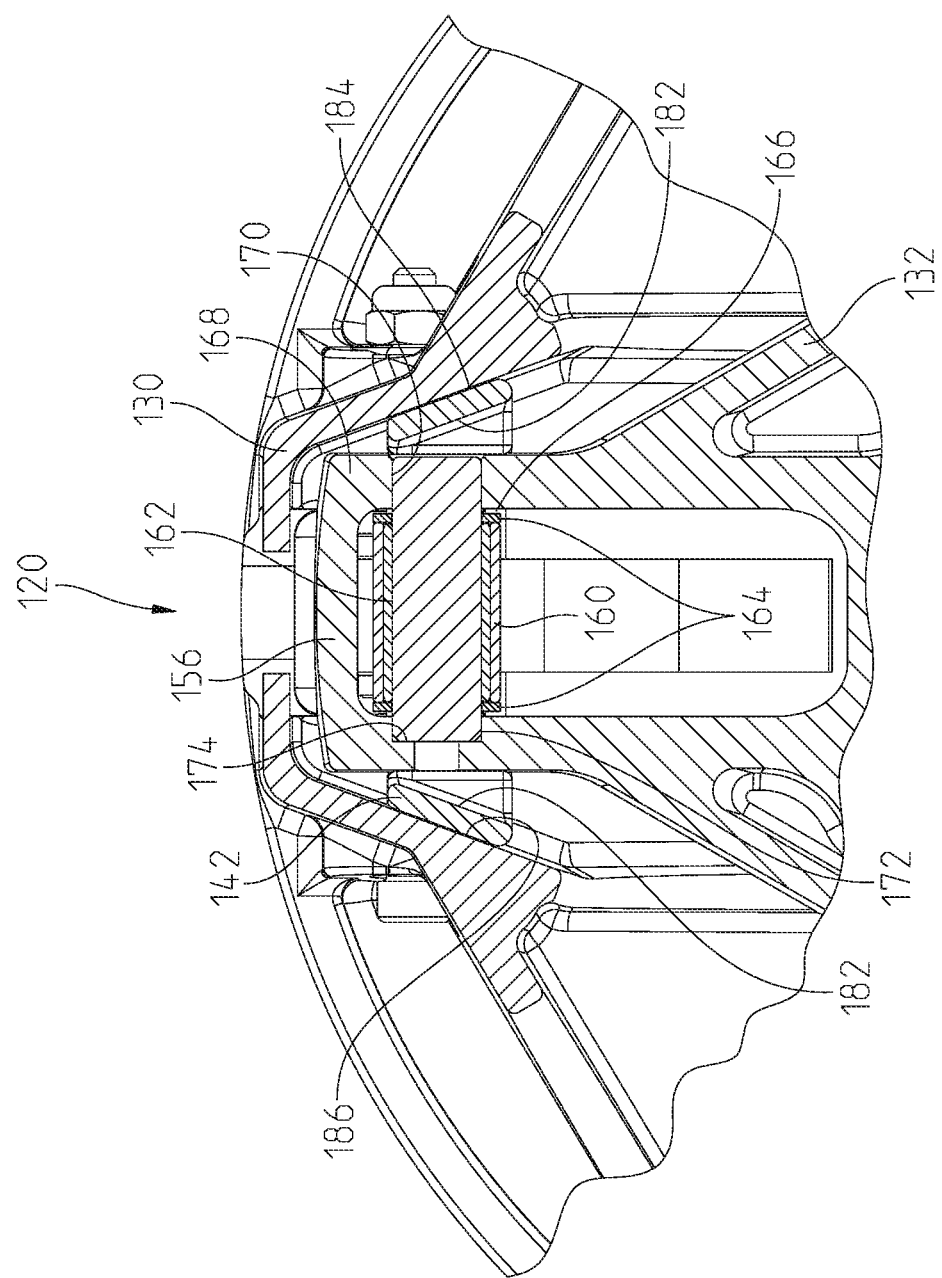
FIG. 27 is a cross-sectional view of a portion of the spider member of the drive clutch of FIG. 25, taken along line 27-27 of FIG. 25.

As shown in FIGS. 25-27, spider member 132 includes a splined center opening 152, a plurality of corners or posts 156, and a plurality of locating or position members 142. Because of splined center opening 152 which engages post 123 which is coupled to crankshaft 84, spider member 132 is configured to transfer torque from crankshaft 84 to drive clutch 110. Illustratively, spider member 132 has a generally triangular shape defining three posts 156 and each position member 142 is coupled to one of posts 156 of spider member 132. As shown in FIG. 26, a bearing 160 is positioned within each post 156 of spider member 132 and a sleeve 162 is received within bearing 160. Bearing 160 and sleeve 162 are flanked on either side by spacers 164 which abut an inner surface 166 of post 156. A pin 168 extends through an aperture 170 of post 156, through sleeve 162, and into a recess 172 of post 156. One end of pin 168 abuts a stop surface 174 of recess 172 so as to maintain the position of pin 168 within post 156.

Position members 142 are generally "U" shaped and extend around a closed side 175 of posts 156 of spider member 132. An open end 176 of position members 142 generally aligns with an open side 178 of posts 156 such that bearing 160 is exposed, as detailed further herein. Position members 142 are removably coupled to spider member 132 and are configured to slide radially relative to tower member 130 and spider member 132 through angled or tapered side walls 180. In one embodiment, side walls 180 of position members 142 are angled 15-30 degrees relative to the radial direction of drive clutch 110. More particularly, side walls 180 of position member 142 have an inner surface 182 angled relative to posts 156 and an outer surface 184 which is angled relative to post 156 but is generally parallel to an angled inner portion 186 of tower member 130. In this way, position members 142 locate spider member 132 within tower member 130 and take up any tolerance between tower member 130 and posts 156 of spider member 132. Additionally, if posts 156 and/or angled inner portion 186 of tower member 130 become worn, position member 142 can slide relative to tower member 130 and posts 156 in order to take up additional tolerances therebetween.

As with stationary sheave 122, moveable sheave 120 also engages post 123. More particularly, splined center opening 152 of spider member 132 engages second splined portion 128 of post 123. Additionally, a bushing 188 and a bearing 190 are positioned within a center opening 202 of tower member 130 in order to engage an additional portion of post 123. Post 123 is further coupled to cover member 134 of moveable sheave 120 through a bearing 204, a sleeve member 206, a stop member 208, a washer or spacer 210, and fastener 98. More particularly, bearing 204 is positioned within center opening 154 of cover member 134 and sleeve member 206 is received through bearing 204 and engages a distal portion of post 123. Sleeve member 206 includes a shoulder 212 which may abut cover member 134 in order to prevent lateral movement of sleeve member 206. Post 123 includes a cylindrical opening 214 and stop member 208 is received therein. A lip 216 of stop member 208 engages the distal end of post 123. Spacer 210 abuts lip 216 of stop member 208 and a head 218 of fastener 98 abuts spacer 210. Fastener 98 is received within cylindrical opening 214 of post 123 to secure post 123 to drive clutch 110.

Figure 28:
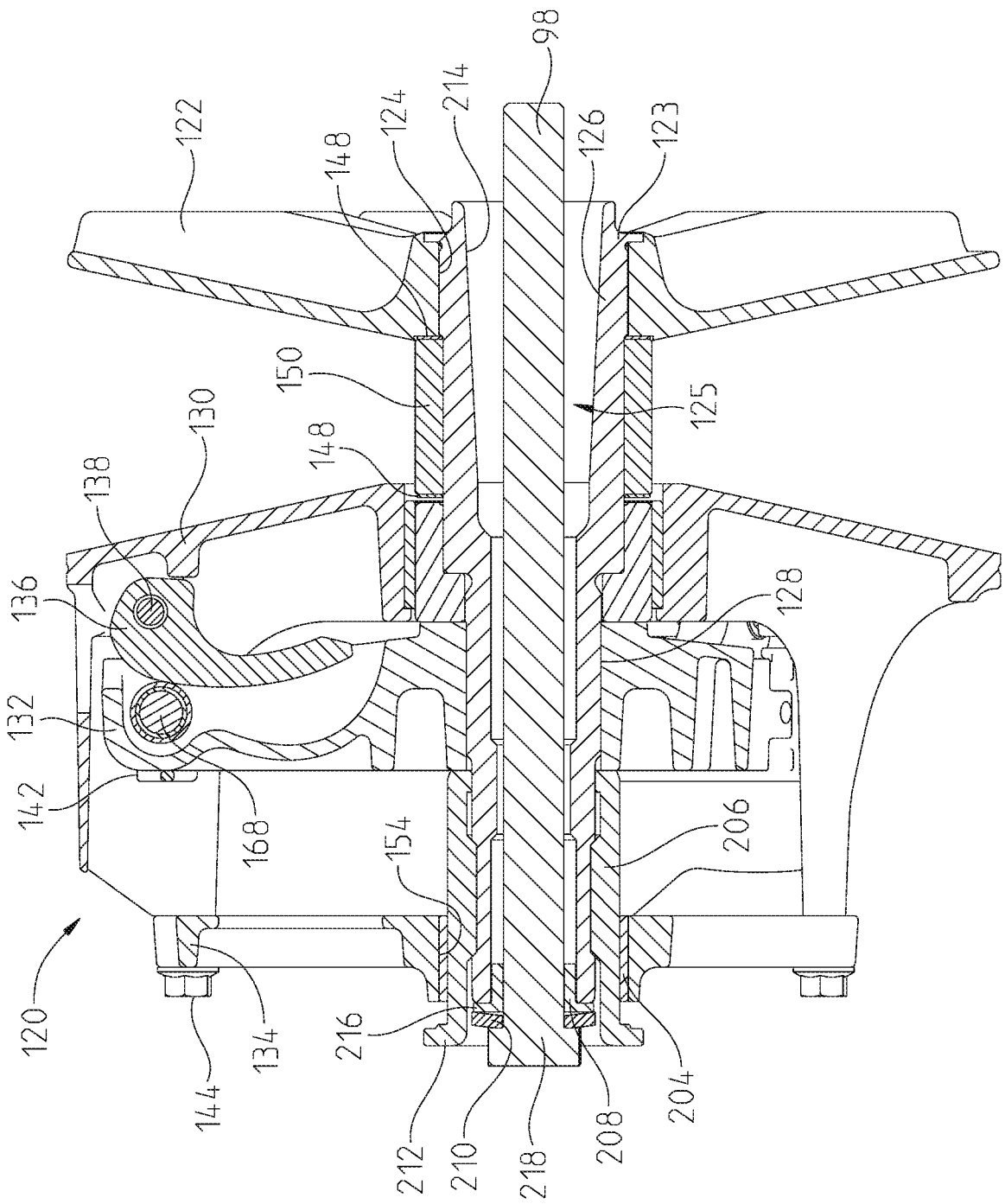
FIG. 28 is a cross-sectional view of the drive clutch of FIG. 23, taken along line 28-28 of FIG. 23.

During operation of CVT 76, drive clutch 110 rotates with crankshaft 84 through post 123 because a distal end of crankshaft 84 is received within tapered volume 125 of post 123. At various operating conditions of vehicle 2, drive clutch 110 rotates at a speed which causes flyweights 136 to pivot about pin 138. The centrifugal force on flyweights 136 causes flyweights 136 to pivot or rotate radially against bearing 160 of spider member 132. This movement of flyweights 136 applies a force to moveable sheave 120 to cause moveable sheave 120 to slide or translate laterally along sleeve member 206 and bearing 150 relative to stationary sheave 122. In this way, the radial position of belt 116 on moveable sheave 120 and stationary sheave 122 may be adjusted to accommodate various operating conditions of vehicle 2, thereby resulting in various drive ratios. During operation, drive clutch 110 is configured to move between an open position, as shown in FIG. 28, and a closed position in which moveable sheave 120 and stationary sheave 122 are proximate each other and further movement of moveable sheave 120 toward stationary sheave 122 is no longer possible. Movement of moveable sheave 120 may be electronically, mechanically, or fluidly controlled.

Figure 29:
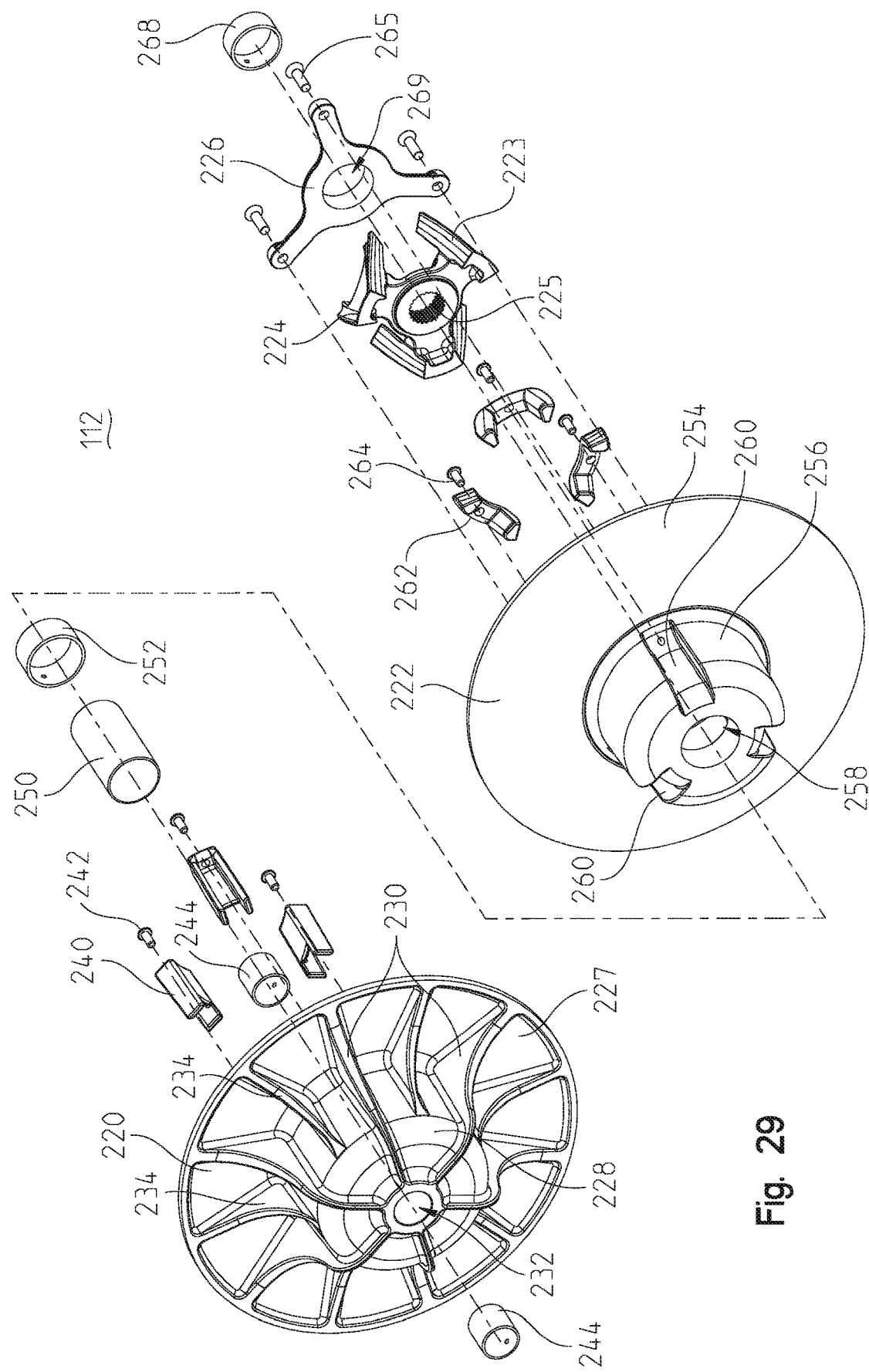
FIG. 29 is an exploded view of the driven clutch of FIG. 24.
Figure 30:
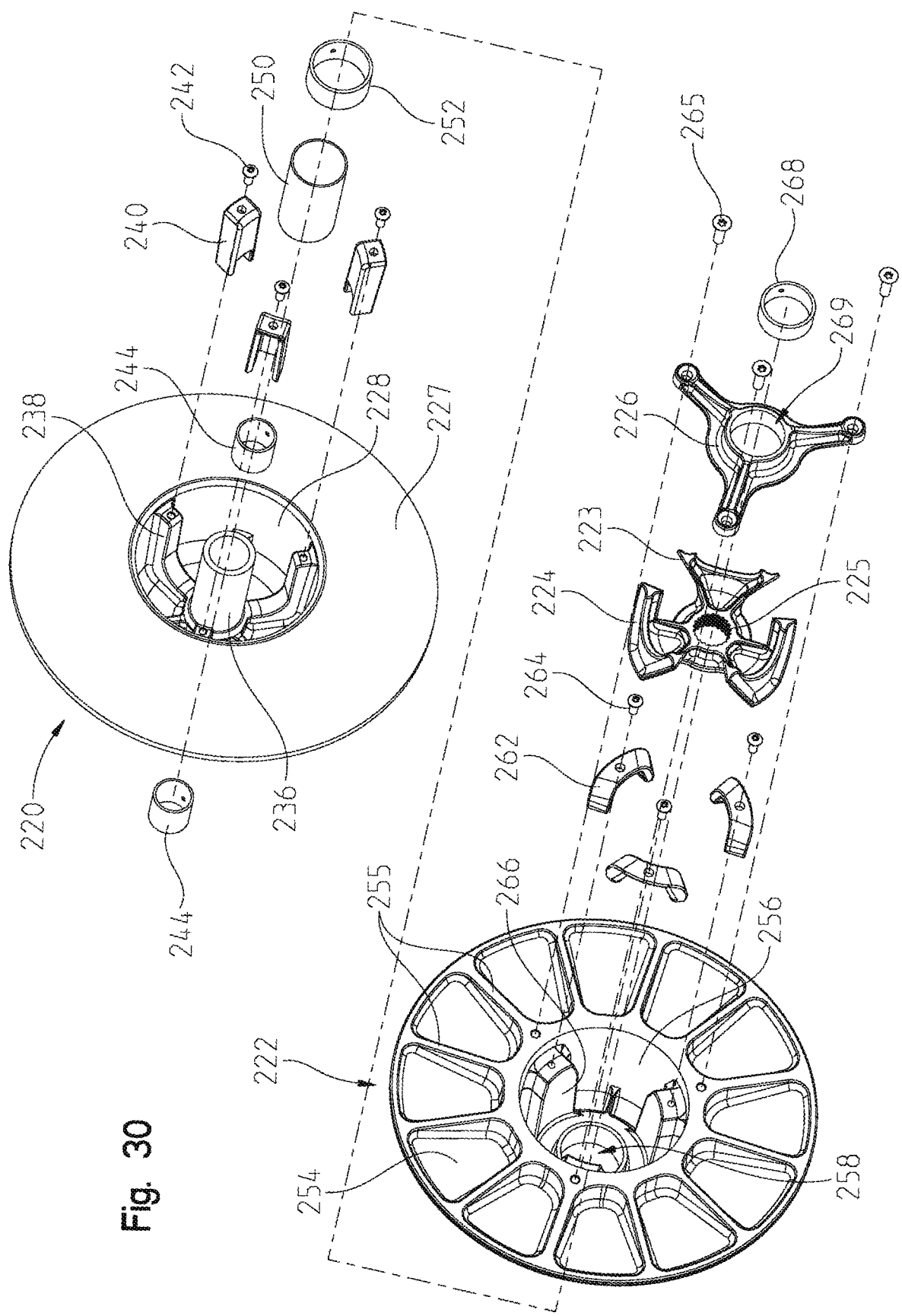
FIG. 30 is a further exploded view of the driven clutch of FIG. 29.
Figure 31:
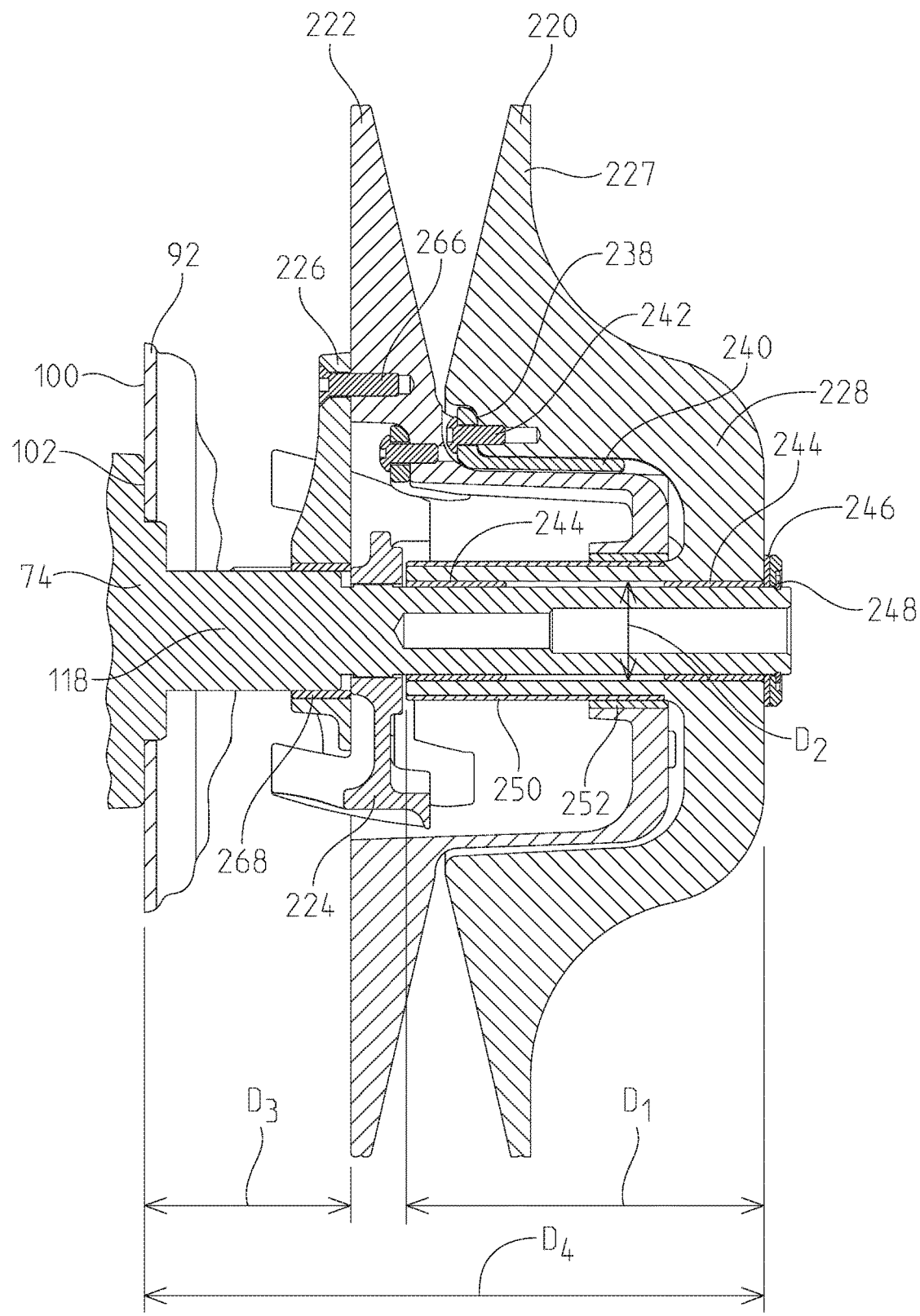
FIG. 31 is a cross-sectional view of the driven clutch of FIG. 23, taken along line 31-31 of FIG. 23.

The rotation of belt 116 caused by drive clutch 110 drives driven clutch 112. Referring to FIGS. 29-31, driven clutch 112 includes a stationary sheave 220, a moveable sheave 222, a load member or helix 224, and a cover member 226. Stationary sheave 220 is coupled to a distal end of shaft 118 of shiftable transmission 74 and maintains a fixed position relative to moveable sheave 222. Stationary sheave 220 includes a body 227 and a nose 228 which protrudes laterally outwardly therefrom. A plurality of ribs 230 extends continuously from an outer perimeter of stationary sheave 220 to a center opening 232 of nose 228. Stationary sheave 220 also includes a plurality of secondary ribs 234 positioned intermediate ribs 230. Ribs 230 and secondary ribs 234 provide strength and stability to stationary sheave 220 during operation of CVT 76.

Additionally, within nose 228, stationary sheave 220 further includes a plurality of raised surfaces 238 which are configured to couple with brackets 240 through fasteners 242. Stationary sheave 220 further includes a post 236 projecting laterally inwardly from nose 228 and toward moveable sheave 222. In one embodiment, post 236 is integral with stationary sheave 220 and, therefore, comprised of the same material as body 227 and nose 228 of stationary sheave 220. In this way, driven clutch 112 is a post-less design because stationary sheave 220 and moveable sheave 222 directly couple with shaft 118 of shiftable transmission 74, rather that requiring a further post for engaging shaft 118. Illustrative post 236 extends a distance D1 from the proximate end thereof to the outer surface of nose 228 and D1 may be approximately 60-70 mm, and illustratively, 65 mm. Additionally, a diameter D2 of post 236 may be approximately 20-30 mm and, illustratively, 25 mm. The length/diameter ratio of post 236 is indicative of the stability provided to driven clutch 112 as moveable sheave 222 translates relative to stationary sheave 220. Alternatively, post 236 may be press fit or otherwise coupled within nose 228 and comprised of a different material than body 227 and nose 228. For example, in one embodiment, post 236 may be comprised of aluminum. Post 236 is configured to provide stability to stationary sheave 220 during operation of CVT 76.

Post 236 also is configured to receive at least one bearing 244 therein, through which shaft 118 of shiftable transmission 74 may be received. Shaft 118 may be secured to driven clutch 112 with at least one spacer 246 and a fastener at the distal end thereof, illustratively, a snap ring 248. Additionally, a sleeve 250, which may be a bushing, is received over post 236 in order to slidably receive moveable sheave 222.

Moveable sheave 222 may be configured for translational movement along sleeve 250 between a closed position when adjacent stationary sheave 220, as shown in FIG. 31, and an open position in which moveable sheave 222 slides or otherwise moves laterally apart from stationary sheave 220. The movement of moveable sheave 222 engages belt 116 in various configurations in order to effect various driving ratios for vehicle 2. The movement of moveable sheave 222 may be mechanically, fluidly, or electronically controlled.

Moveable sheave 222 includes a body portion 254 and a nose 256 projecting laterally outwardly from body portion 254. Nose 256 is received within nose 228 of stationary sheave 220. An outer surface of body portion 254 includes a plurality of ribs 255 which strengthens moveable sheave 222. A center aperture 258 of nose 256 is configured to receive a bearing 252 for sliding along sleeve 250. Additionally, nose 256 includes recesses 260 which align with brackets 240 and raised surfaces 238 on stationary sheave 220 in order to locate moveable sheave 222 on stationary sheave 220. Within nose 256 of moveable sheave 222, each of a plurality of projections 266 is configured to receive a bracket 262. Brackets 262 are coupled to projections 266 with fasteners 264. Helix 224 is positioned adjacent brackets 262 and cover member 226 is positioned adjacent helix 224 such that helix 224 is intermediate cover member 226 and the outer surface of moveable sheave 222. Helix 224 includes a splined center opening 225 for engaging shaft 118 of shiftable transmission 74. Additionally, when driven clutch 112 is assembled, ears 223 of helix are positioned intermediate adjacent projections 266 in an alternating configuration. Cover member 226 is coupled to the outer surface of moveable sheave 222 with fasteners 265 and a bearing 268 is positioned within a center aperture 269 of cover member 226.

As shown in FIG. 31, driven clutch 112 is in a closed position and is positioned adjacent shiftable transmission 74 to receive shaft 118 of shiftable transmission 74. More particularly, the inner surface of moveable sheave 222 is spaced apart from mounting surface 102 of shiftable transmission 74 by a distance of D3 when driven clutch 112 is in the closed position, and D3 may be approximately 40-60 mm and, illustratively, is approximately 49 mm. Additionally, the outer surface of nose 228 of stationary sheave 220 of driven clutch 112 is spaced apart from mounting surface 102 of shiftable transmission 74 by a distance of D4 when driven clutch 112 is in the closed position, and D4 may be approximately 140-160 mm and, illustratively, is approximately 146 mm. In this way, the center of gravity of driven clutch 112 is moved closer to shiftable transmission 74. By positioning the center of gravity of driven clutch 112 proximate shiftable transmission 74, the coupling between driven clutch 112 and shiftable transmission 74 may be made more stable because the cantilevered mass of CVT 76 is positioned closer to shiftable transmission 74 and engine 72.

During operation of CVT 76, rotation of crankshaft 84 of engine 72 causes rotation of drive clutch 110. Drive clutch 110 engages belt 116 and when belt 116 engages driven clutch 112, driven clutch 112 rotates, which causes shaft 118 of shiftable transmission 74 to rotate. As belt 116 engages driven clutch 112, a load is applied thereto. More particularly, the load (e.g., torque) is transmitted from stationary sheave 220, through raised surfaces 238, through projections 266 of moveable sheave 222, and to helix 224, which then applies the torque to shaft 118 of shiftable transmission 74. In this way, the torque is centralized at helix 224, rather than applied to other components of CVT 76, for transferring to shiftable transmission 74. CVT 76 also may be electronically controlled in order to allow for operation at low vehicle speeds. As such, electronic operation of CVT 76 ("eCVT") may allow for CVT 76 to operate without being limited to a specific speed range and/or without reaching the revolutions limit for engine 72. This functionality of eCVT may be utilized when overboosting so that CVT 76 may be controlled without reaching a revolutions limit for engine 72. Additionally, use of eCVT may allow for operating vehicle 2 at low rpm while maintaining fuel economy. Additional details of CVT 76 may be disclosed in U.S. patent application Ser. No. 14/475,385, filed on Sep. 2, 2014, the complete disclosure of which is expressly incorporated by reference herein.

Figure 32:
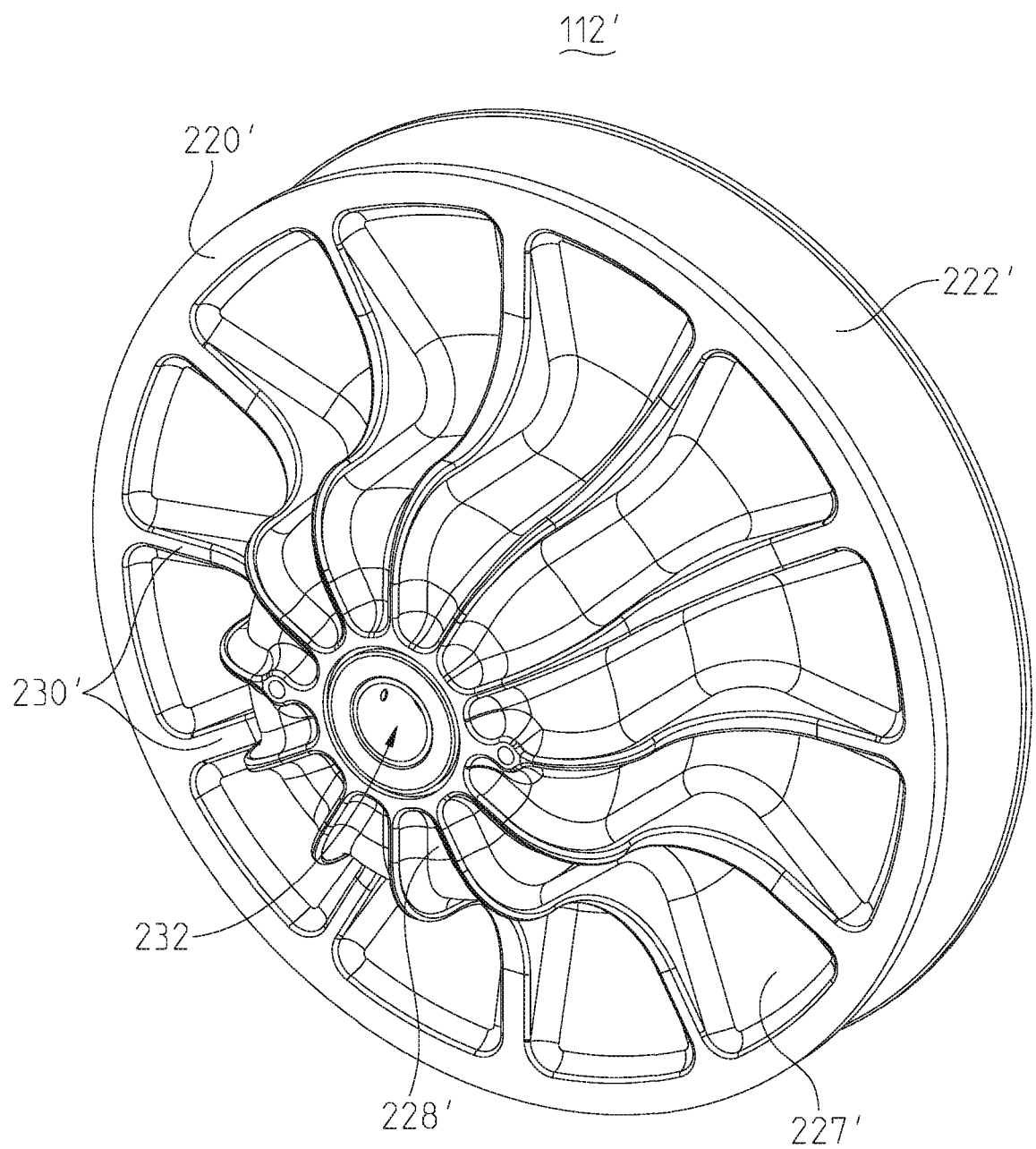
FIG. 32 is a perspective view of an alternative embodiment of the driven clutch of FIG. 23.
Figure 33:
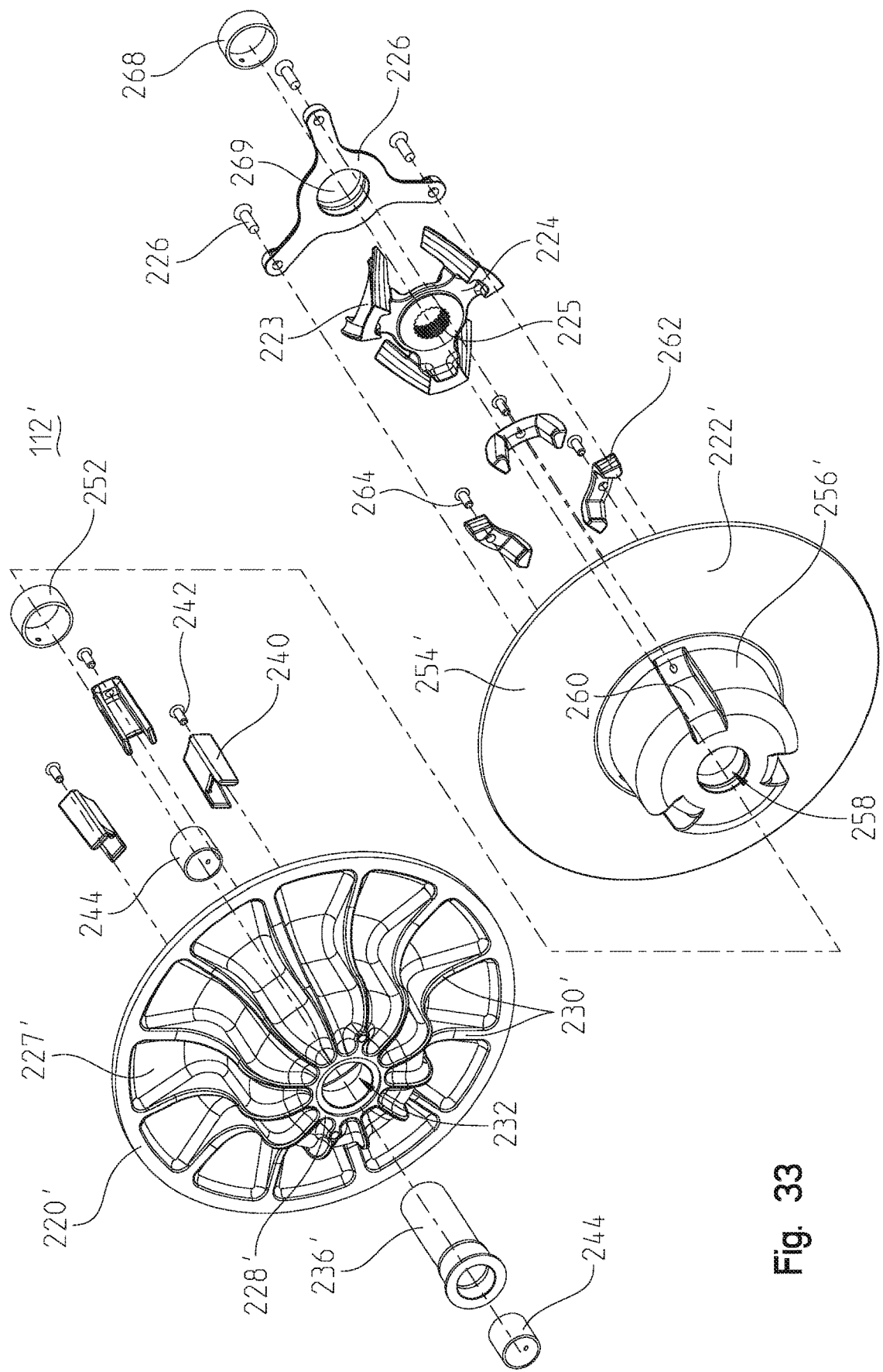
FIG. 33 is an exploded view of the alternative embodiment driven clutch of FIG. 32.
Figure 34:
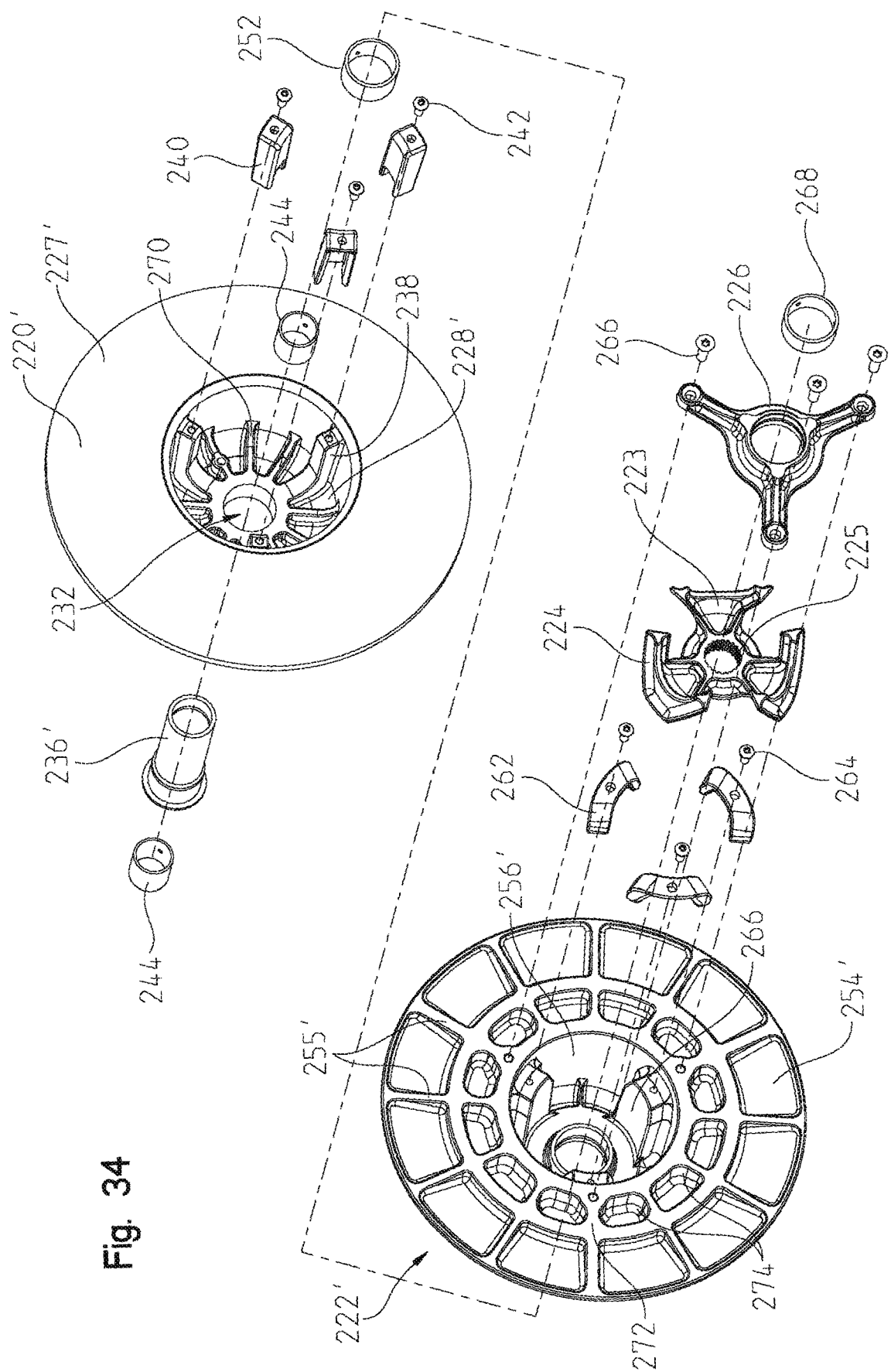
FIG. 34 is a further exploded view of the alternative embodiment driven clutch of FIG. 33.

An alternative embodiment of driven clutch 112 is shown as driven clutch 112' in FIGS. 32-34. As with driven clutch 112, the rotation of belt 116 caused by drive clutch 110 drives alternative driven clutch 112'. Driven clutch 112' includes a stationary sheave 220', a moveable sheave 222', helix 224, and cover member 226. Stationary sheave 220' is coupled to the distal end of shaft 118 of shiftable transmission 74 and maintains a fixed position relative to moveable sheave 222'. Stationary sheave 220' includes a body 227' and a nose 228' which protrudes laterally outwardly therefrom.

A plurality of ribs 230' extends from an outer perimeter of stationary sheave 220' to center opening 232 of nose 228'.

Additionally, within nose 228', stationary sheave 220' further includes raised surfaces 238 which are configured to couple with brackets 240 through fasteners 242. Interior ribs 270 are also positioned within nose 228' to provide additional strength and stability to stationary sheave 220'. Stationary sheave 220' further includes a post 236' received through center opening 232 and coupled to a portion of nose 228'. Post 236' projects laterally inwardly from nose 228' and toward moveable sheave 222'. In one embodiment, post 236' may be press fit or otherwise coupled within nose 228' and comprised of a different material than body 227' and nose 228'. For example, in one embodiment, post 236' may be comprised of aluminum. Post 236' is configured to stabilize stationary sheave 220' during operation of CVT 76.

Post 236' is configured to receive bearings 244 therein, through which shaft 118 of shiftable transmission 74 may be received. Additionally, moveable sheave 222' may be configured for translational movement along post 236'. Moveable sheave 222' includes a body portion 254' and a nose 256' projecting laterally outwardly from body portion 254'. An outer surface of body portion 254' includes a plurality of ribs 255' for increasing the strength of moveable sheave 222'. Additionally, the outer surface of body portion 254' includes a ring 272 with a plurality of recesses 274. Ring 272 may be a balance ring with a diameter less than the outer diameter of moveable sheave 222' to decrease the stress on moveable sheave 222' when CVT 76 operates at a high speed. More particularly, by positioning ring 272 adjacent nose 256', rather than proximate the outer perimeter, moveable sheave 222' may be sufficiently balanced to lower the stress on moveable sheave 222' and manage the rotational inertia of moveable sheave 222'.

As shown in FIG. 33, center aperture 258 of nose 256' is configured to receive bearing 252. Additionally, nose 256' includes recesses 260 which align with brackets 240 in order to locate moveable sheave 222' on stationary sheave 220'. Within nose 256' of moveable sheave 222', each projections 266 is configured to receive one of brackets 262. Brackets 262 are coupled to projections 266 with fasteners 264. Helix 224 is positioned adjacent brackets 262 and cover member 226 is positioned adjacent helix 224 such that helix 224 is intermediate cover member 226 and the outer surface of moveable sheave 222'. Helix 224 includes splined center opening 225 for engaging shaft 118 of shiftable transmission 74. Cover member 226 is coupled to the outer surface of moveable sheave 222' with fasteners 265 and bearing 268 is positioned within center aperture 269 of cover member 226.

Figure 35:
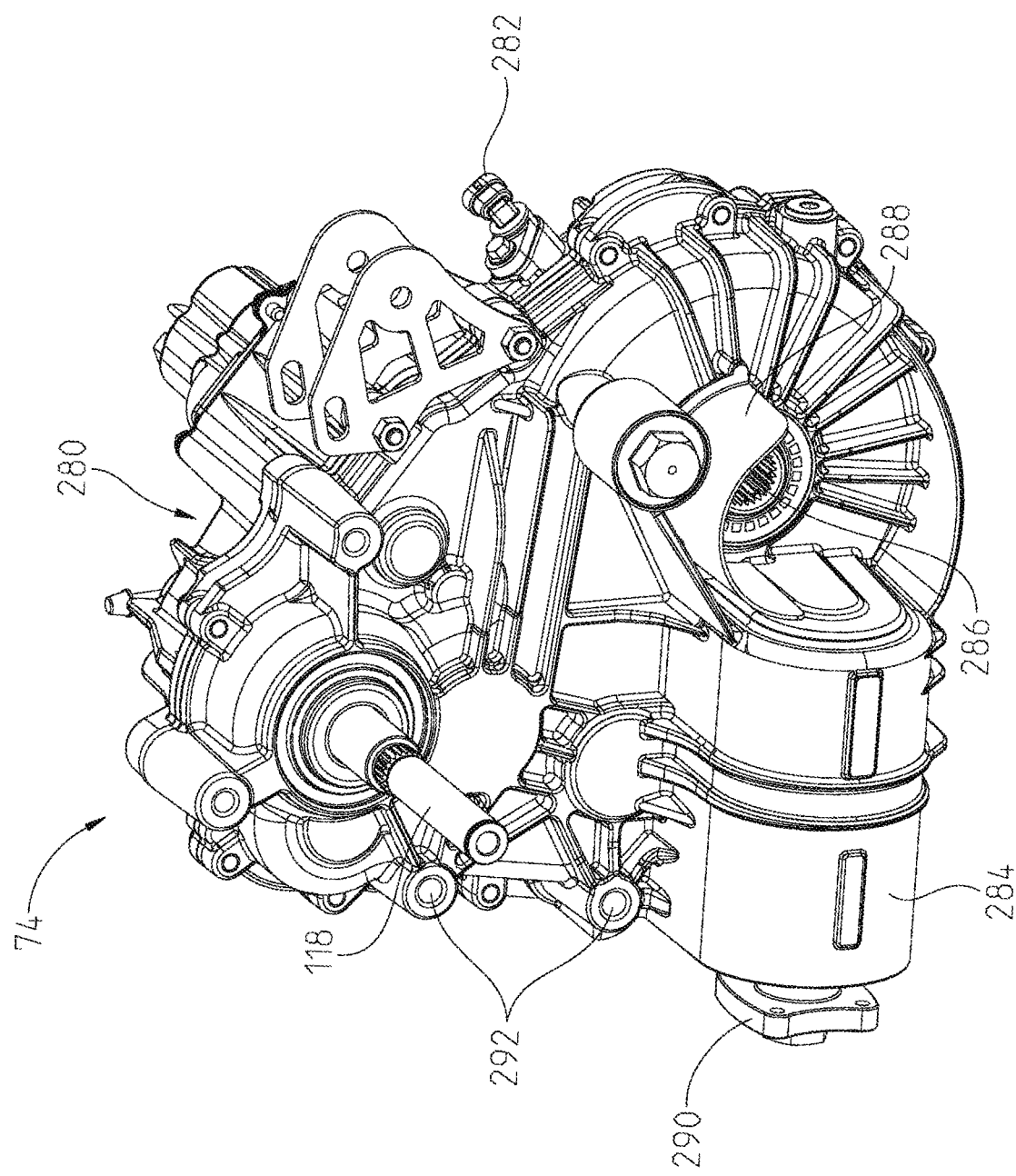
FIG. 35 is a left side view of the shiftable transmission of the powertrain assembly of FIG. 15.

As shown in FIG. 35, shiftable transmission 74 is operably coupled to driven clutch 112 or 112' and includes mounting bosses 292 for directly coupling with CVT housing 90. In particular, mounting bosses 292 are integral with housing 75 of shiftable transmission 74. Additionally, shiftable transmission 74 is coupled to engine 72 through the structural inner cover 92 of CVT 76 such that no intermediate bracket extending between engine 72 and shiftable transmission 74 may be utilized. Because inner cover 92 of CVT housing 90 is a structural member, the orientation of shiftable transmission 74 is fixed relative to engine 72. As such, inner cover 92 defines the component which couples shiftable transmission 74 to engine 72 such that without inner cover 92, engine 72 and shiftable transmission 74 may not be coupled together. In one embodiment, a bracket 293 (FIG. 20) also may be used to couple shiftable transmission 74 to engine 72.

Referring still to FIG. 35, shiftable transmission 74 includes a reverse gear 280 operably coupled to shaft 118, a speed sensor 282 positioned at a rear portion of shiftable transmission 74, and a snorkel 284 positioned along a lower, left-side portion of shiftable transmission 74 and vertically lower than shaft 118. Speed sensor 282 may be configured to read the tips of the teeth on a gear, rather than a side or face of a gear. In one embodiment, shiftable transmission 74 is configured for electronic shifting.

Figure 36:
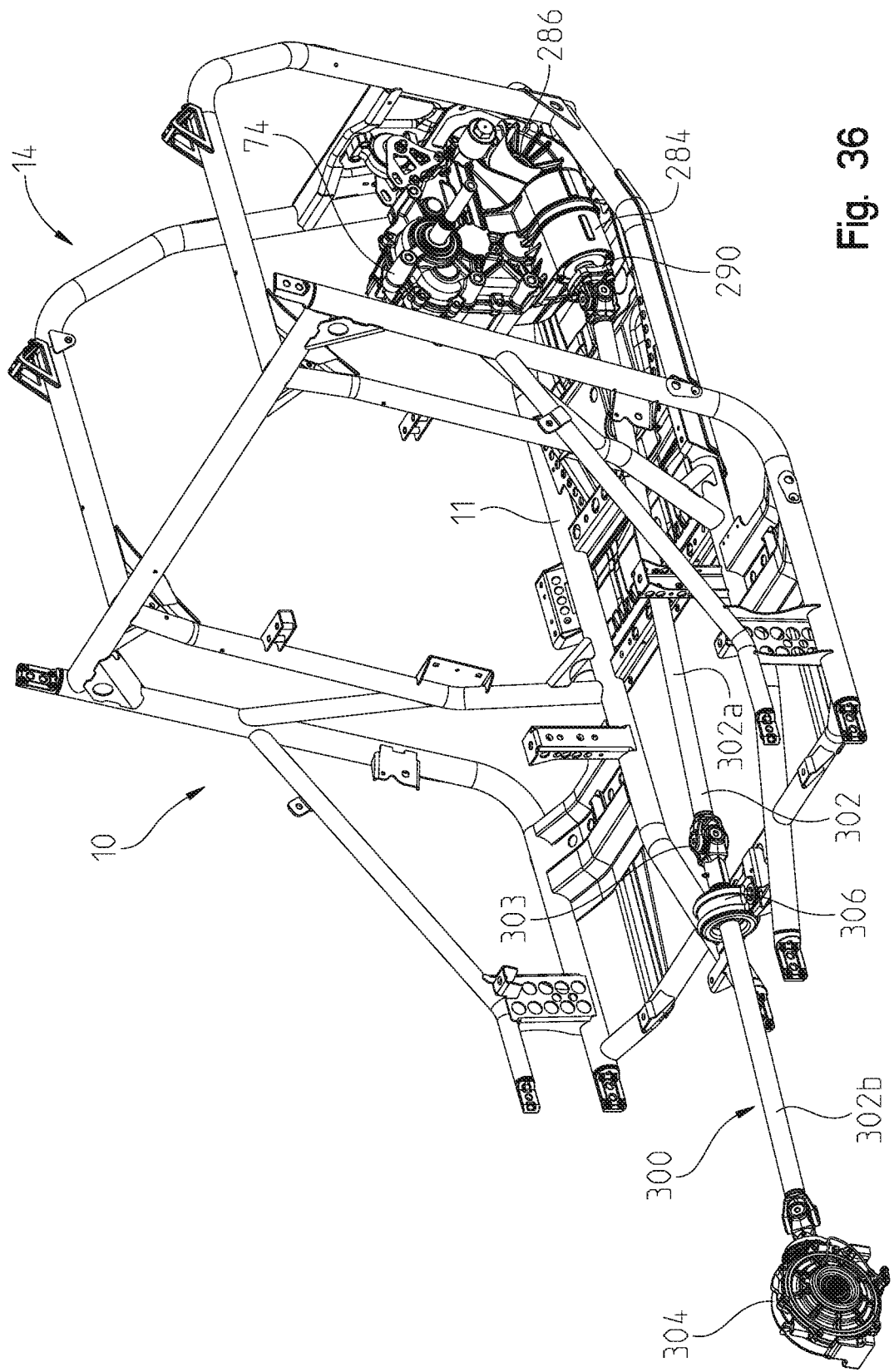
FIG. 36 is a left front perspective view of a rear portion of a frame assembly and a driveline assembly of the vehicle of FIG. 1.

A flange 290 is positioned forward of snorkel 284 to couple with a driveline assembly 300 of vehicle 2 (FIG. 36). Additionally, shiftable transmission 74 includes splined apertures 286 for operably coupling the rear axles or half shafts of vehicle 2 to rear wheels 8. A shroud 288 may be positioned above apertures 286 for shielding boots of the half shafts from debris (e.g., rocks) during operation of vehicle 2.

Figure 37:
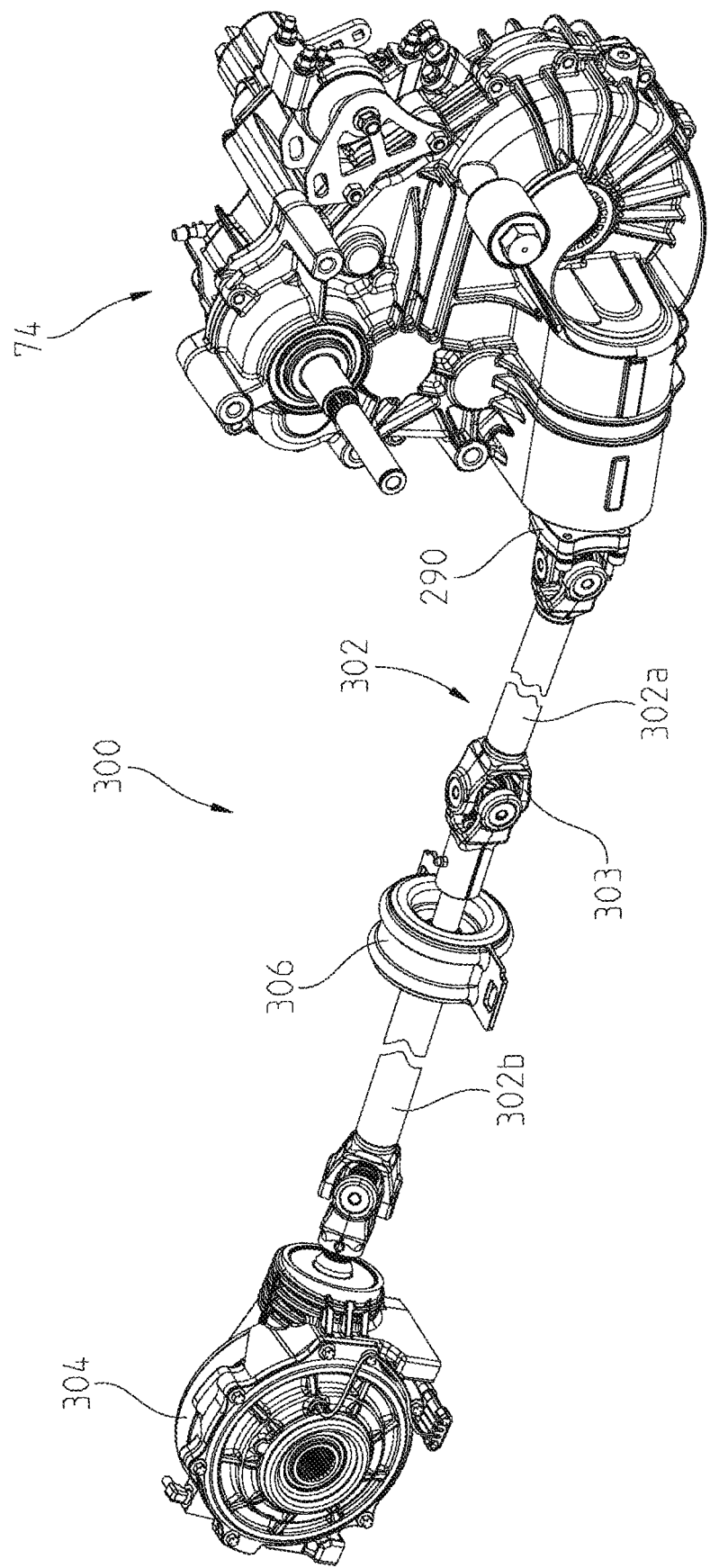
FIG. 37 is a left rear perspective view of the driveline assembly of FIG. 36.
Figure 38:
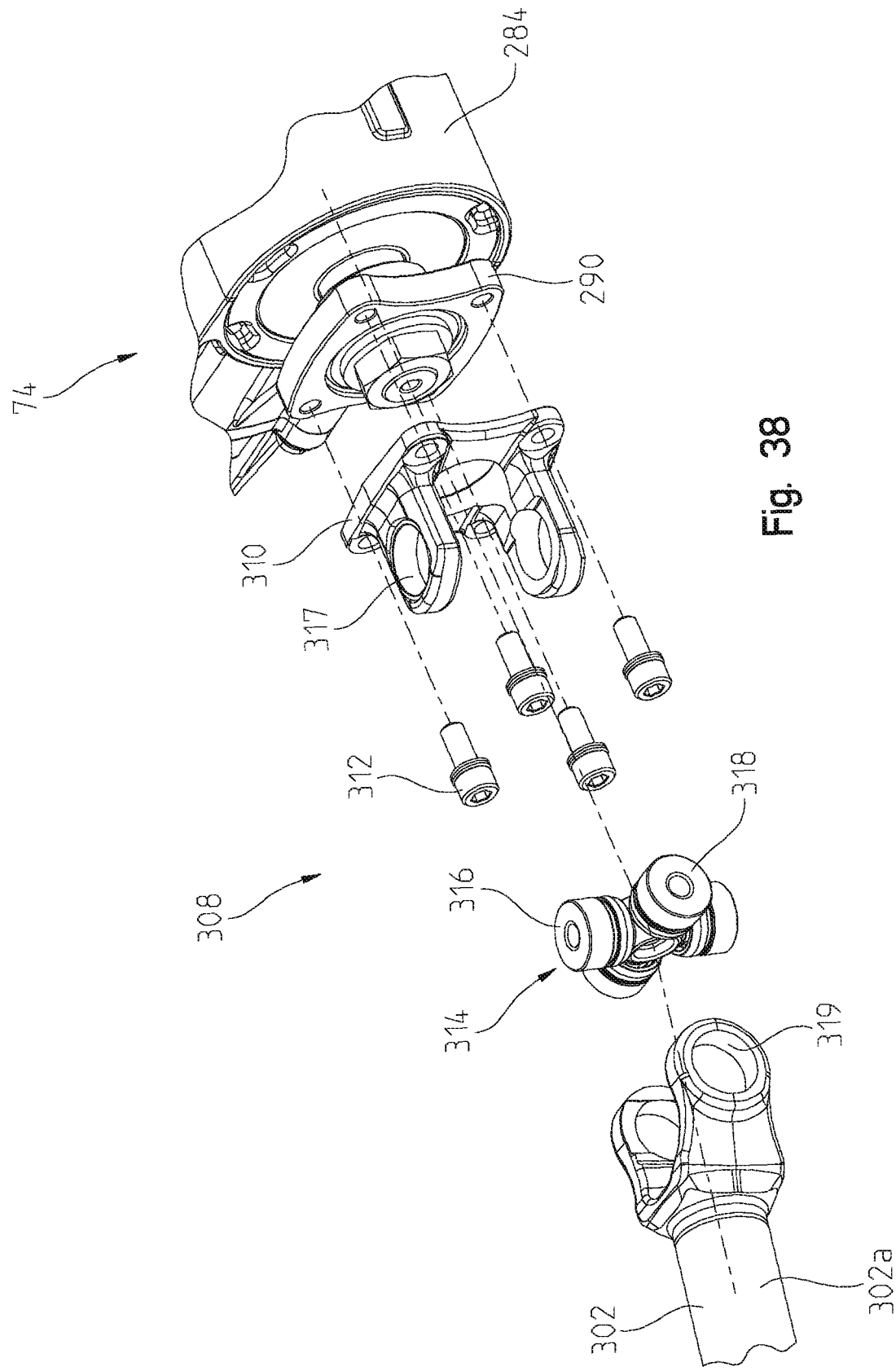
FIG. 38 is an exploded view of a joint between the shiftable transmission of FIG. 35 and a drive shaft of the driveline assembly of FIG. 37.

Referring to FIGS. 36-38, rear portion 14 of lower frame assembly 10 further supports driveline assembly 300 which is operably coupled to shiftable transmission 74. As shown in FIG. 36, at least a portion of driveline assembly 300 are positioned intermediate longitudinal frame members 11. Flange 290 of shiftable transmission 74 is rotatably coupled to a prop shaft 302 of driveline assembly 300, which may be supported by a bearing ring 306 coupled to lower frame assembly 10. Prop shaft 302 includes a rear prop shaft 302a and a front prop shaft 302b which are operably coupled together through a joint, illustratively, a U-joint 303. As shown in FIG. 38, prop shaft 302 is coupled to flange 290 through a joint 308, which includes a bracket 310 coupled to flange 290 with fasteners 312 and a connection member 314. Connection member 314 includes first arms 316 which are received within first apertures 317 on bracket 310 and second arms 318 which are received within apertures 319 on rear prop shaft 302a. As such, connection member 314 operably couples prop shaft 302 to shiftable transmission 74. Additionally, instead of a sliding spline, flange 290 may be more efficient at controlling noise from prop shaft 302 and allowing for a better connection between prop shaft 302 and shiftable transmission 74. In particular, any slipping that occurs in prop shaft 302 occurs at joint 308, rather than in multiple locations along prop shaft 302.

Driveline assembly 300 also includes a front differential 304, which is operably coupled to front wheels 6 through front axles. As such, operation of shiftable transmission 74 rotates rear wheels 8 through the rear axles and causes rotation of the front wheels 6 through rotation of prop shaft 302 and operation of front differential 304.

Figure 39:
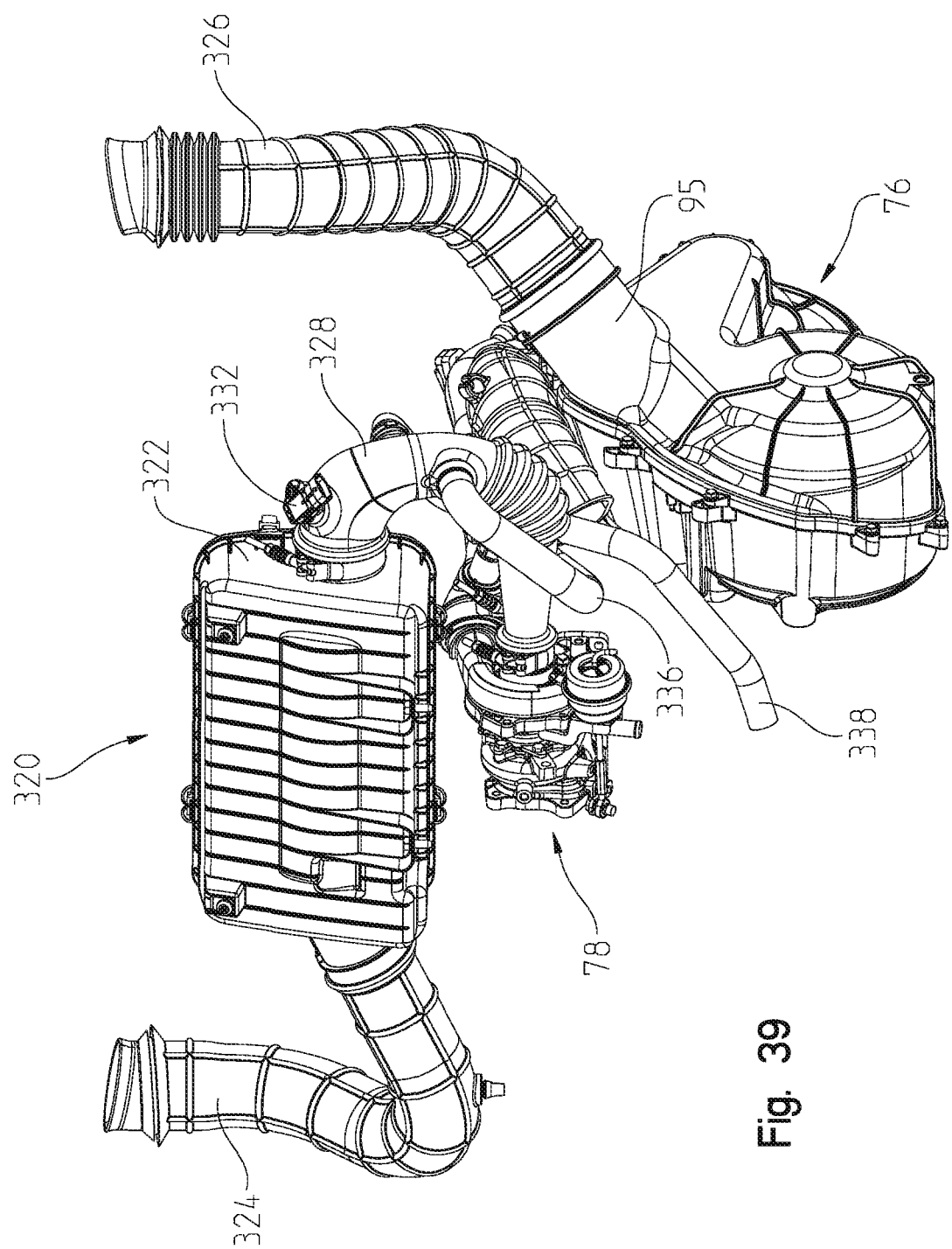
FIG. 39 is a left front perspective view of an air intake assembly for the engine and a forced-air inducer of the powertrain assembly of FIG. 15.
Figure 40:
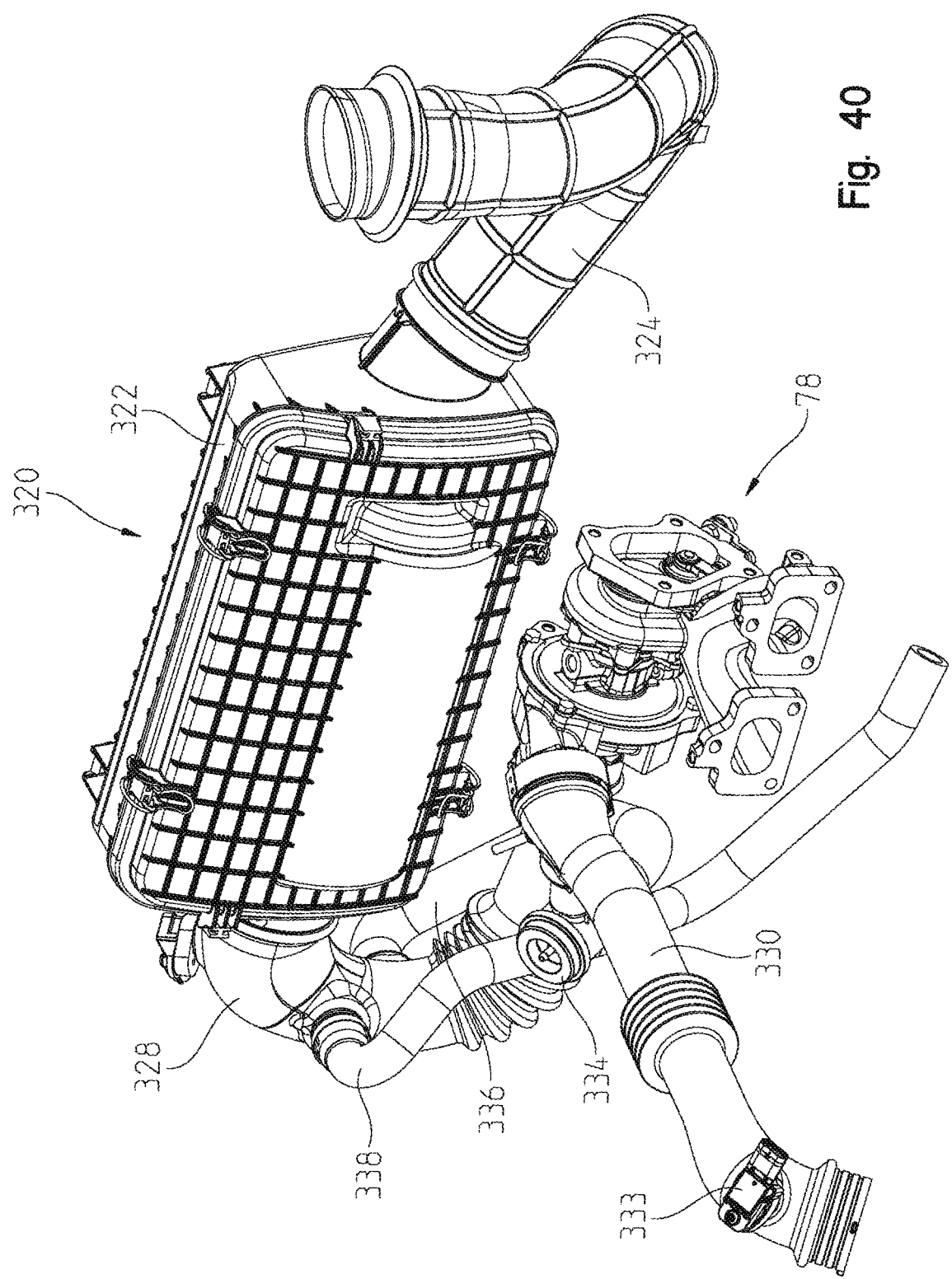
FIG. 40 is a right rear perspective view of the air intake assembly and the forced-air inducer of FIG. 39.
Figure 41:
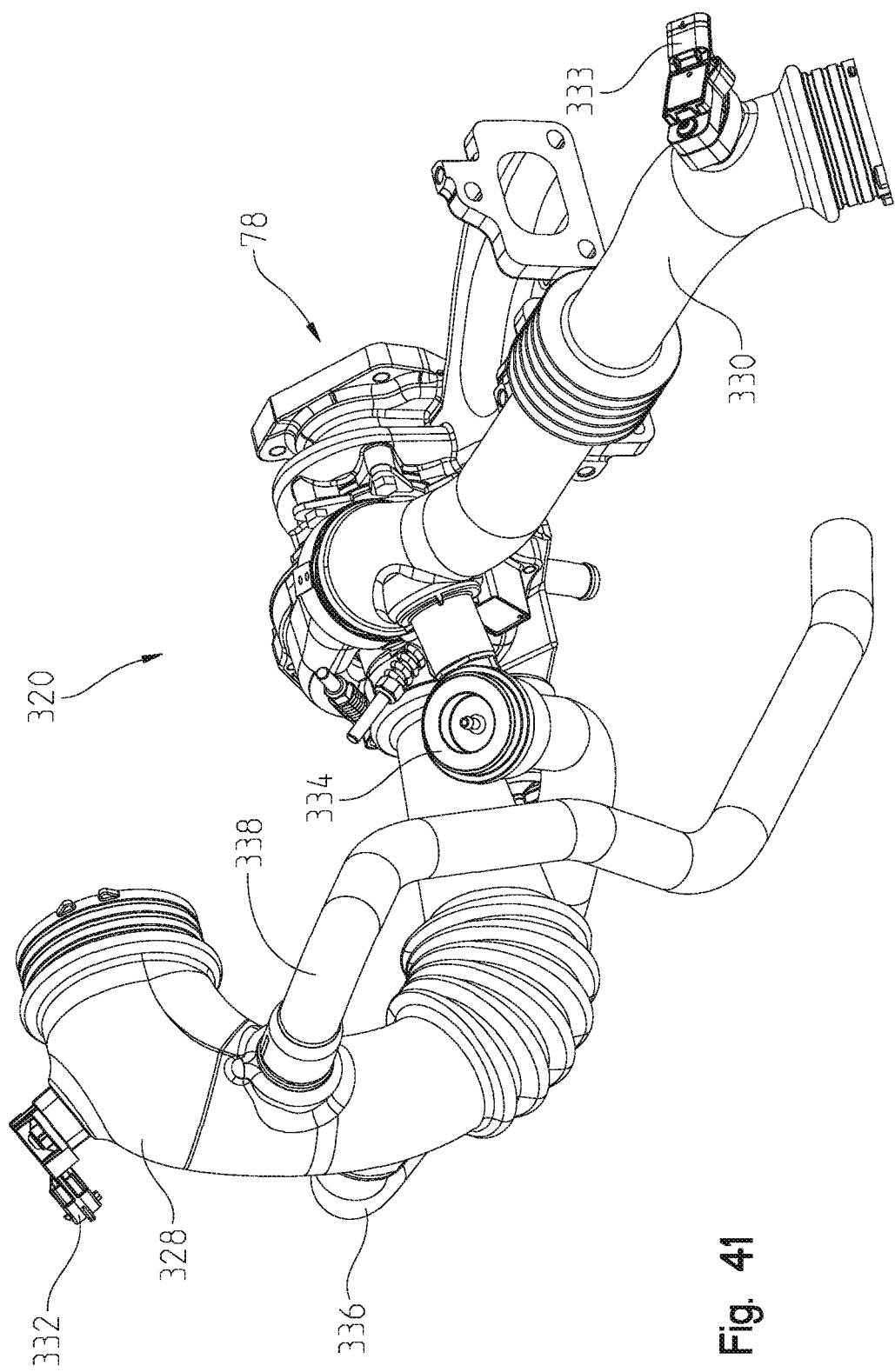
FIG. 41 is a left rear perspective view of a portion of the air intake assembly and the forced-air inducer of FIG. 40.

Referring to FIGS. 39-41, vehicle 2 includes an air intake assembly 320 fluidly coupled to powertrain assembly 70. Air intake assembly 320 includes an airbox 322, which includes a filter (not shown), an engine air intake tube 324, a CVT air intake tube 326 coupled to intake port 95 of CVT 76, a conduit 328 extending between airbox 322 and gaseous charger 78, and a charged air conduit 330 extending from charger 78. An air sensor 332 may be supported on conduit 328 and an air sensor 333 may be supported on charged air conduit 330, both of which determine various aspects of the air therein (e.g., pressure, temperature). For example, if the air temperature transmitted from at least one of sensors 332 and 333 is above a pre-determined limit, the throttle response of vehicle 2 may be limited such that the speed of vehicle 2 is automatically reduced until the temperature of the air at sensors 332 or 333 is reduced. Additionally, if a pressure signal from sensors 332, 333 indicates that a portion of air intake assembly 320, such as the filter, is plugged or block, the operator may be alerted.

Air intake assembly 320 may also include a blow-off valve 334 fluidly coupled to charged air conduit 330 and fluidly coupled to conduit 328 through a blow-off tube 336. Blow-off valve 334 is downstream from charger 78, as shown in FIG. 40. In an alternative embodiment, blow-off valve 334 may be a recirculation valve which is electronically controlled. Additionally, conduit 328 may be fluidly coupled to a crankcase breather conduit 338 which extends between conduit 328 and engine 72. Crankcase breather conduit 338 may include a roll-over valve (not shown) to prevent a back flow of oil into charger 78 if vehicle 2 begins to lean or otherwise is not upright.

During operation of vehicle 2, ambient air necessary for combustion within engine 72 enters engine air intake tube 324 and flows into airbox 322 to filter particulates and other matter therefrom. The filtered air from airbox 322 then flows into gaseous charger 78 through conduit 328. Operation of charger 78 may be done manually by the operator or automatically based on throttle conditions. When operating, charger 78 compresses the filtered air such that a higher number of air molecules may enter engine 72 through charged air conduit 330. As such, engine 72 is configured to received charged, pre-combustion air to increase the power output of powertrain assembly 70. However, depending on throttle and charger conditions (e.g., compressor surge conditions), it may be necessary to bleed off or exhaust at least a portion of the charged, pre-combustion air from charger 78 before entering engine 72. As such, blow-off valve 334 may be moved from a closed position to an open position in response to compressor surge conditions to allow a portion of the charged air in charged air conduit 330 to be routed back to conduit 328 through blow-off tube 336 or otherwise exhausted from vehicle 2. In this way, the quantity of charged, pre-combustion air entering engine 72 may be controlled in response to various throttle conditions or other parameters. Blow-off valve 334 may be electronically, mechanically, and/or fluidly controlled. Additionally, by routing air in blow-off tube 336 back to conduit 328, the sound from blow-off valve 334 may be reduced and the air within air intake assembly 320 downstream of airbox 322 remains filtered.

Figure 42:
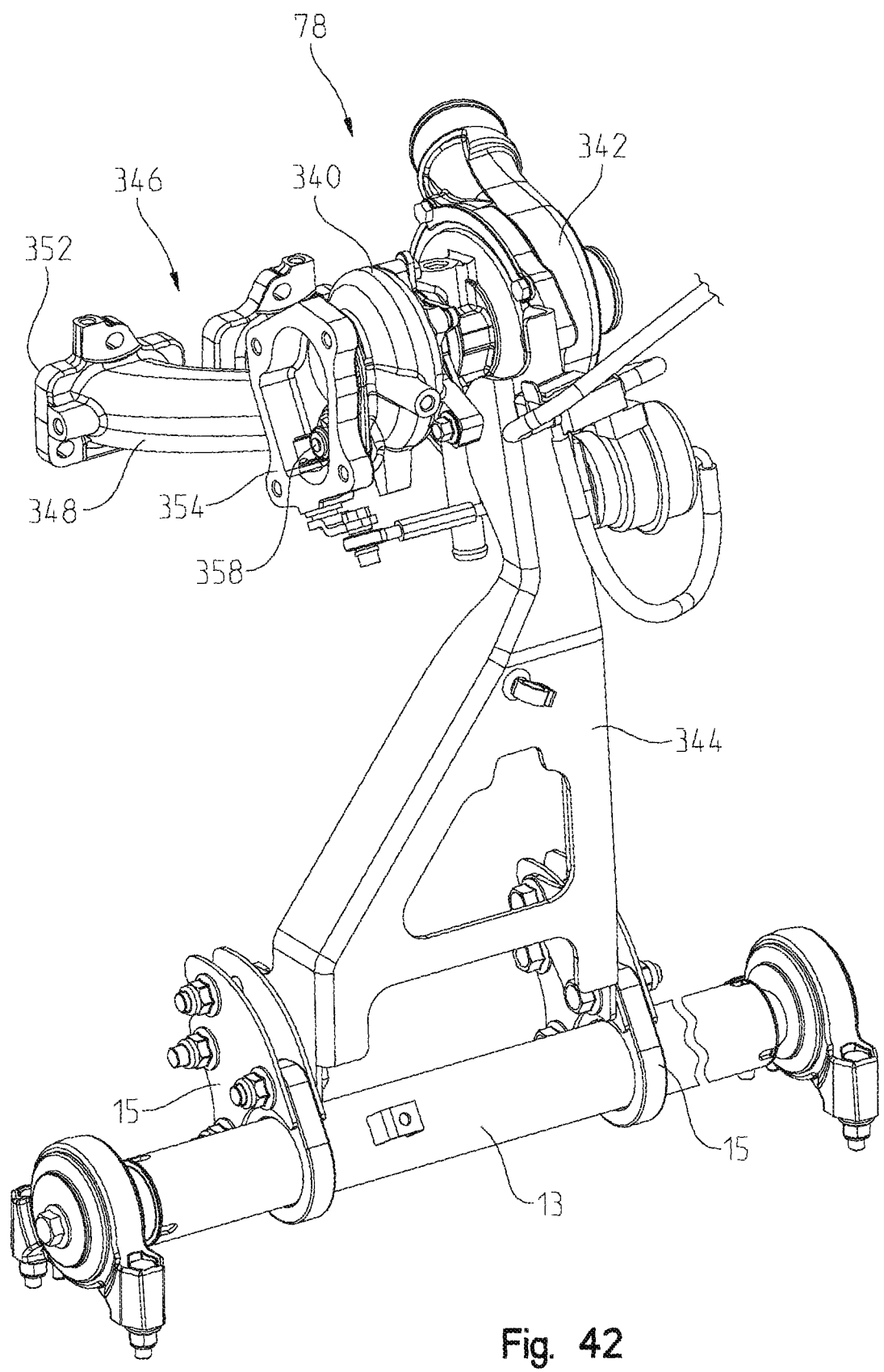
FIG. 42 is a right front perspective view of the forced-air inducer of FIG. 41 coupled to a frame arm and an exhaust manifold of the vehicle of FIG. 1.
Figure 43A:
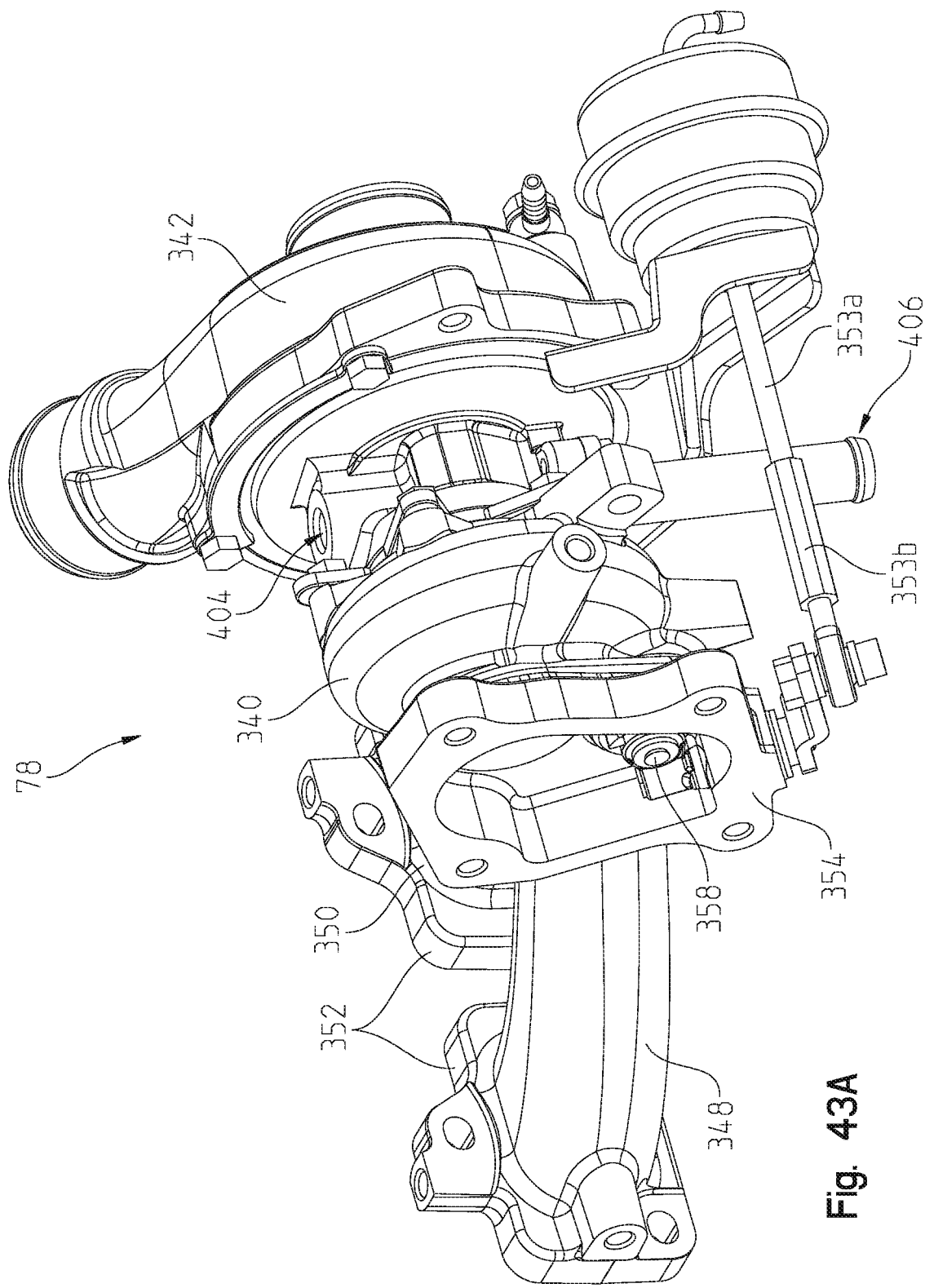
FIG. 43A is a right front perspective view of the forced-air inducer and exhaust manifold of FIG. 42, illustrating a waste gate and waste gate mass.
Figure 43B:
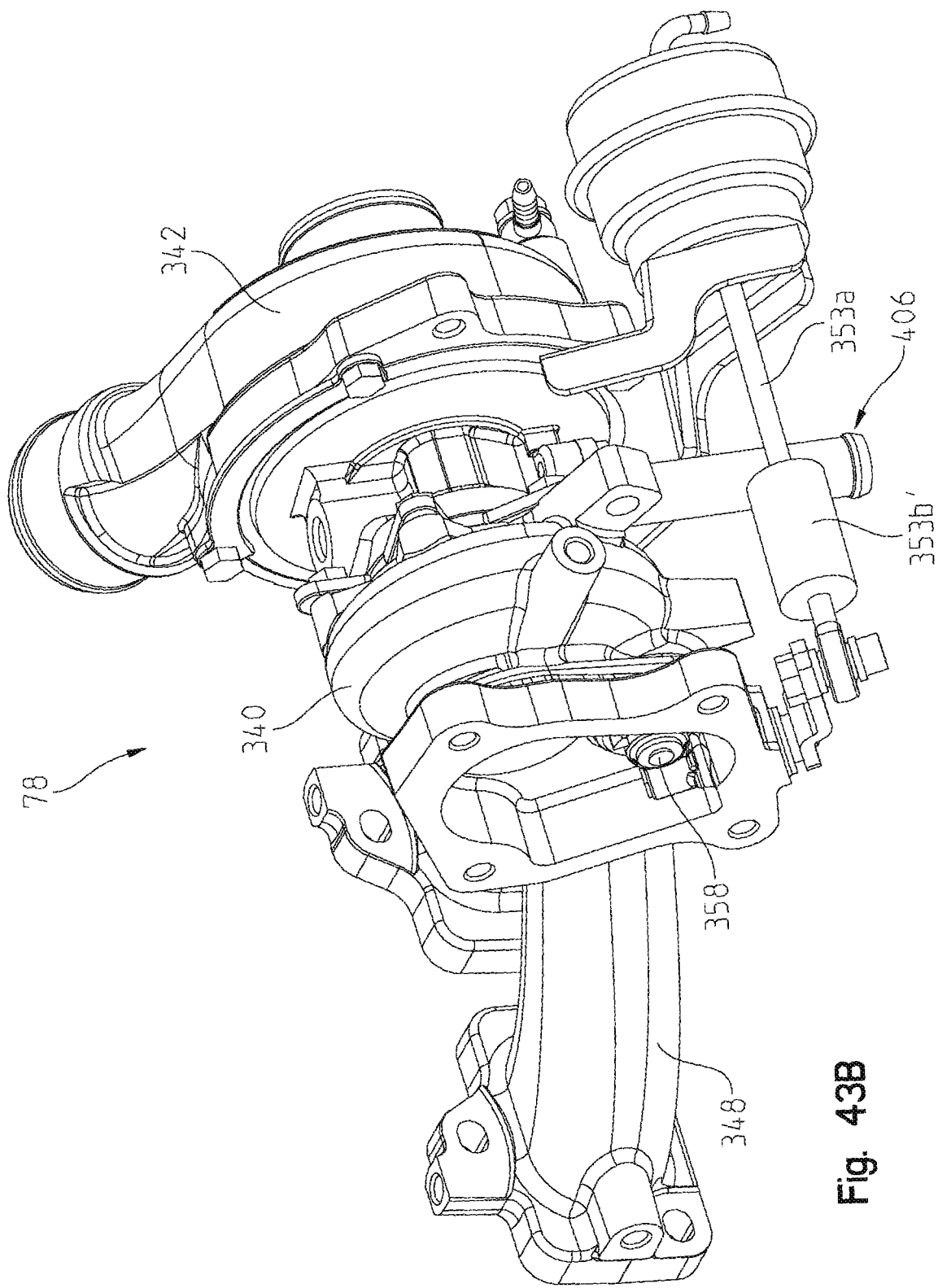
FIG. 43B is a right front perspective view of the forced-air inducer and exhaust manifold of FIG. 43B with an alternative embodiment waste gate mass.
Figure 44:
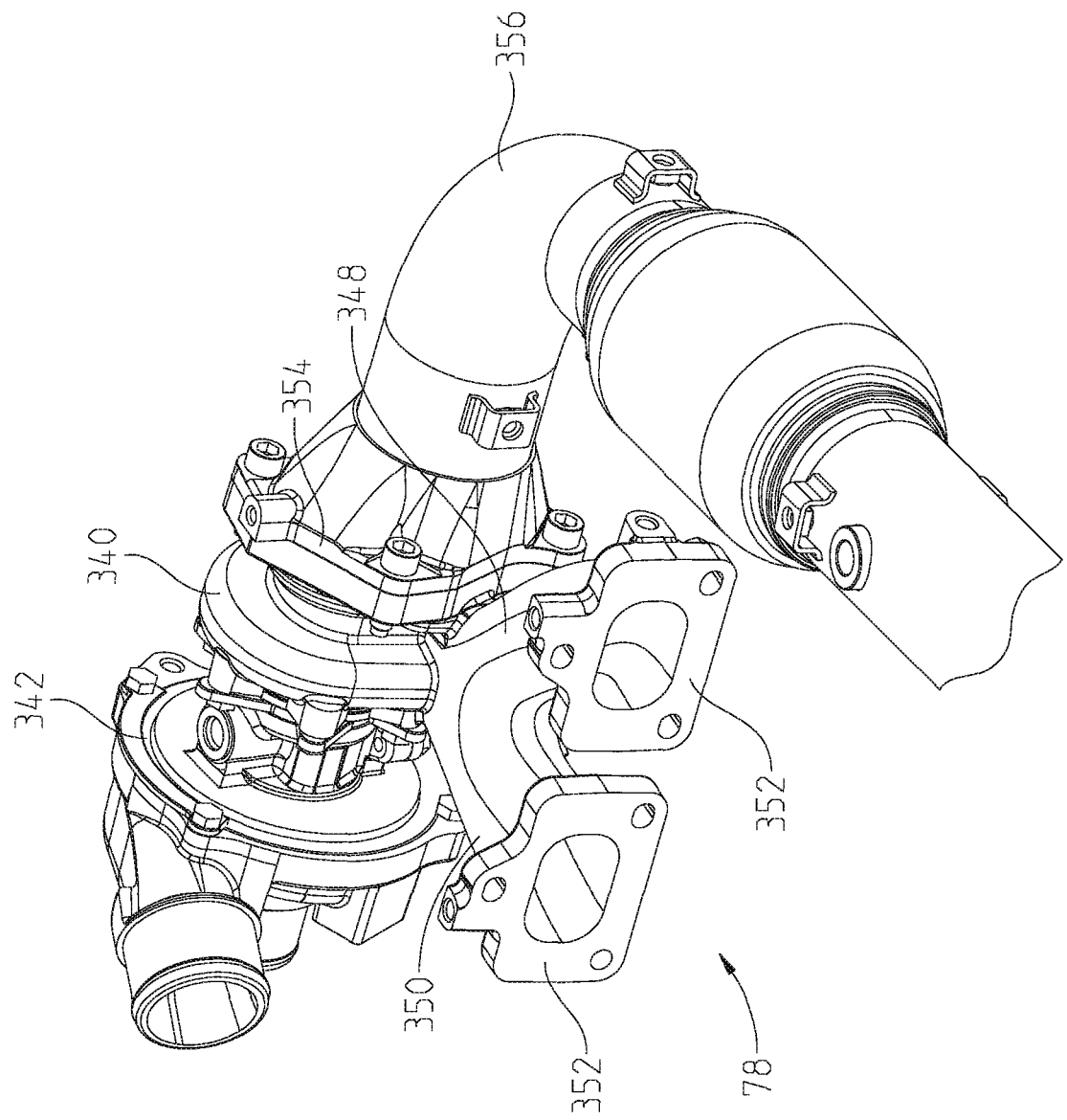
FIG. 44 is a right rear perspective view of the forced-air inducer and exhaust manifold of FIG. 43A.
Figure 45:
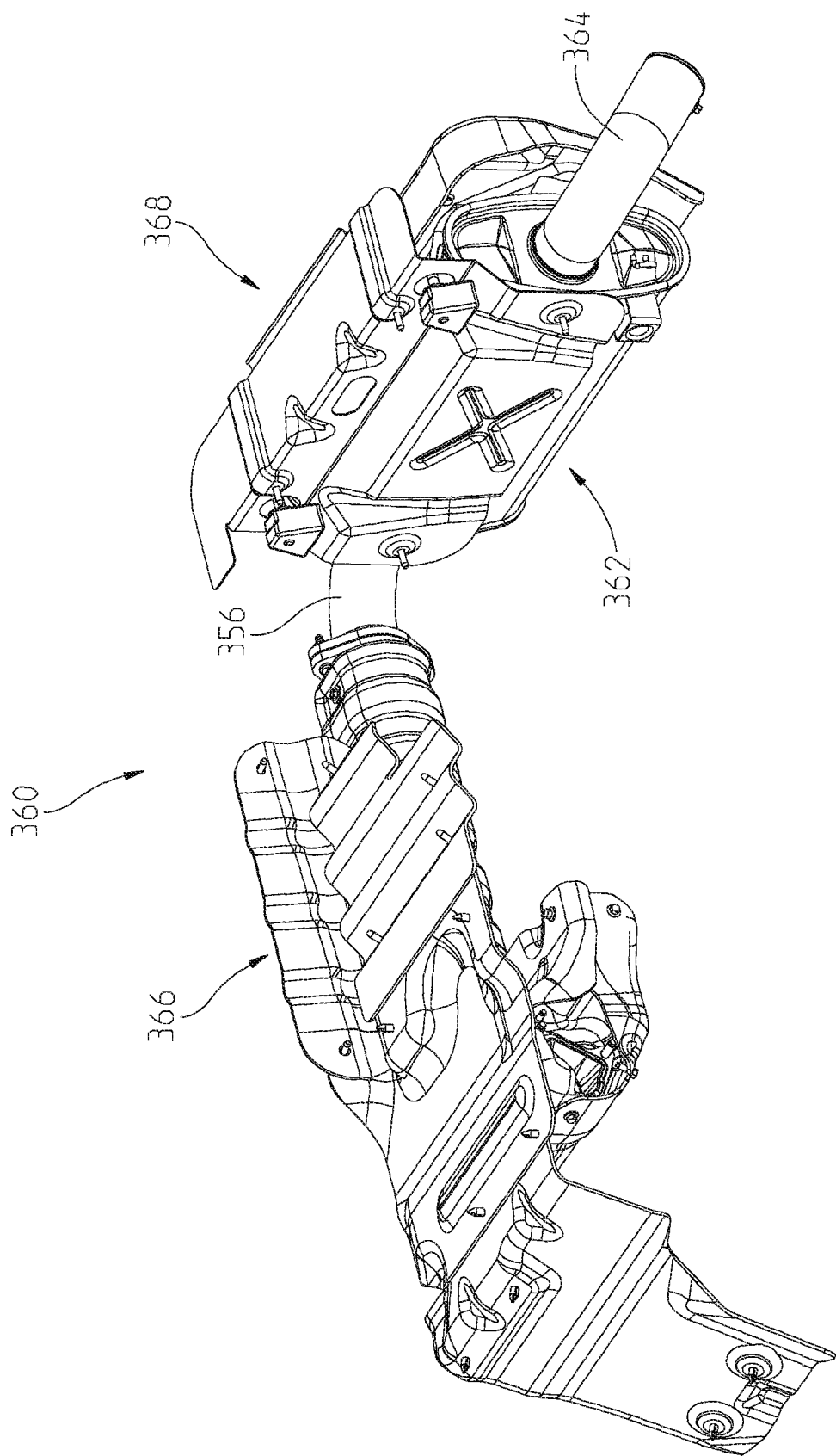
FIG. 45 is a left front perspective view of an exhaust assembly of the vehicle of FIG. 1.
Figure 46:
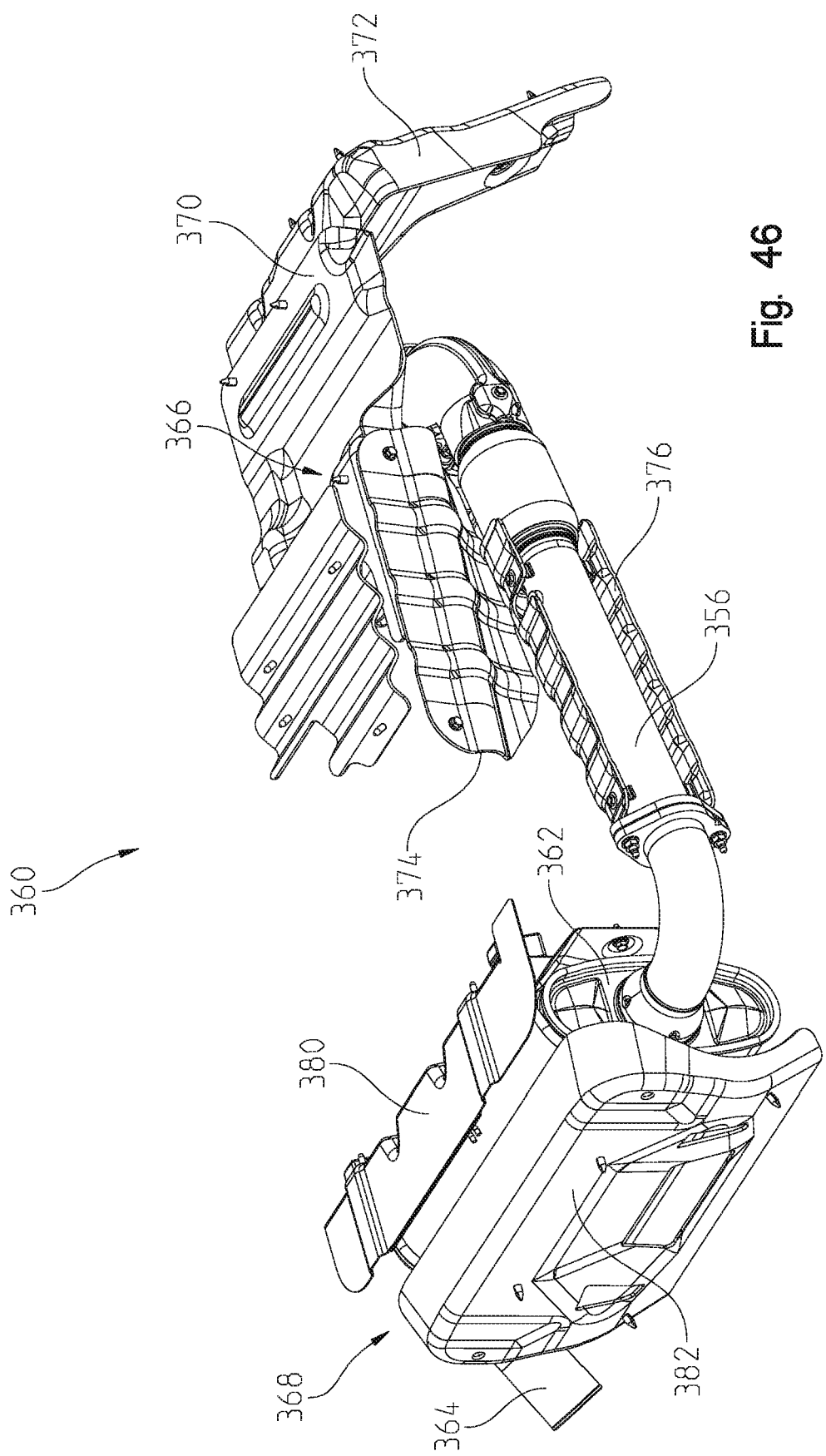
FIG. 46 is a right rear perspective view of the exhaust assembly of FIG. 45.

Referring to FIGS. 42-44, charger 78 is a forced-air inducer or gaseous charger, and in one embodiment, is a turbocharger. Charger 78 includes a drive or turbine housing 340 and a driven or compressor housing 342. Illustrative charger 78 supports a turbine (not shown) within drive housing 340 for receiving exhaust air from engine 72 and a compressor (not shown) within driven housing 342 for compressing the filtered air from conduit 328. The turbine and the compressor are rotatably coupled together such that the exhaust gases from engine 72 rotate the turbine, thereby causing operation of the compressor to compress the filtered air from conduit 328. Operation of charger 78 may be monitored by at least one sensor configured to determine various parameters of vehicle 2 and transmit signals to an engine control unit (not shown) or an electronic throttle control unit (not shown).

Driven housing 342 is supported by a frame arm 344 which extends between driven housing 342 and engine mount 13 and which may reduce resonant frequencies at charger 78. More particularly, frame arm 344 is coupled to brackets 15 of engine mount 13, such that brackets 15 are coupled to both engine 72 and frame arm 344. In this way, frame arm 344 may be uncoupled from engine mount 13 and swung or otherwise moved away therefrom in order to service charger 78. As such, other components of vehicle 2, including components of frame assembly 10 and powertrain assembly 70 are not affected when charger 78 is serviced because frame arm 344 is removed only through brackets 15 while all other components remain coupled at their respective positions. Drive housing 340 is cantilevered from a front portion of engine 72 and, as such, is supported via its mounting to engine 72. In this way, exhaust manifold 346 also is cantilevered from engine 72.

As shown in FIGS. 43A and 44, a unitary housing is positioned adjacent engine 72 and driven housing 342 and is defined by drive housing 340 being integral with an exhaust manifold 346 of engine 72. As such, drive housing 340 and exhaust manifold 346 define a single, unitary member such that drive housing 340 and exhaust manifold 346 have a fixed geometry relative to each other. In one embodiment, the unitary housing defined by the integral combination of drive housing 340 and exhaust manifold 346 is a cast component. Exhaust manifold 346 includes a first exhaust intake port 348 fluidly coupled to one of cylinders 80a, 80b and a second exhaust intake port 350 fluidly coupled to the other of cylinders 80a, 80b of engine 72. In particular, exhaust intake ports 348, 350 each include a first surface 352 which abuts engine 72. Because exhaust manifold 346 is directly coupled to engine 72 and is integral with charger 78, charger 78 is positioned in close proximity to engine 72 and, as shown in FIG. 14, is at least partially forward of engine 72 but at least partially rearward of operator area 20.

Additionally, exhaust manifold 346 includes a second surface 354 for abutting and coupling with an exhaust tube 356 of exhaust assembly 360. Second surface 354 is integral with exhaust intake ports 348, 350 and drive housing 340 of charger 78. A waste gate 358 is positioned adjacent second surface 354. Waste gate 358 may include a solenoid valve and is configured to bleed off or exhaust at least a portion of the exhaust gases operating the turbine of charger 78 so as to be able to alter the speed of the turbine and, therefore, operation of charger 78. However, overboost may occur when charger 78 boosts higher than waste gate 358 is configured to allow, therefore, boost pressure may be monitored and internally read by the engine control unit, rather than displayed on a gauge to the operator. Waste gate 358 may be electronically, mechanically, and/or fluidly controlled. Waste gate 358 further includes a waste gate rod 353a and a waste gate mass 353b coupled to waste gate rod 353a. Waste gate mass 353b counteracts resonance or movement in waste gate rod 353a. In one embodiment, as shown in FIG. 43A, waste gate mass 353b may have an octagonal or hexagonal cross-section. Alternatively, as shown in FIG. 43B, a waste gate mass 353b' may have a cylindrical configuration with a circular cross-section.

Referring to FIGS. 45-49, exhaust assembly 360 is shown and includes exhaust tube 356, an elbow portion 357 of exhaust tube 356, a flex joint 359 which couples together elbow portion 357 and exhaust tube 356, a muffler 362, an exhaust pipe 364, an exhaust tube heat shield assembly 366, and a muffler heat shield assembly 368. Exhaust assembly 360 routes the exhaust gases from engine 72 toward a rear end of vehicle 2 to flow from vehicle 2.

The exhaust gases from engine 72 have an elevated temperature and, therefore, the components of exhaust assembly 360 also be at an elevated temperature. For example, charger 78 may be a heat sink. Heat shield assemblies 366, 368 are comprised of insulating materials to shield various components of vehicle 2 from the heat of exhaust assembly 360. Heat shield assembly 368 includes a forward member 380 positioned forward of muffler 362 and a rearward member 382 positioned rearward of muffler 362. Forward and rearward members 380, 382 of heat shield assembly 368 are coupled together with conventional fasteners and shield various components of vehicle 2 from the heat of muffler 362.

Figure 47:
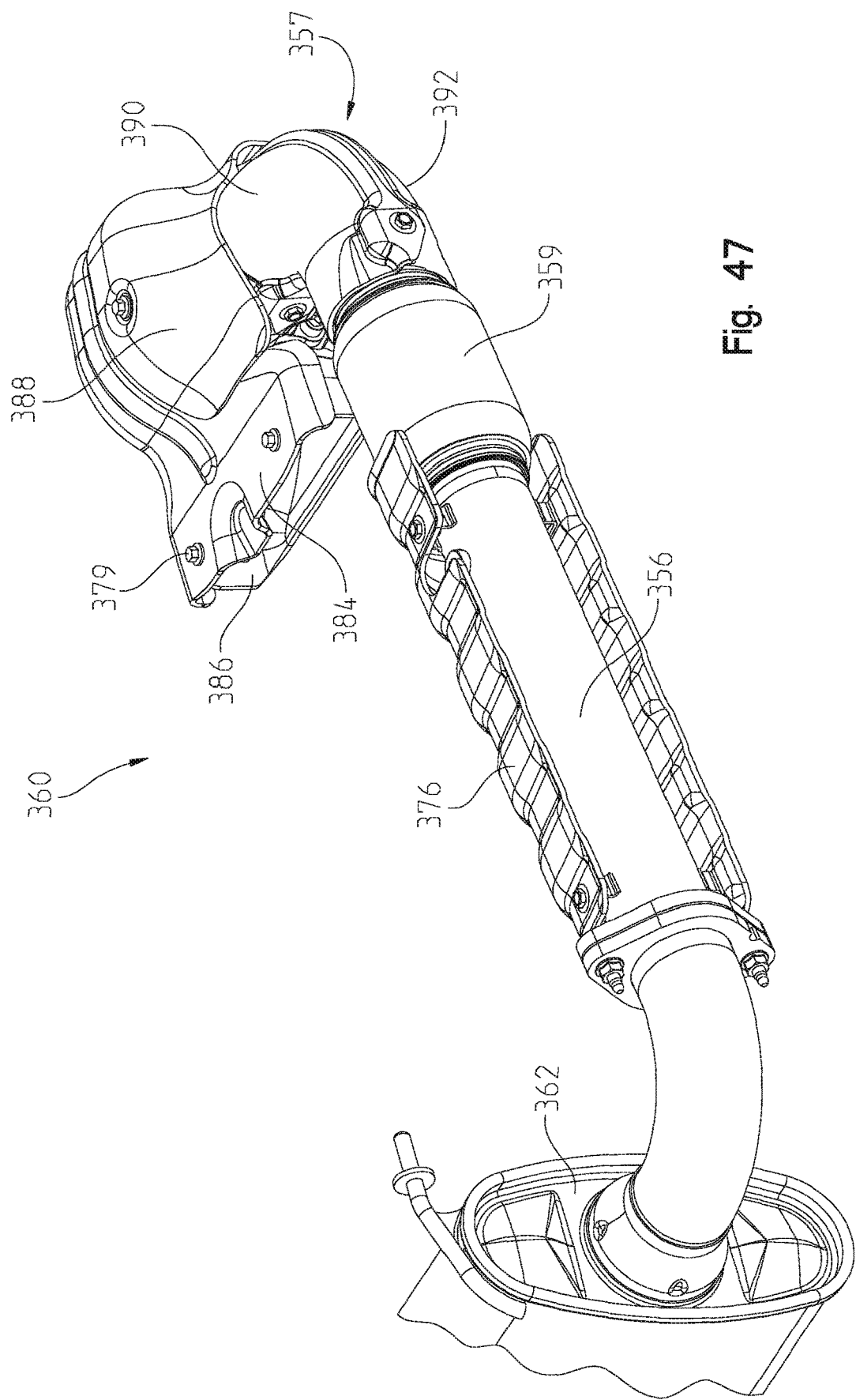
FIG. 47 is a right rear perspective view of a portion of the exhaust assembly of FIG. 46.
Figure 48:
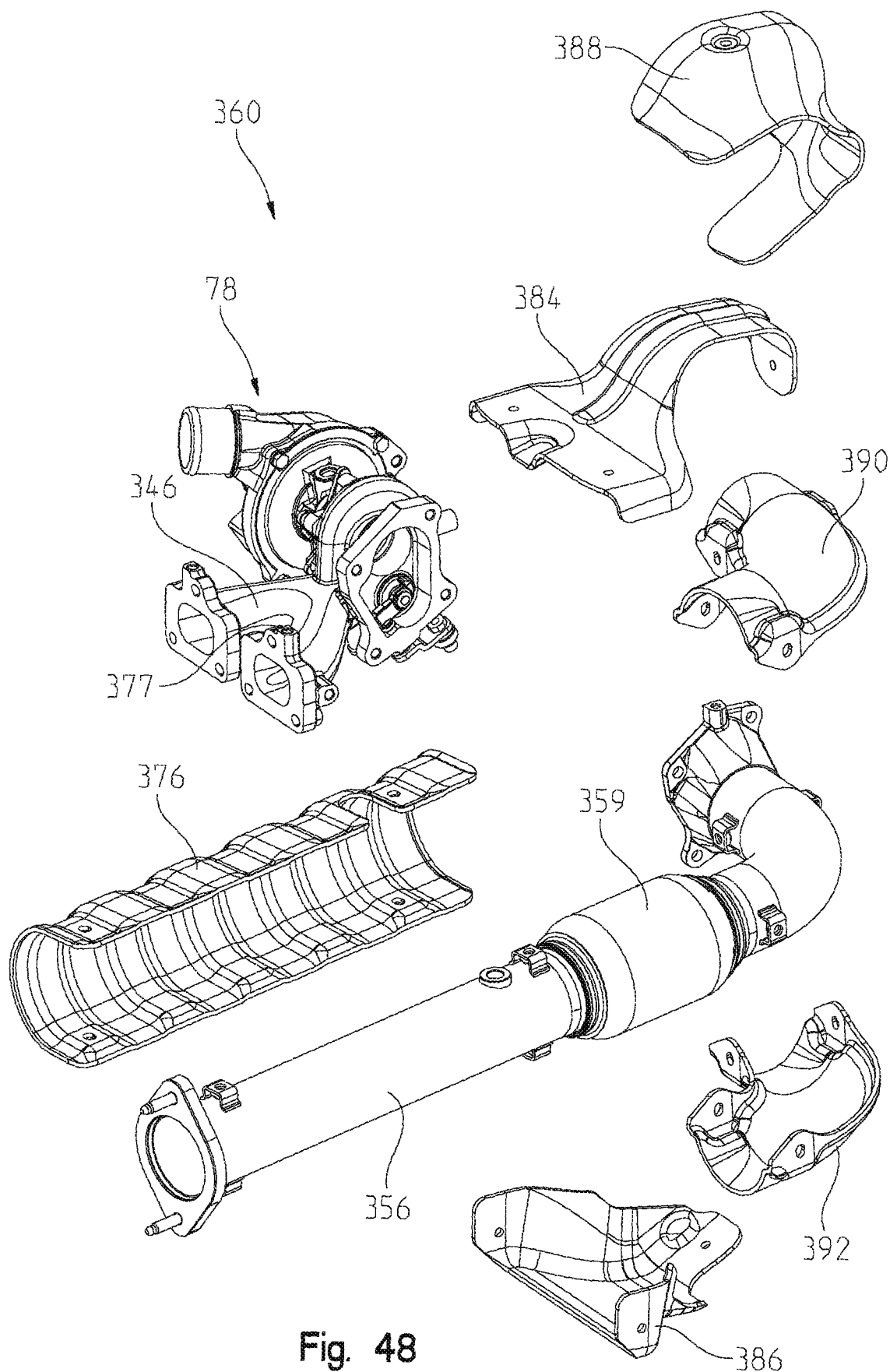
FIG. 48 is an exploded view of a portion of the exhaust assembly of FIG. 46.
Figure 49:
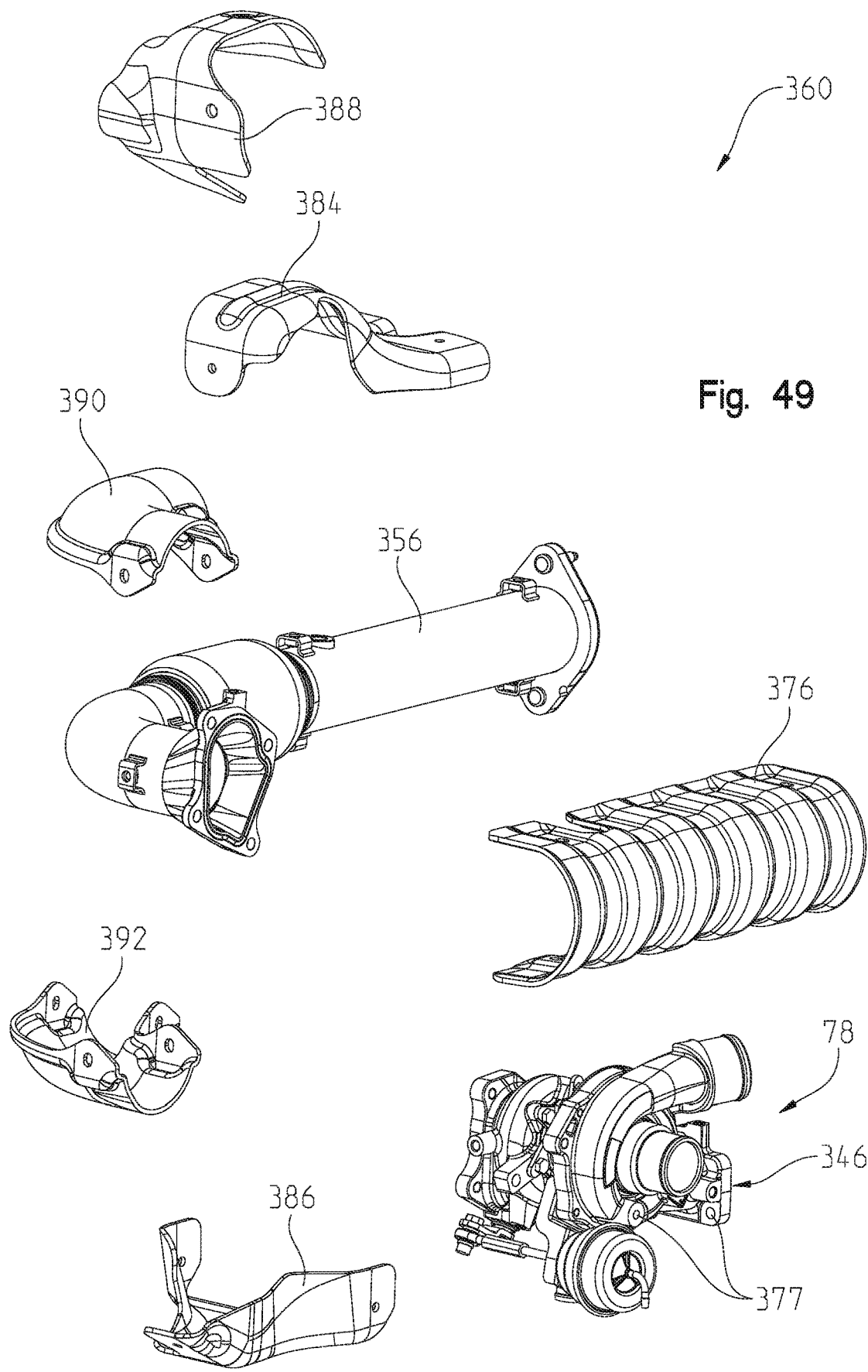
FIG. 49 is a further exploded view of a portion of the exhaust assembly of FIG. 46.

Heat shield assembly 366 is positioned longitudinally forward of heat shield assembly 368 and includes an upper member 370 positioned above exhaust manifold 346, a forward member 372 positioned longitudinally forward of exhaust manifold 346, a lateral member 374 positioned above a portion of exhaust tube 356, and a conduit member 376 having a generally semi-circular cross-section and extending around at least a portion of the outer perimeter of exhaust tube 356. Additionally, heat shield assembly 366 includes an upper manifold member 384, a lower manifold member 386, and a forward manifold member 388 which may be coupled together with convention fasteners, for insulating various components of vehicle 2 from the heat of exhaust manifold 346. In one embodiment, upper and lower manifold members 384, 386 define a "clam shell" configuration which generally surrounds exhaust manifold 346. Furthermore, charger 78 and/or exhaust manifold 346 includes mounting bosses 377 for coupling heat shield assembly 366 thereto. Fasteners 379, such as high-strength steel bolts, may be received within mounting bosses 377 (FIGS. 47 and 48). Heat shield assembly 366 further includes a first elbow member 390 and a second elbow member 392 for surrounding elbow portion 357 of exhaust tube 356. First and second elbow members 390, 392 are coupled together with conventional fasteners.

Figure 50:
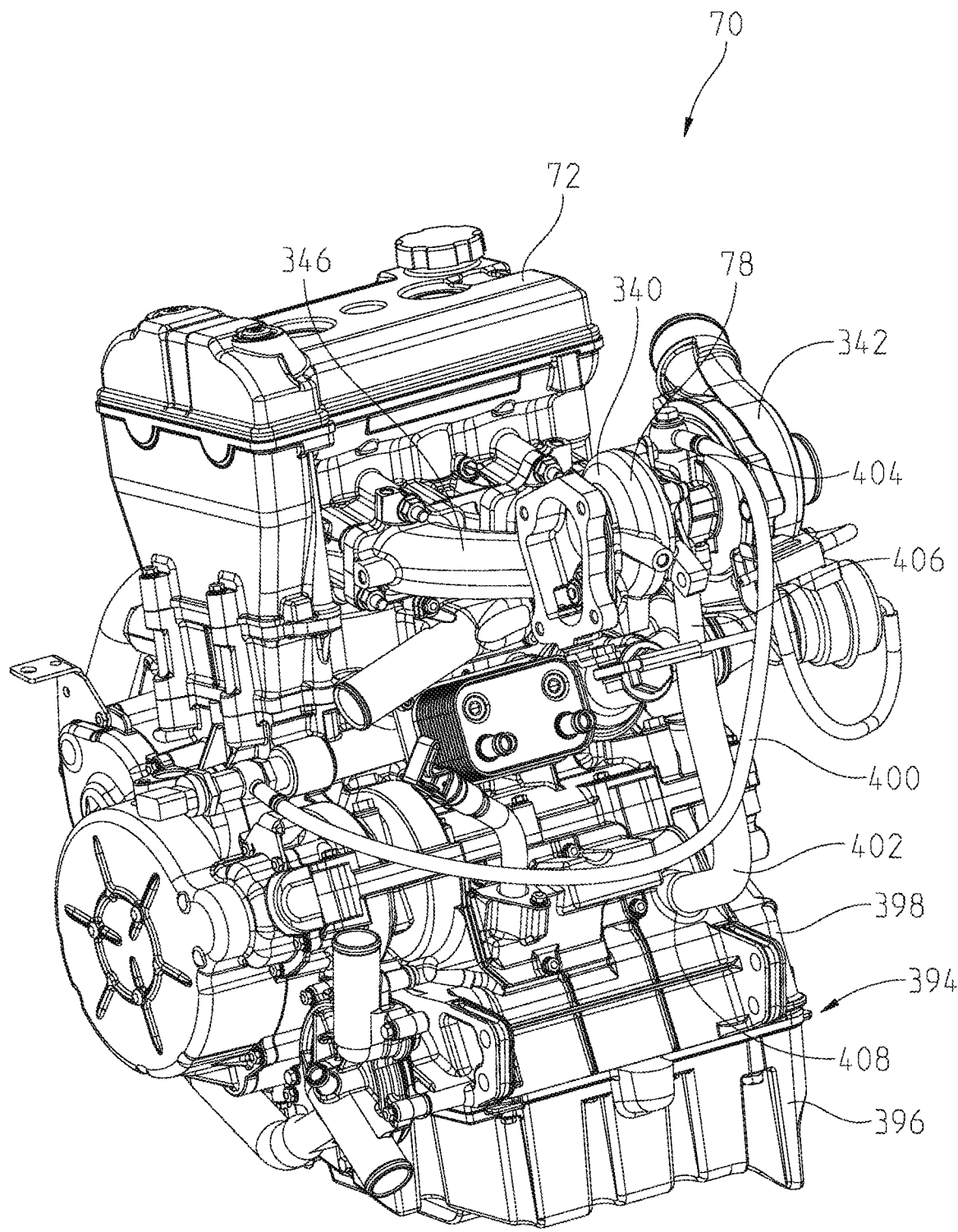
FIG. 50 is a right front perspective view of oil conduits fluidly coupled to the engine and the forced-air inducer of the powertrain assembly of FIG. 15.

In order to reduce the temperature of various components of powertrain assembly 70, a cooling assembly 410 is provided. Additionally, oil for lubricating engine 72, charger 78, and other components of powertrain assembly 70 may be cooled by cooling assembly 410. With reference to FIG. 50, engine 72 includes oil sump 394, which includes a lower portion 396 and an upper portion 398, coupled together with conventional fasteners and a seal (not shown). In one embodiment, oil sump 394 is a closed deck configuration, which may increase the stiffness thereof compared to an open deck configuration. Oil from oil sump 394 flows to and from various components of engine 72, such as crankshaft 84, in order to provide lubrication thereto. Additionally, oil from oil sump 394 flows to and from charger 78 in order to lubricate various components therein, as well. More particularly, as shown in FIG. 50, an oil supply line or conduit 395 is fluidly coupled to oil sump 394 and an oil supply port 404 on charger 78 for supplying oil from engine oil sump 394 to charger 78. An oil return line or conduit 397 is fluidly coupled to an oil return port 406 on charger 78 and a port 408 on engine 72 for returning oil from charger 78 to oil sump 394 of engine 72. As shown in FIG. 50, port 408 is positioned above oil sump 394. In this way, oil from the engine oil sump 394 is used to lubricate components of both engine 72 and charger 78 such that a secondary oil system for charger 78 may not be utilized.

Referring to FIGS. 51-62, cooling assembly 410 of vehicle 2 is shown. Cooling assembly 410 includes a first cooling circuit or system 412 for altering a temperature of engine 72 and a second cooling system or circuit 414 for altering a temperature of the intake air for engine 72.

Figure 53:
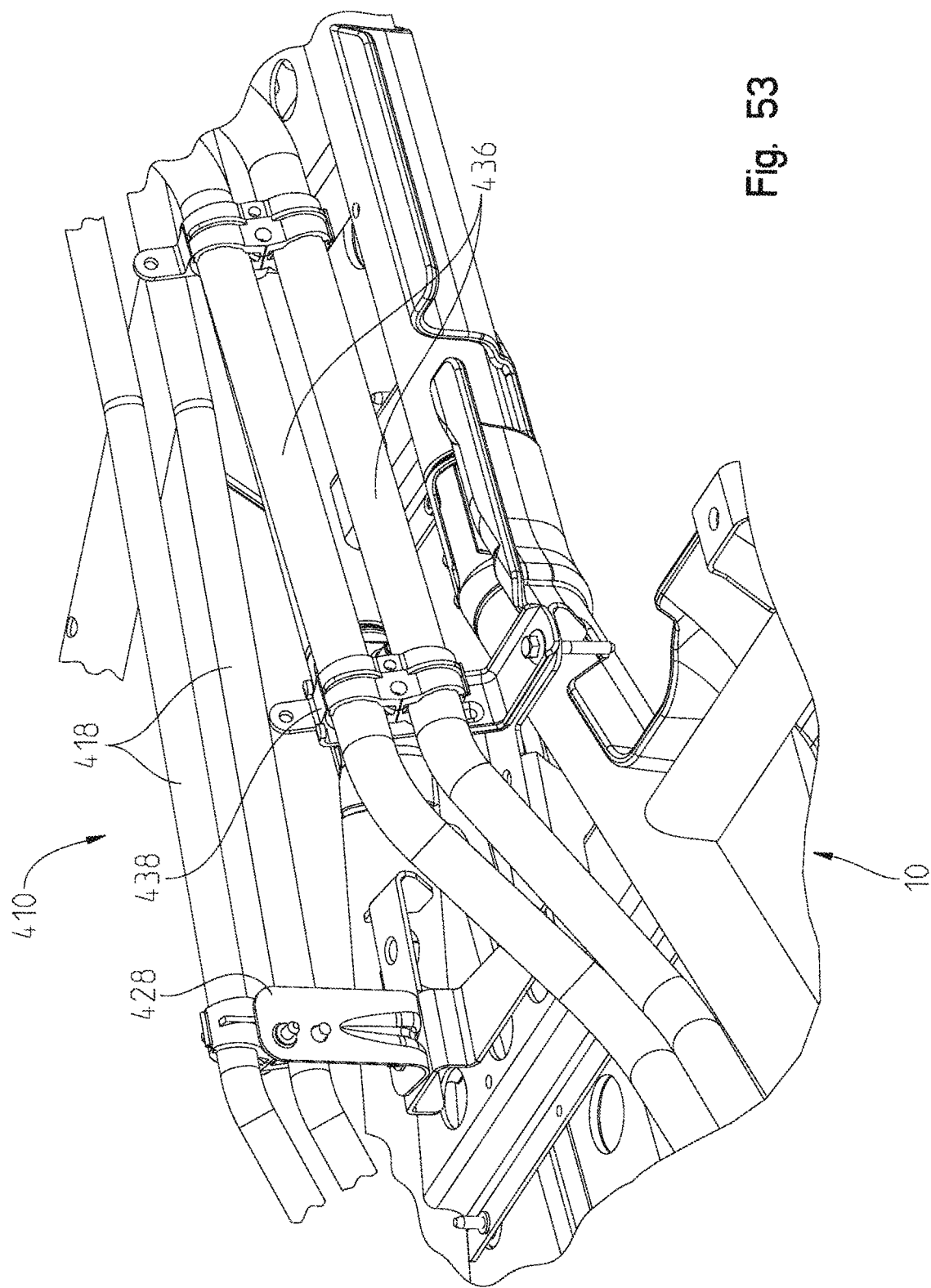
FIG. 53 is a front left perspective view of cooling lines of the cooling assembly of FIG. 53.
Figure 54:
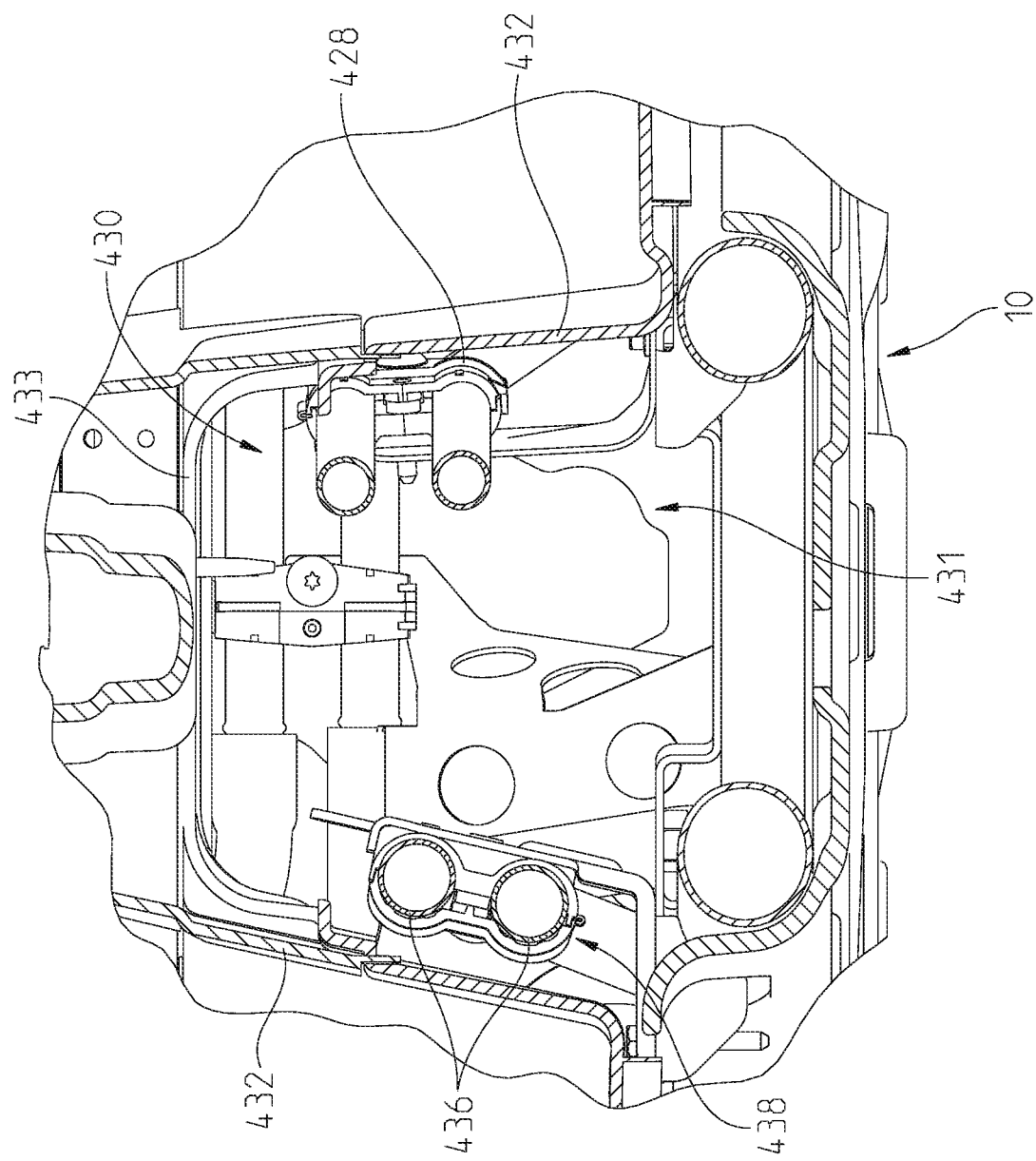
FIG. 54 is a cross-sectional view of the cooling lines of FIG. 56.

Second cooling circuit 414 a low-temperature circuit which includes a heat exchanger or radiator 416 supported by front portion 12 of lower frame assembly 10. Heat exchanger 416 is positioned forward of operator area 20. Heat exchanger 416 is fluidly coupled to a coolant reservoir, illustratively a coolant bottle 424, and a plurality of low-temperature cooling lines 418. Low-temperature cooling lines 418 extend from front portion 12 to rear portion 14 of lower frame assembly 10. Illustratively, as shown in FIGS. 53 and 54, low-temperature cooling lines 418 are coupled to lower frame assembly 10 through a bracket 428 and extend through a tunnel 430 of vehicle 2. Tunnel 430 is defined by vertically-extending side walls 432 which extend into operator area 20. Side walls 432 also extend generally parallel to centerline $C_L$ of vehicle 2. Additionally, tunnel 430 includes an upper wall 433 which, together with side walls 432, define interior volume or space 431 of tunnel 430.

A first low-temperature cooling line 418a is a cooling supply line which is coupled to a pump 420 for pumping cooling fluid to a heat exchanger, illustratively an intercooler 426 (FIG. 62) of second cooling circuit 414, through an intercooler supply line 422. A second low-temperature cooling line 418b is a return line which is fluidly coupled to intercooler 426 and heat exchanger 416 in order to return cooling fluid to heat exchanger 416. As detailed further herein, cooling fluid, for example coolant, oil, or water, circulates through first low-temperature cooling line 418a, to pump 420, through conduit 422, and into intercooler 426, such that when the charged, pre-combustion air from charger 78 passes over or through intercooler 426, the temperature of the charged, pre-combustion air decreases before the air enters cylinders 80a, 80b of engine 72. The cooling fluid within intercooler 426 is then returned to heat exchanger 416 in order to decrease the temperature of the cooling fluid when ambient air passes through heat exchanger 416.

Figure 57:
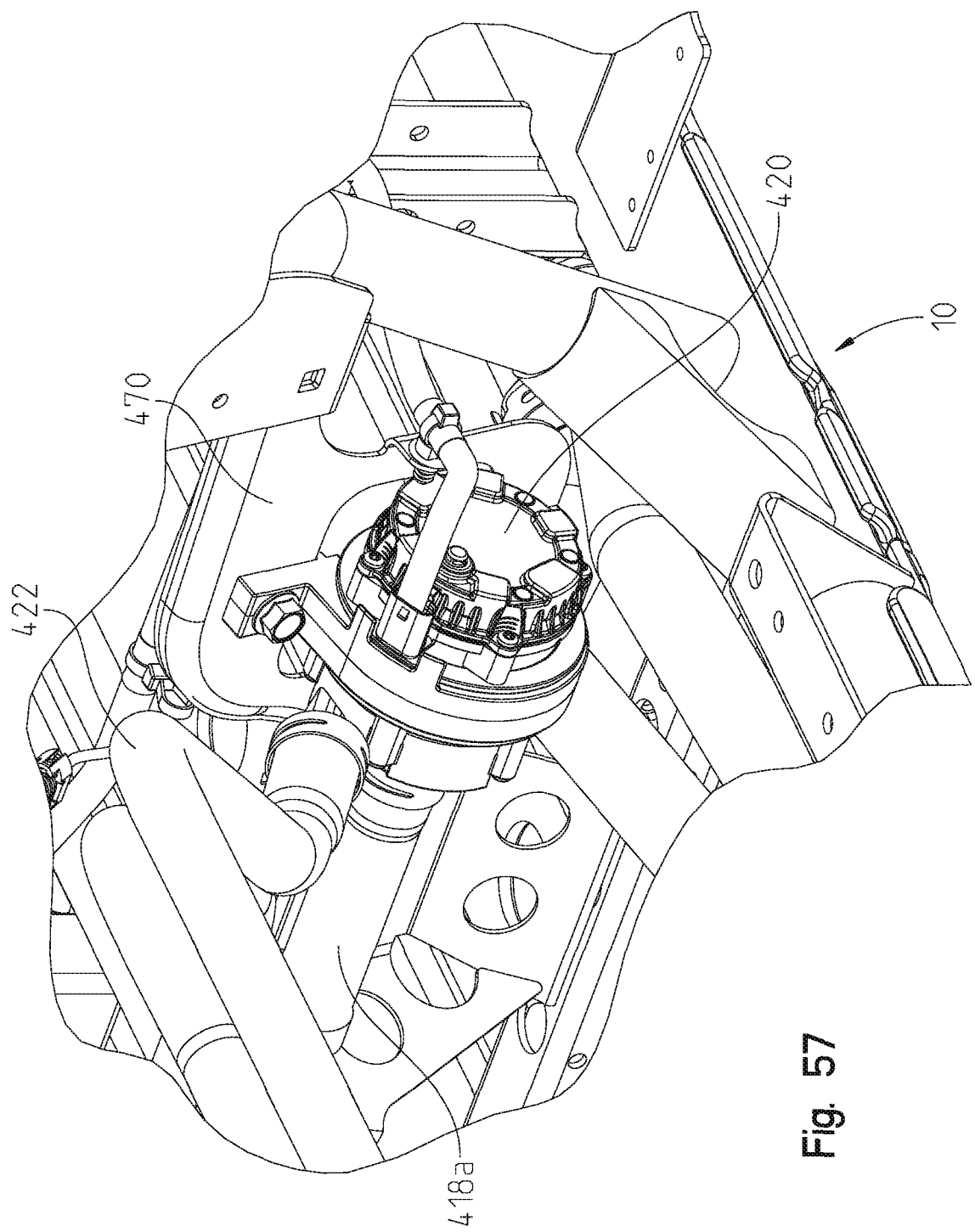
FIG. 57 is a perspective view of a water pump of the cooling assembly of FIG. 52.
Figure 58:
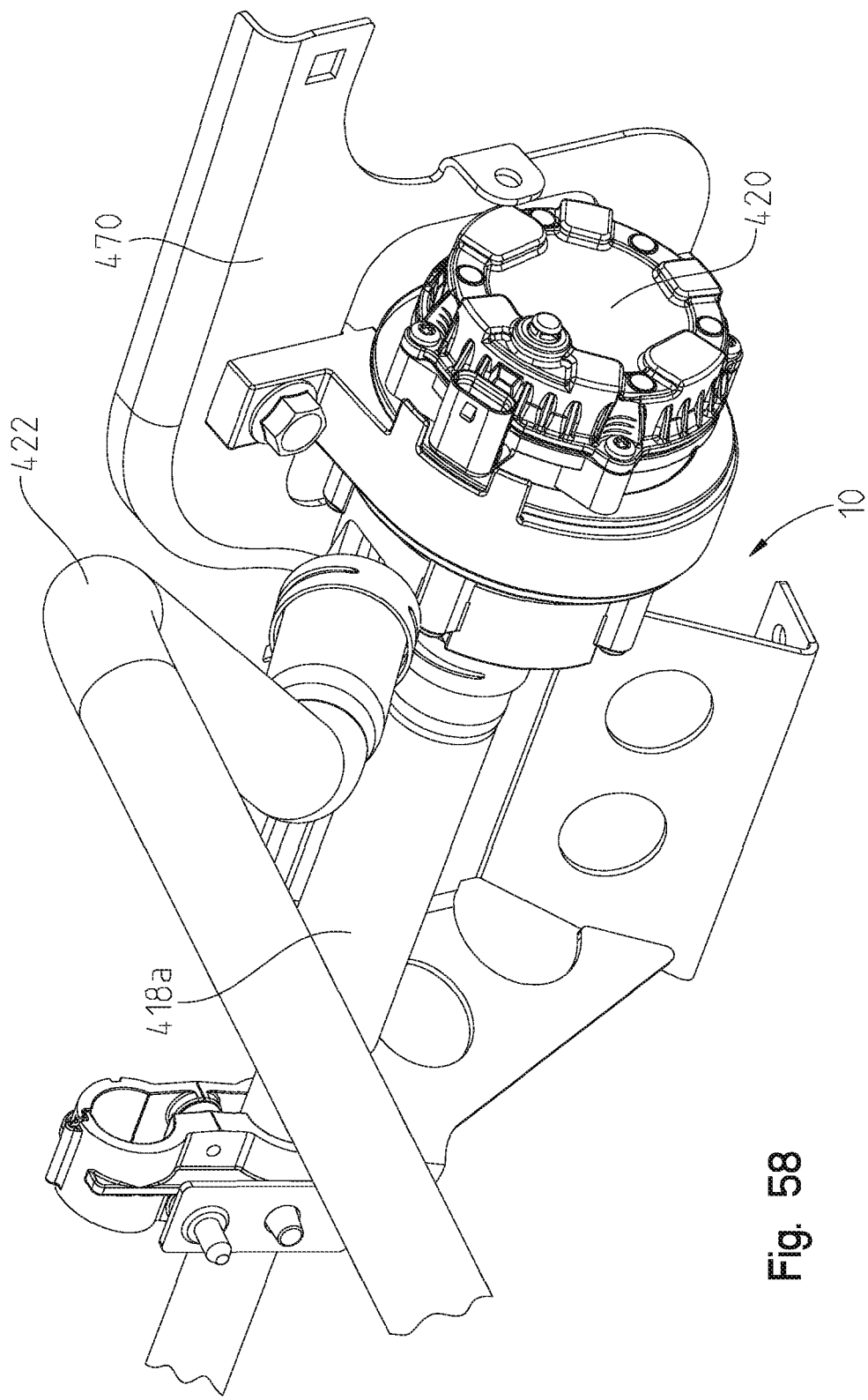
FIG. 58 is a further perspective view of the water pump of FIG. 57.

As shown in FIGS. 57 and 58, pump 420 may be coupled to a bracket 470 on lower frame assembly 10. In one embodiment, pump 420 is an electric water pump. In another embodiment, pump 420 may be a mechanical pump configured to receive cooling fluid from cooling line 418a and flow the cooling fluid into conduit 422 for supplying to intercooler 426. Pump 420 also may be configured to operate at differing speeds in order to control the electrical load and accurately alter temperature of the cooling fluid. In one embodiment, pump 420 may only be configured to operate when engine 72 is operating. In a further embodiment, pump 420 and other components may be configured for variable operation, rather than at full capacity ("full on") or completely off, in order to lower the electrical load.

Referring to FIGS. 51-55, first cooling circuit 412 includes a heat exchanger or radiator 434 supported by front portion 12 of lower frame assembly 10 and a pump 435 operably coupled to engine 72 (FIG. 15). In one embodiment, pump 435 is a mechanical pump configured to receive and distribute the cooling fluid (e.g., water, coolant, oil) to engine 72. Additionally, cooling assembly 410 may include a third pump, in addition to pumps 420 and 435, which may be operably coupled to engine 72. The third pump may be electrically or mechanically controlled.

Heat exchanger 434 is fluidly coupled to coolant bottle 424 and a plurality of high-temperature cooling lines 436. High-temperature cooling lines 436 extend from front portion 12 to rear portion 14 of lower frame assembly 10. As shown in FIG. 54, the diameter of cooling lines 436 is greater than the diameter of cooling lines 418. Illustratively, as shown in FIGS. 53 and 54, high-temperature cooling lines 436 are coupled to lower frame assembly 10 through a bracket 438 and extend through tunnel 430. A first high-temperature cooling line 436a is a cooling supply line and a second high-temperature cooling line 436b is a return line, both of which are fluidly coupled to engine 72 and heat exchanger 434. As detailed further herein, the cooling fluid circulates through first high-temperature cooling line 436a and to a portion of engine 72 in order to cool engine 72 (e.g., cool the engine oil). The cooling fluid is then returned from engine 72 to heat exchanger 434 in order to decrease the temperature thereof when ambient air passes through heat exchanger 434.

Figure 55:
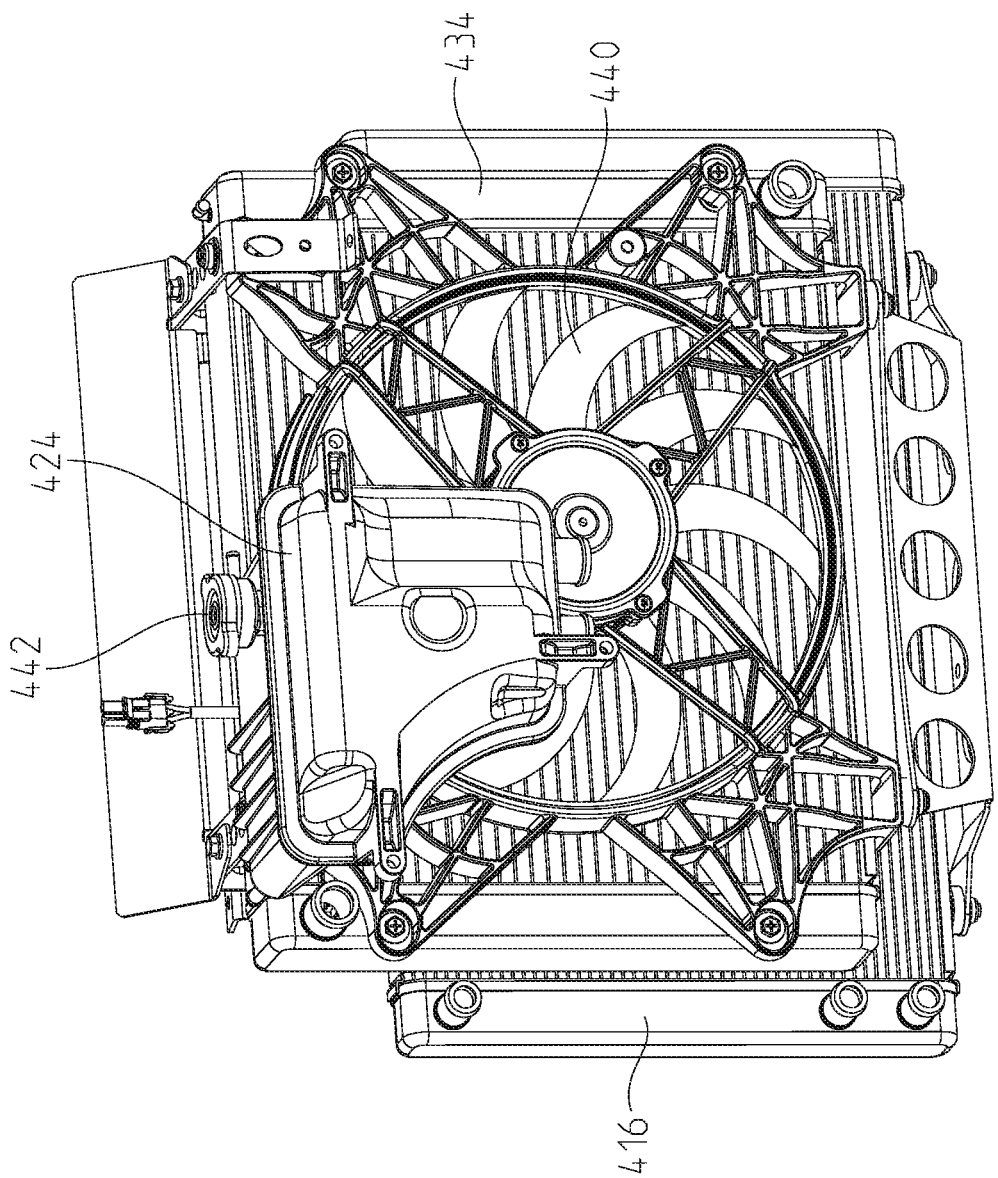
FIG. 55 is a rear view of a first heat exchanger and a second heat exchanger of the cooling assembly of FIG. 52.
Figure 56:
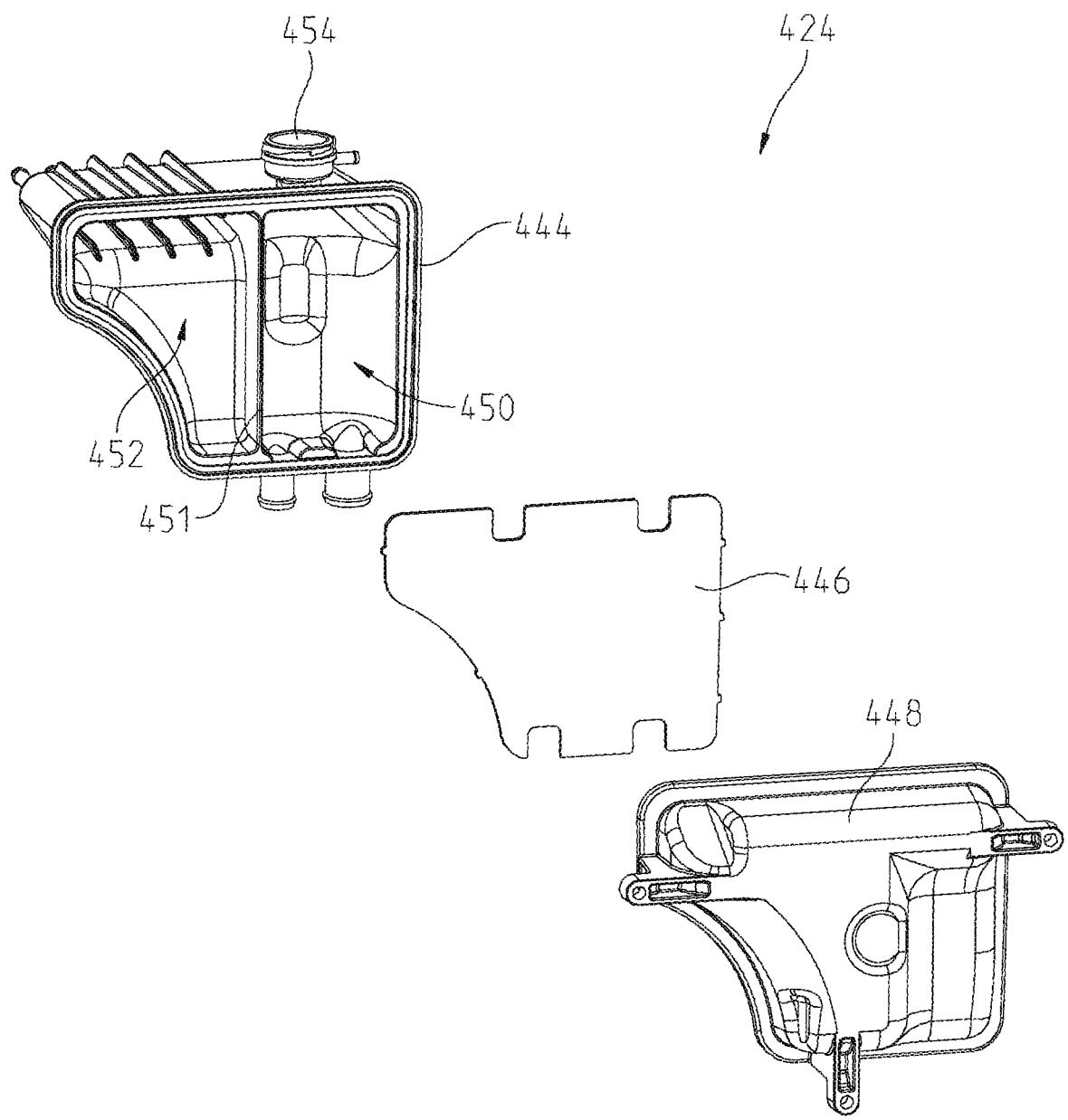
FIG. 56 is an exploded view of a cooling fluid reservoir of the cooling assembly of FIG. 52.

As shown in FIGS. 55 and 56, a fan 440 is positioned rearward of heat exchangers 416 and 434 for drawing ambient air through heat exchangers 416, 434 to decrease the temperature of the cooling fluid. As such, both heat exchangers 416, 434 utilize fan 440, which may be cycled on and off based on temperature of the cooling fluid, temperature at intercooler 426, and/or temperature at heat exchangers 416, 434.

The cooling fluid is stored in coolant bottle 424, which is also position rearward of heat exchangers 416, 434 and fan 440. Coolant bottle 424 is a pressurized reservoir which includes a pressurized cap 442, a first housing member 444, an intermediate member 446, and a second housing member 448. As shown in FIG. 56, first housing member 444 is positioned forward of intermediate member 446 and second housing member 448 such that intermediate member 446 is positioned between first and second housing members 444, 448. First housing member 444 includes an internal wall or baffle 451 which divides first housing member 444 into a first compartment 450 fluidly coupled to first cooling circuit 412 through heat exchanger 434 and a second compartment 452 fluidly coupled to second cooling circuit 414 through heat exchanger 416. As such, coolant bottle 424 is a single reservoir configured to supply cooling fluid to both first and second cooling circuits 412, 414. Additionally, only one supply of cooling fluid is necessary to fill both first and second compartments 450, 452 because the cooling fluid may be supplied through a port 454 which supplies the cooling fluid to both first and second compartments 450, 452 simultaneously. Pressurized cap 442 is coupled to port 454 to close coolant bottle 424.

Figure 51:
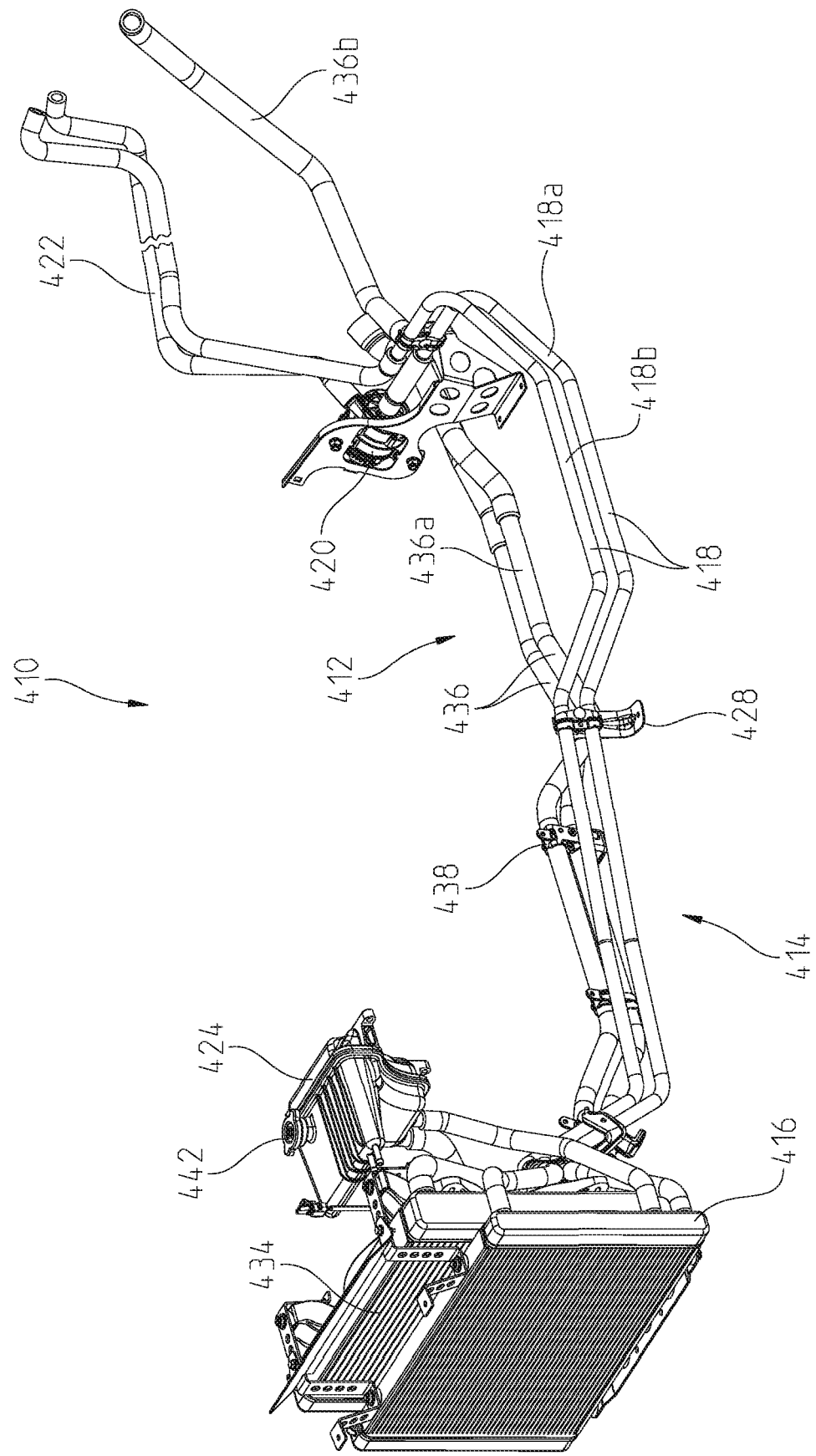
FIG. 51 is a left front perspective view of a cooling assembly of the vehicle of FIG. 1.
Figure 52:
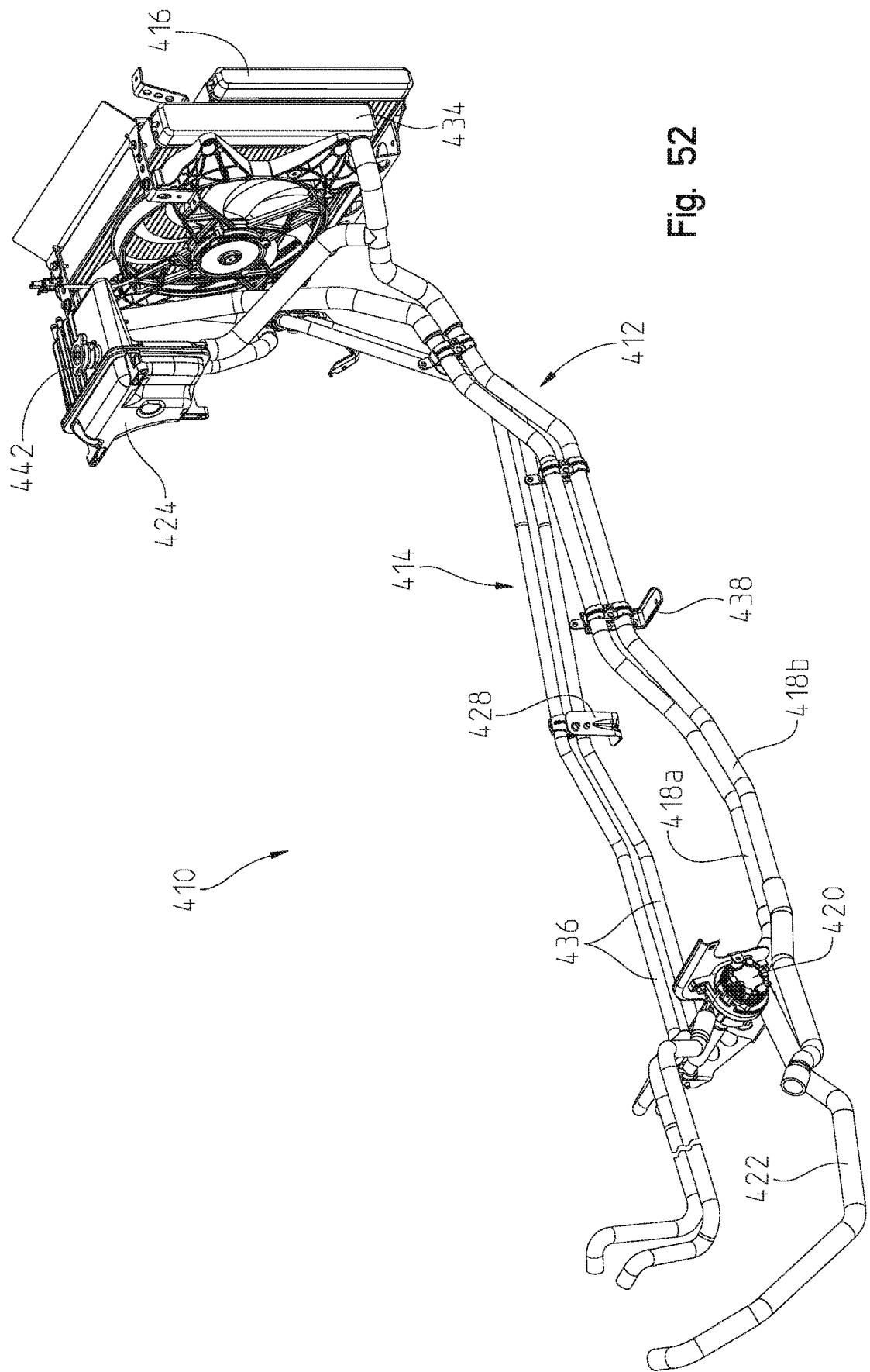
FIG. 52 is a right rear perspective view of the cooling assembly of FIG. 51.
Figure 59:
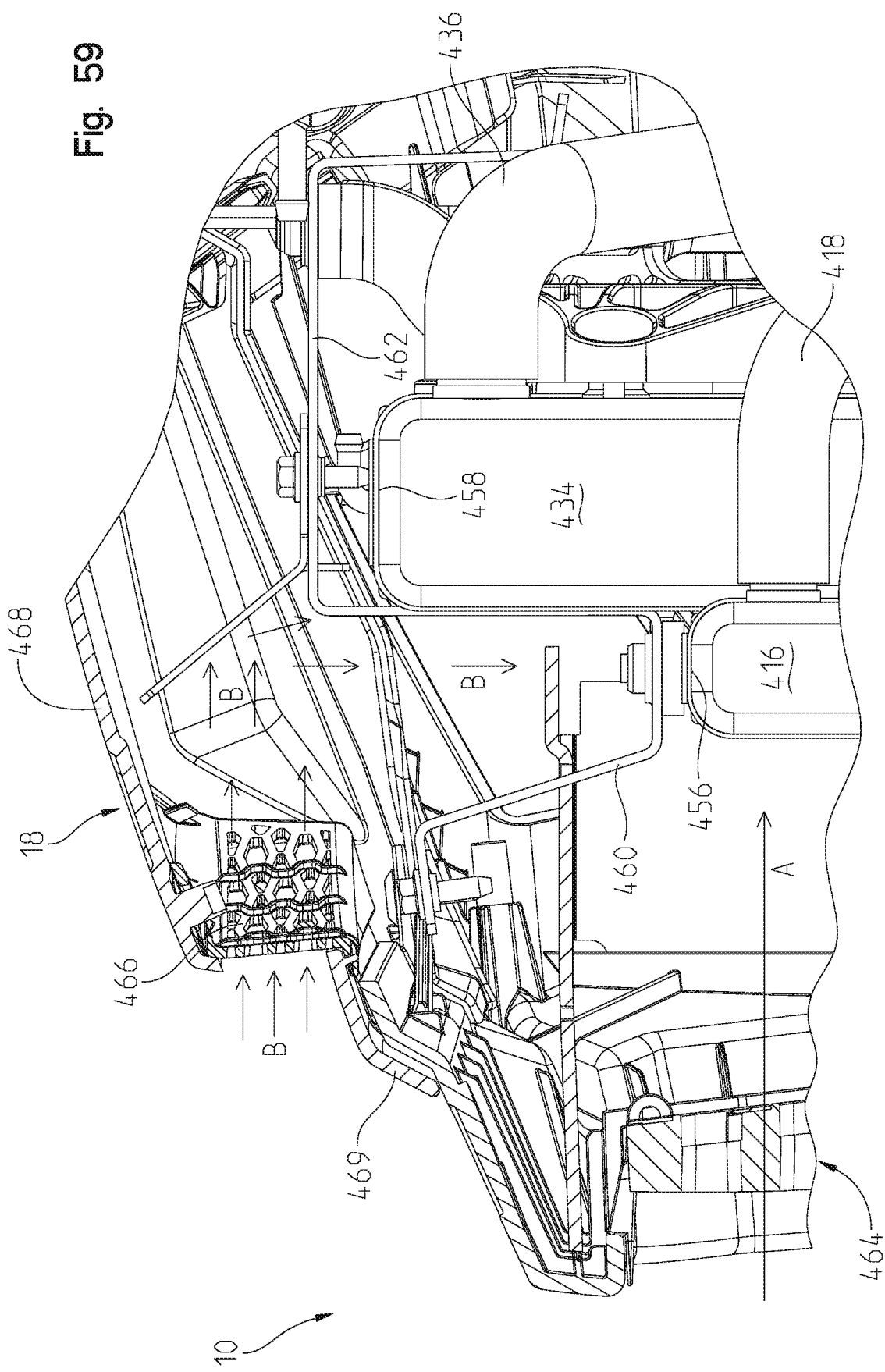
FIG. 59 is a cross-sectional view of a front portion of the vehicle of FIG. 1, illustrating the flow of air through the first and second heat exchangers of FIG. 52.

As shown in FIGS. 51, 52, and 59, heat exchanger 416 is positioned forward of heat exchanger 434 and both heat exchangers 416, 434 are positioned forward of operator area 20. Additionally, an upper surface 456 of heat exchanger 416 is positioned lower than an upper surface 458 of heat exchanger 434 such that heat exchangers 416, 434 are in a staggered configuration. As shown in FIG. 59, upper surface 456 of heat exchanger 416 is coupled to a bracket 460 of lower frame assembly 10 and upper surface 458 of heat exchanger 434 is coupled to a bracket 462 of lower frame assembly 10.

During operation of vehicle 2, ambient airflow A passes through a mesh or grille 464 and through heat exchangers 416, 434 to decrease the temperature of the cooling fluid flowing therethrough. However, because heat exchanger 434 is positioned rearward of heat exchanger 416, the ambient flowing through heat exchanger 434 may be at an elevated temperature after flowing through heat exchanger 416, thereby decreasing the cooling effect on the cooling fluid in heat exchanger 434. Therefore, in order to supplement cooling at heat exchanger 434, a secondary mesh or grille 466 allows ambient airflow B to pass therethrough, which is then directed downwardly toward heat exchanger 434 for additional cooling at heat exchanger 434. Secondary grille 466 is positioned below a hood 468 of body 18 and ambient airflow B is directed toward secondary grille 466 by front body panel 469 positioned generally forward of and below secondary grille 466.

Figure 60:
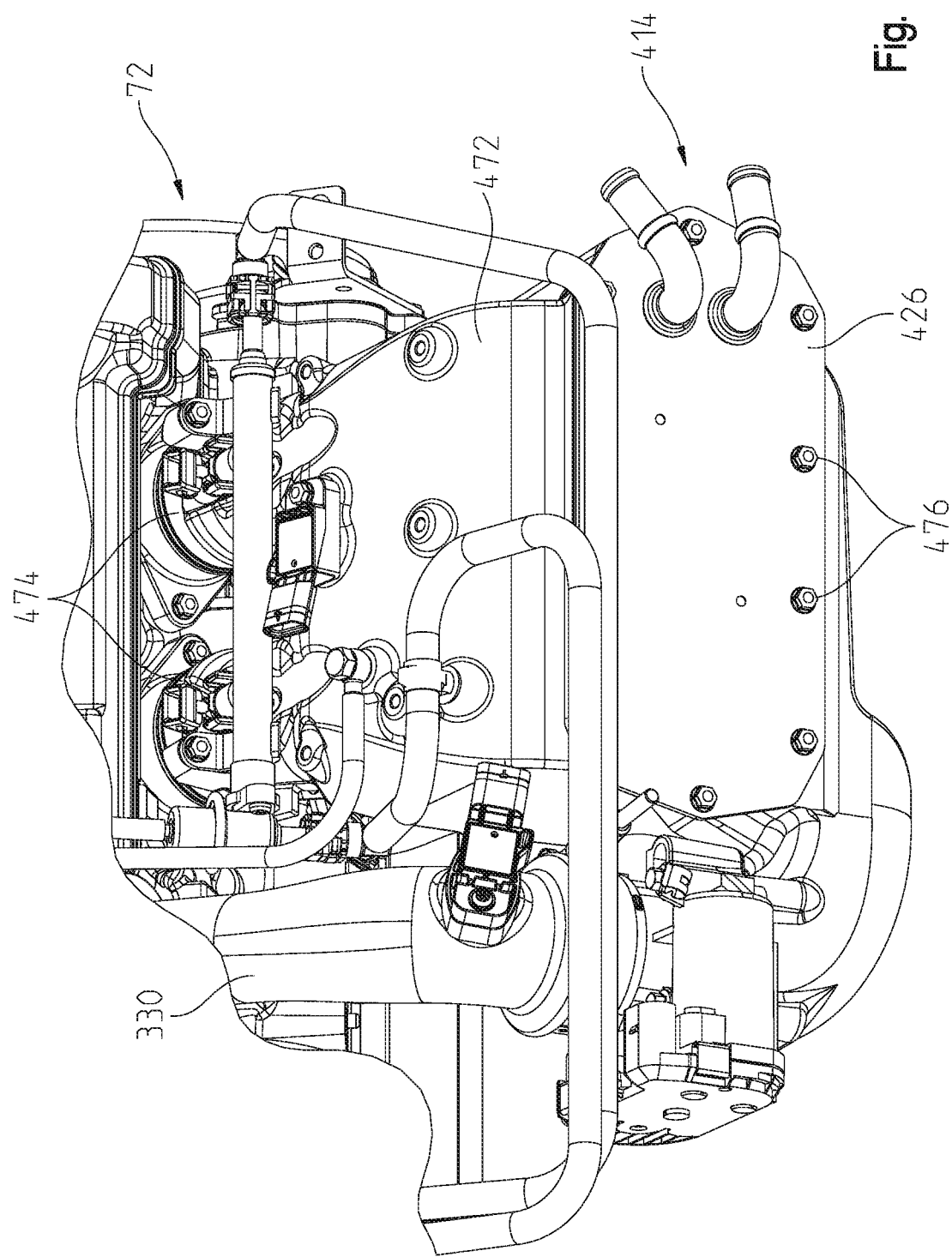
FIG. 60 is a rear perspective view of a third heat exchanger of the cooling assembly of FIG. 53 coupled to a portion of the engine of the vehicle of FIG. 1.
Figure 61:
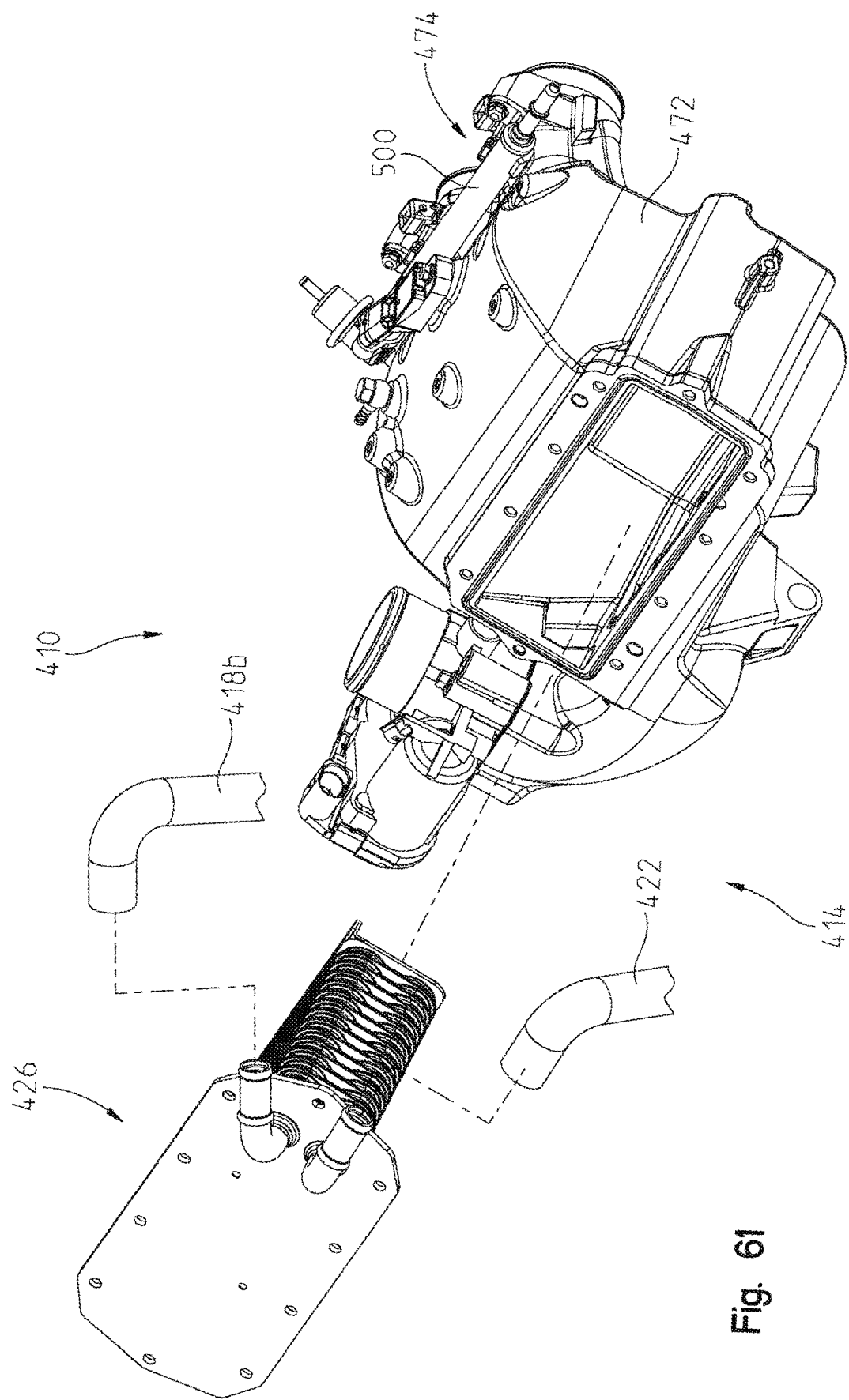
FIG. 61 is an exploded view of the third heat exchanger and the portion of the engine of FIG. 60.
Figure 62:
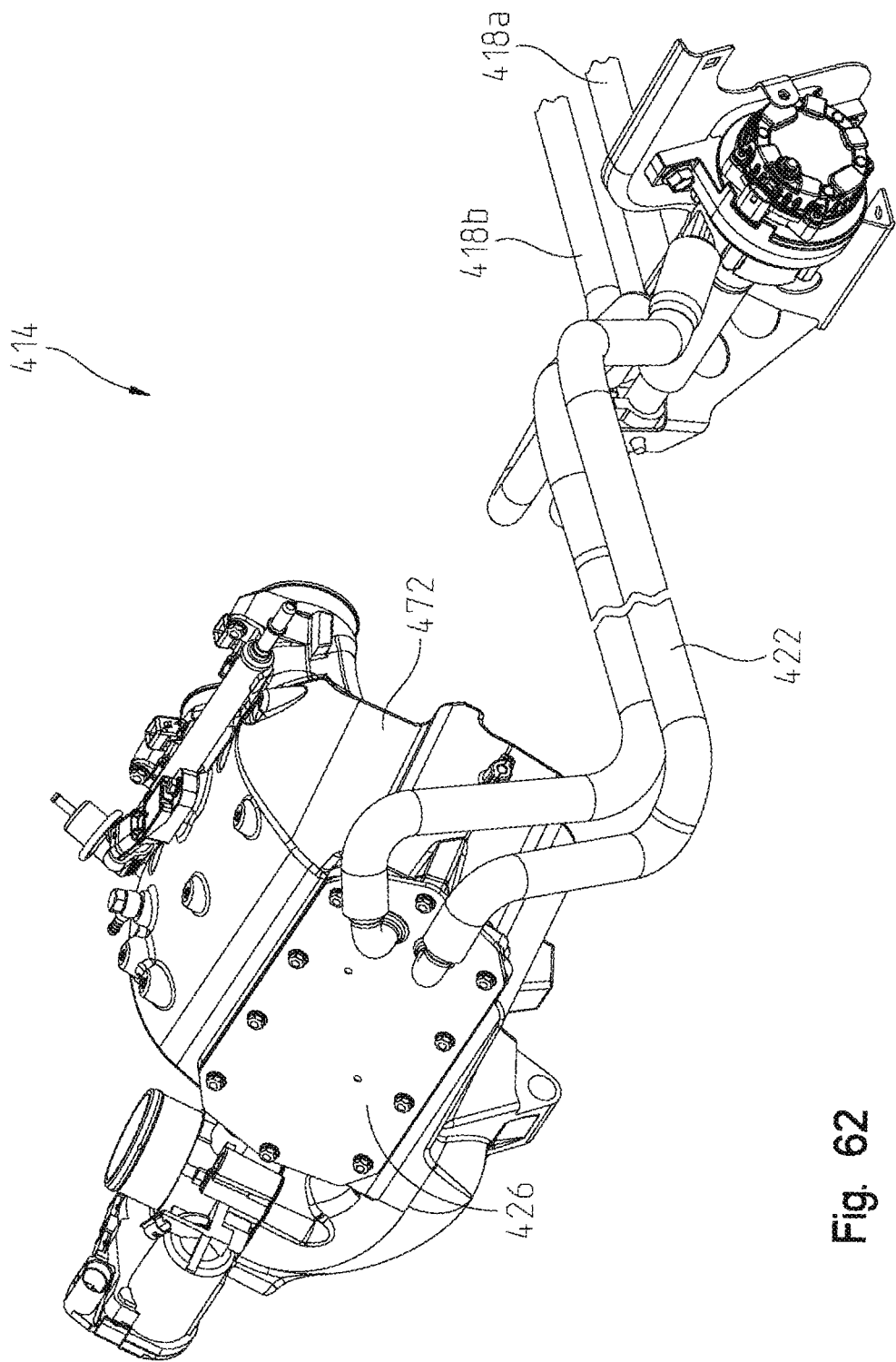
FIG. 62 is a right rear perspective view of the third heat exchanger of FIG. 60 and a portion of the cooling assembly of FIG. 53.

Referring to FIGS. 60-62, illustrative intercooler 426 is a liquid-to-air cooled heat exchanger which is removably coupled to engine 72. More particularly, intercooler 426 is coupled to an intake manifold 472 of engine 72 and positioned adjacent a fuel rail 500 of vehicle 2, and fuel pressure may be monitored in fuel rail 500. As such, intercooler 426 is positioned at rear portion 14 of vehicle 2, rather than at front portion 12 near heat exchangers 416, 434. Additionally, intercooler 426 is not welded to engine 72, but rather, is removably coupled thereto with removable fasteners 476, such as bolts and nuts. As such, intercooler 426 is removable from engine 72 for servicing, cleaning, or replacing without needing to disassembly intake manifold 472 and/or engine 72.

In operation, cooling fluid flows through first cooling circuit 412 and to engine 72 in order to alter the temperature of engine 72. In particular, the cooling fluid is cooled at heat exchanger 434 and then flows through cooling line 436a and to engine 72. When the cooling fluid has circulated about engine 72, the temperature of the cooling fluid may be elevated, and therefore, the cooling fluid flows back to heat exchanger 434 to decrease the temperature of the cooling fluid when ambient air passes through heat exchanger 434. Additionally, cooling fluid flows simultaneously through second cooling circuit 414 and to engine 72 in order to alter the temperature of the pre-combustion air. In particular, the cooling fluid is cooled at heat exchanger 416 and then flows through cooling line 418a, to pump 420, into conduit 422, and to intercooler 426. As such, when the pre-combustion air passes through intercooler 426, the temperature of the pre-combustion air decreases before entering cylinders 80 of engine 72. When the cooling fluid has circulated about intercooler 426, the temperature of the cooling fluid may be elevated, and therefore, the cooling fluid flows back to heat exchanger 416 to decrease the temperature of the cooling fluid when ambient air passes through heat exchanger 416. In this way, cooling assembly 410 is configured to both alter the temperature of engine 72 and alter the temperature of the pre-combustion air entering engine 72.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle, comprising:
a plurality of ground-engaging members;
a frame supported by the ground-engaging members; and
a powertrain assembly supported by the frame and including:
an engine;
a continuously variable transmission operatively coupled to the engine, the continuously variable transmission including a drive clutch and a driven clutch, the drive clutch operatively coupled to the driven clutch, the drive clutch including:
a stationary sheave operatively coupled to the engine; and
a moveable sheave configured for movement relative to the stationary sheave, the moveable sheave including a tower member, an intermediate member positioned adjacent the tower member and having at least one post, a cover member positioned adjacent the intermediate member such that the intermediate member is intermediate the tower member and the cover member, and a position member radially movable relative to the intermediate member and the tower member, wherein the intermediate member includes at least a first post and a second post, and at least a portion of the position member is positioned intermediate the first and second posts.

2. The vehicle of claim 1, wherein the position member includes side walls that are non-parallel.

3. The vehicle of claim 1, wherein the portion of the position member is positioned circumferentially intermediate the first and second posts.

4. The vehicle of claim 2, wherein the side walls of the position member are angled approximately 15-30 degrees relative to a radial direction of the drive clutch.

5. The vehicle of claim 2, wherein the side walls of the position member have an outer surface angled relative to the at least one post.

6. The vehicle of claim 1, wherein the tower member extends between a center opening and a radially-outer surface, and the position member is positioned radially intermediate the radially-outer surface and the center opening.

7. The vehicle of claim 6, wherein the position member is positioned outward of the at least one post.

8. The vehicle of claim 7, wherein the position member is positioned adjacent a portion of the at least one post.

9. The vehicle of claim 8, wherein at least a portion of the position member is circumferentially aligned with the at least one post.

10. The vehicle of claim 1, wherein at least a portion of the position member is circumferentially aligned with a portion of the at least one post.

11. The vehicle of claim 10, wherein the moveable sheave includes at least one weight positioned generally within the at least one post, and at least a portion of the position member is circumferentially aligned with the at least one weight.

12. A continuously variable transmission for coupling a drive shaft and a driven shaft, the continuously variable transmission comprising:
a housing having an interior and having a first opening adapted to receive the drive shaft and a second opening adapted to receive the driven shaft;
a driven clutch positioned within the interior of the housing and adapted to be operatively coupled to the driven shaft; and
a drive clutch positioned within the interior of the housing and adapted to be operatively coupled to the drive shaft and the driven clutch, the drive clutch including a first drive clutch sheave and a second drive clutch sheave moveable relative to the first drive clutch sheave, the second drive clutch sheave including a tower member, an intermediate member positioned adjacent the tower member and having at least one post, and a cover member positioned adjacent the intermediate member such that the intermediate member is intermediate the tower member and the cover member, and a position member radially moveable relative to the intermediate member and the tower member, wherein the moveable sheave includes at least one weight positioned generally within the at least one post, and at least a portion of the position member is circumferentially aligned with the at least one weight.

13. The vehicle of claim 12, wherein the position member includes side walls that are non-parallel.

14. The vehicle of claim 13, wherein the intermediate member includes at least a first post and a second post, and at least a portion of the position member is positioned intermediate the first and second posts.

15. The vehicle of claim 14, wherein the portion of the position member is positioned circumferentially intermediate the first and second posts.

16. The vehicle of claim 15, wherein the side walls of the position member are angled approximately 15-30 degrees relative to a radial direction of the drive clutch.

17. The vehicle of claim 15, wherein the side walls of the position member have an outer surface angled relative to the at least one post.

18. The vehicle of claim 12, wherein the tower member extends between a center opening and a radially-outer surface, and the position member is positioned radially intermediate the radially-outer surface and the center opening.

19. The vehicle of claim 18, wherein the position member is positioned outward of the at least one post.

20. The vehicle of claim 19, wherein the position member is positioned adjacent a portion of the at least one post.

21. The vehicle of claim 20, wherein at least a portion of the position member is circumferentially aligned with the at least one post.

22. The vehicle of claim 21, wherein at least a portion of the position member is circumferentially aligned with a portion of the at least one post.

23. A vehicle, comprising:
a plurality of ground-engaging members;
a frame supported by the ground-engaging members; and
a powertrain assembly supported by the frame and including:
an engine supported by the frame;
a continuously variable transmission operatively coupled to the engine, the continuously variable transmission including a drive clutch and a driven clutch, the drive clutch operatively coupled to the driven clutch, the drive clutch including:
a stationary sheave; and
a moveable sheave configured for movement relative to the stationary sheave and including a tower member, a spider member positioned adjacent the tower member, and a position member being radially movable relative to the spider member and the tower member, the position member having a side wall that is at an angle greater than zero relative to a radial direction of the drive clutch, wherein the position member is wedge-shaped.

24. The vehicle of claim 23, wherein the position member has a tapered configuration.

25. The vehicle of claim 23, wherein the spider member includes at least a first post and a second post, and at least a portion of the position member is positioned intermediate the first and second posts.

26. The vehicle of claim 23, wherein the tower member includes side walls that have a corresponding angle relative to the angle of the side wall of the position member.

27. The vehicle of claim 23, wherein the spider member includes at least one post, and the position member is adjacent at least a portion of the at least one post of the spider member.

28. The vehicle of claim 23, wherein the position member includes side walls that are non-parallel.

29. The vehicle of claim 28, wherein the side walls of the position member are angled approximately 15-30 degrees relative to a radial direction of the drive clutch.

30. The vehicle of claim 23, wherein the tower member extends between a center opening and a radially-outer surface, and the position member is positioned radially intermediate the radially-outer surface and the center opening.

31. The vehicle of claim 23, wherein the spider member includes at least one post, the position member being positioned outward of the at least one post.

32. The vehicle of claim 23, wherein the spider member includes at least one post, the position member being positioned adjacent a portion of the at least one post.

33. The vehicle of claim 23, wherein the spider member includes at least one post, at least a portion of the position member being circumferentially aligned with the at least one post.

* * * * *